(12) United States Patent
Golinski et al.

(10) Patent No.: US 11,405,626 B2
(45) Date of Patent: Aug. 2, 2022

(54) VIDEO COMPRESSION USING RECURRENT-BASED MACHINE LEARNING SYSTEMS

(71) Applicant: QUALCOMM Incorporated, San Diego, CA (US)

(72) Inventors: Adam Waldemar Golinski, Oxford (GB); Yang Yang, San Diego, CA (US); Reza Pourreza, San Diego, CA (US); Guillaume Konrad Sautiere, Amsterdam (NL); Ties Jehan Van Rozendaal, Amsterdam (NL); Taco Sebastiaan Cohen, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/091,570

(22) Filed: Nov. 6, 2020

(65) Prior Publication Data

US 2021/0281867 A1    Sep. 9, 2021

Related U.S. Application Data

(60) Provisional application No. 62/984,673, filed on Mar. 3, 2020.

(51) Int. Cl.
*H04N 19/42* (2014.01)
*H04N 19/137* (2014.01)
(Continued)

(52) U.S. Cl.
CPC ........... *H04N 19/42* (2014.11); *G06N 3/08* (2013.01); *H04N 19/137* (2014.11); *H04N 19/172* (2014.11); *H04N 19/85* (2014.11)

(58) Field of Classification Search
CPC ...... G06N 3/08; H04N 19/137; H04N 19/172; H04N 19/42; H04N 19/436; H04N 19/503; H04N 19/85
See application file for complete search history.

(56) References Cited

U.S. PATENT DOCUMENTS

2018/0060727 A1* 3/2018 Rainwater ............ G06N 3/0454

OTHER PUBLICATIONS

G. Toderici et al., "Full Resolution Image Compression with Recurrent Neural Networks," 2017 IEEE Conference on Computer Vision and Pattern Recognition (CVPR), 2017, pp. 5435-5443, Jul. 2017. (hereinafter Toderici).*

(Continued)

*Primary Examiner* — Mohammed S Rahaman
(74) *Attorney, Agent, or Firm* — Polsinelli LLP

(57) ABSTRACT

Techniques are described herein for coding video content using recurrent-based machine learning tools. A device can include a neural network system including encoder and decoder portions. The encoder portion can generate output data for the current time step of operation of the neural network system based on an input video frame for a current time step of operation of the neural network system, reconstructed motion estimation data from a previous time step of operation, reconstructed residual data from the previous time step of operation, and recurrent state data from at least one recurrent layer of a decoder portion of the neural network system from the previous time step of operation. A decoder portion of the neural network system can generate, based on the output data and recurrent state data from the previous time step of operation, a reconstructed video frame for the current time step of operation.

64 Claims, 22 Drawing Sheets

(51) Int. Cl.
*G06N 3/08* (2006.01)
*H04N 19/85* (2014.01)
*H04N 19/172* (2014.01)

(56) References Cited

OTHER PUBLICATIONS

G. Lu, W. Ouyang, D. Xu, X. Zhang, C. Cai and Z. Gao, "DVC: An End-To-End Deep Video Compression Framework," 2019 IEEE/CVF Conference on Computer Vision and Pattern Recognition (CVPR), 2019, pp. Jun. 2019. (hereinafter Ouyang).*
Improved Lossy Image Compression with Priming and Spatially Adaptive Bit Rates for Recurrent Networks, Nick Johnston, Damien Vincent, David Minnen, Michele Covell, Saurabh Singh, Troy Chinen, Sung Jin Hwang, Joel Shor, George Toderici (hereinafter Johnston).*
S. Ma, X. Zhang, C. Jia, Z. Zhao, S. Wang and S. Wang, "Image and Video Compression With Neural Networks: A Review," in IEEE Transactions on Circuits and Systems for Video Technology, vol. 30, No. 6, pp. 1683-1698, Jun. 2020, doi: 10.1109/TCSVT.2019.2910119.*
Alvaro Peris et al: "Video Description using Bidirectional Recurrent Neural Networks", arxiv.org, Cornell University Library, 201OLIN Library Cornell University Ithaca, NY 14853, Apr. 12, 2016.*
"HEVC Inter Coding using Deep Recurrent Neural Networks and Artificial Reference Pictures", 2019 Picture Coding Symposium (PCS), IEEE, Nov. 12, 2019 (Nov. 12, 2019), pp. 1-5.*
International Search Report and Written Opinion—PCT/US2021/013599—ISA/EPO—dated May 18, 2021.
Johnston N., et al., "Improved Lossy Image Compression with Priming and Spatially Adaptive Bit Rates for Recurrent Networks", arxiv.org, Cornell University Library, 201 OLIN Library Cornell University, Ithaca, NY, 14853, Mar. 29, 2017 (Mar. 29, 2017), XP080752976, 9 Pages, the whole document.
Lu G., et al., "DVC: An End-To-End Deep Video Compression Framework", 2019 IEEE/CVF Conference on Computer Vision and Pattern Recognition (CVPR), IEEE, Jun. 15, 2019 (Jun. 15, 2019), XP033686979, pp. 10998-11007, DOI: 10.1109/CVPR.2019.01126 [retrieved on Jan. 8, 2020] the whole document.
Ma S., et al., "Image and Video Compression with Neural Networks: A Review", arxiv.org, IEEE Transactions on Circuits and Systems for Video Technology, Cornell University Library, 201 OLIN Library Cornell University Ithaca, NY 14853, Apr. 7, 2019 (Apr. 7, 2019), XP081165996, pp. 1-16, the whole document.
Peris A., et al., "Video Description using Bidirectional Recurrent Neural Networks", arxiv.org, Cornell University Library, 201 OLIN Library Cornell University Ithaca, NY 14853, Apr. 12, 2016 (Apr. 12, 2016), XP080694951, 8 Pages, the whole document.
Thorsten L., et al., "HEVC Inter Coding using Deep Recurrent Neural Networks and Artificial Reference Pictures", 2019 Picture Coding Symposium (PCS), IEEE, Nov. 12, 2019 (Nov. 12, 2019), XP033688127, pp. 1-5, , DOI: 10.1109/PCS48520.2019.8954497 [retrieved on Jan. 8, 2020] the whole document.
Toderici G., et al., "Full Resolution Image Compression with Recurrent Neural Networks", 2017 IEEE Conference on Computer Vision and Pattern Recognition (CVPR), IEEE Computer Society, US, Jul. 21, 2017 (Jul. 21, 2017), XP033249903, pp. 5435-5443, ISSN: 1063-6919, DOI: 10.1109/CVPR.2017.577 [retrieved on Nov. 6, 2017] the whole document.
Wang S.S., et al., "Deep Neural Networks in Image and Video Compression", 130. MPEG Meeting, Apr. 20, 2020-Apr. 24, 2020, Alpbach, (Motion Picture Expert Group or ISO/IEC JTC1/SC29/WG11), No. m53700 Apr. 10, 2020 (Apr. 10, 2020), XP030287403, 11 Pages, Retrieved from the Internet: URL:http://phenix.int-evry.fr/mpeg/doc_end_user/documents/130_Alpbach/wg11/m53700-v1-m53700-v1.zip m53700-v1.docx [retrieved on Apr. 10, 2020] the whole document.

* cited by examiner

1800

OBTAIN, BY AN ENCODER PORTION OF AN NEURAL NETWORK SYSTEM, AN INPUT VIDEO FRAME FOR A CURRENT TIME STEP OF OPERATION OF THE NEURAL NETWORK SYSTEM, RECONSTRUCTED MOTION ESTIMATION DATA FROM A PREVIOUS TIME STEP OF OPERATION OF THE NEURAL NETWORK SYSTEM, RECONSTRUCTED RESIDUAL DATA FROM THE PREVIOUS TIME STEP OF OPERATION OF THE NEURAL NETWORK SYSTEM, AND AT LEAST ONE RECURRENT STATE DATA FROM AT LEAST ONE RECURRENT LAYER OF A DECODER PORTION OF THE NEURAL NETWORK SYSTEM FROM THE PREVIOUS TIME STEP OF OPERATION
1802

↓

GENERATE, BY THE ENCODER PORTION OF THE NEURAL NETWORK SYSTEM, OUTPUT DATA FOR THE CURRENT TIME STEP OF OPERATION OF THE NEURAL NETWORK SYSTEM
1804

↓

OBTAIN, BY THE DECODER PORTION OF THE NEURAL NETWORK SYSTEM, THE OUTPUT DATA FOR THE CURRENT TIME STEP OF OPERATION AND THE AT LEAST ONE RECURRENT STATE DATA FROM THE AT LEAST ONE RECURRENT LAYER OF THE DECODER PORTION FROM THE PREVIOUS TIME STEP OF OPERATION
1806

↓

GENERATE, BY THE DECODER PORTION AT LEAST PARTIALLY BASED ON THE OUTPUT DATA AND THE AT LEAST ONE RECURRENT STATE DATA FROM THE PREVIOUS TIME STEP OF OPERATION, A RECONSTRUCTED VIDEO FRAME FOR THE CURRENT TIME STEP OF OPERATION
1808

```
OBTAIN, BY A DECODER PORTION OF A NEURAL NETWORK SYSTEM,
OUTPUT DATA FOR A CURRENT TIME STEP OF OPERATION OF THE
NEURAL NETWORK SYSTEM AND RECURRENT STATE DATA FROM AT
LEAST ONE RECURRENT LAYER OF THE DECODER PORTION FROM A
PREVIOUS TIME STEP OF OPERATION OF THE NEURAL NETWORK
SYSTEM
1902
```

```
DETERMINE, BY THE DECODER PORTION OF THE NEURAL NETWORK
SYSTEM, MOTION ESTIMATION DATA FOR THE CURRENT TIME STEP OF
OPERATION AT LEAST PARTIALLY BASED ON THE OUTPUT DATA AND
THE RECURRENT STATE DATA FROM THE PREVIOUS TIME STEP OF
OPERATION
1904
```

```
OBTAIN A PREVIOUSLY RECONSTRUCTED VIDEO FRAME GENERATED
DURING THE PREVIOUS TIME STEP OF OPERATION
1906
```

```
GENERATE A WARPED RECONSTRUCTED VIDEO FRAME FOR THE
CURRENT TIME STEP OF OPERATION AT LEAST IN PART BY MODIFYING
ONE OR MORE PIXELS OF THE PREVIOUSLY RECONSTRUCTED VIDEO
FRAME USING THE MOTION ESTIMATION DATA DETERMINED FOR THE
CURRENT TIME STEP
1908
```

```
GENERATE A RECONSTRUCTED VIDEO FRAME FOR THE CURRENT TIME
STEP OF OPERATION AT LEAST PARTIALLY BASED ON THE WARPED
RECONSTRUCTED VIDEO FRAME
1910
```

FIG. 19

VIDEO COMPRESSION USING RECURRENT-BASED MACHINE LEARNING SYSTEMS

CROSS-REFERENCE TO RELATED APPLICATIONS

This application claims the benefit of U.S. Provisional Application No. 62/984,673, filed Mar. 3, 2020, which is hereby incorporated by reference, in its entirety and for all purposes.

FIELD OF THE DISCLOSURE

The present disclosure generally relates to video coding, including encoding (or compression) and decoding (decompression) of video. For example, aspects of the present disclosure relate to coding (e.g., encoding and/or decoding) video content using one or more recurrent-based machine learning systems.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. As a result, the large amount of video data that is required to meet these demands places a burden on communication networks and devices that process and store the video data.

Video coding techniques may be used to compress video data. A goal of video coding is to compress video data into a form that uses a lower bit rate, while avoiding or minimizing degradations to video quality. With ever-evolving video services becoming available, encoding techniques with better coding efficiency are needed.

SUMMARY

Systems and techniques are described for coding (e.g., encoding and/or decoding) video content using one or more recurrent-based machine learning systems. In one illustrative example, a method of processing video data is provided. The method includes: obtaining, by an encoder portion of a neural network system, an input video frame for a current time step of operation of the neural network system, reconstructed motion estimation data from a previous time step of operation of the neural network system, reconstructed residual data from the previous time step of operation of the neural network system, and recurrent state data from at least one recurrent layer of a decoder portion of the neural network system from the previous time step of operation; generating, by the encoder portion of the neural network system, output data for the current time step of operation of the neural network system, the output data being generated at least partially based on the input video frame, the reconstructed motion estimation data from the previous time step of operation, the reconstructed residual data from the previous time step of operation, and the recurrent state data from the previous time step of operation; obtaining, by the decoder portion of the neural network system, the output data for the current time step of operation and the recurrent state data from the at least one recurrent layer of the decoder portion from the previous time step of operation; and generating, at least partially based on the output data and the recurrent state data from the previous time step of operation, a reconstructed video frame for the current time step of operation, the reconstructed video frame representing the input video frame.

In another example, an apparatus for processing video data is provided that includes a memory and a processor (e.g., implemented in circuitry) coupled to the memory. In some examples, more than one processor can be coupled to the memory and can be used to perform one or more of the operations. The processor is configured to: obtain, an encoder portion of a neural network system, an input video frame for a current time step of operation of the neural network system, reconstructed motion estimation data from a previous time step of operation of the neural network system, reconstructed residual data from the previous time step of operation of the neural network system, and recurrent state data from at least one recurrent layer of a decoder portion of the neural network system from the previous time step of operation; generate, using the encoder portion, output data for the current time step of operation of the neural network system, the output data being generated at least partially based on the input video frame, the reconstructed motion estimation data from the previous time step of operation, the reconstructed residual data from the previous time step of operation, and the recurrent state data from the previous time step of operation; obtain, using the decoder portion of a neural network system, the output data for the current time step of operation and the recurrent state data from the at least one recurrent layer of the decoder portion from the previous time step of operation; and generate, at least partially based on the output data and the recurrent state data from the previous time step of operation, a reconstructed video frame for the current time step of operation, the reconstructed video frame representing the input video frame.

In another example, a non-transitory computer-readable medium is provided that has stored thereon instructions that, when executed by one or more processors, cause the one or more processor to: obtain, using an encoder portion of a neural network system, an input video frame for a current time step of operation of the neural network system, reconstructed motion estimation data from a previous time step of operation of the neural network system, reconstructed residual data from the previous time step of operation of the neural network system, and recurrent state data from at least one recurrent layer of a decoder portion of the neural network system from the previous time step of operation; generating, using the encoder portion of the neural network system, output data for the current time step of operation of the neural network system, the output data being generated at least partially based on the input video frame, the reconstructed motion estimation data from the previous time step of operation, the reconstructed residual data from the previous time step of operation, and the recurrent state data from the previous time step of operation; obtaining, using the decoder portion of the neural network system, the output data for the current time step of operation and the recurrent state data from the at least one recurrent layer of the decoder portion from the previous time step of operation; and generating, using the decoder portion at least partially based on the output data and the recurrent state data from the previous time step of operation, a reconstructed video frame for the current time step of operation, the reconstructed video frame representing the input video frame.

In another example, an apparatus for processing video data is provided. The apparatus includes: means for obtaining an input video frame for a current time step of operation of the neural network system, reconstructed motion estimation data from a previous time step of operation of the neural network system, reconstructed residual data from the previous time step of operation of the neural network system, and recurrent state data from at least one recurrent layer from the previous time step of operation; means for generating output data for the current time step of operation of the neural network system, the output data being generated at least partially based on the input video frame, the reconstructed motion estimation data from the previous time step of operation, the reconstructed residual data from the previous time step of operation, and the recurrent state data from the previous time step of operation; means for obtaining the output data for the current time step of operation and the recurrent state data from the at least one recurrent layer of a decoder portion of a neural network system from the previous time step of operation; and means for generating, at least partially based on the output data and the recurrent state data from the previous time step of operation, a reconstructed video frame for the current time step of operation, the reconstructed video frame representing the input video frame.

In some aspects, the method, apparatuses, and computer-readable medium described above further comprise: determining, by the decoder portion of the neural network system, motion estimation data for the current time step of operation at least partially based on the output data and the recurrent state data from the previous time step of operation; obtaining a previously reconstructed video frame generated during the previous time step of operation; and generating a warped reconstructed video frame for the current time step of operation by modifying one or more pixels of the previously reconstructed video frame using the motion estimation data determined for the current time step.

In some aspects, the method, apparatuses, and computer-readable medium described above further comprise: determining, by the decoder portion of the neural network system, reconstructed residual data for the current time step of operation at least partially based on the output data and the recurrent state data from the previous time step of operation; and generating the reconstructed video frame for the current time step of operation by adding the warped reconstructed video frame to the reconstructed residual data determined for the current time step.

In some aspects, the method, apparatuses, and computer-readable medium described above further comprise: determining, by the decoder portion of the neural network system, reconstructed residual data for the current time step of operation at least partially based on the output data and the recurrent state data from the previous time step of operation; and processing, by a post-warping network of the decoder portion, the warped reconstructed video frame and the reconstructed residual data determined for the current time step. In such aspects, the reconstructed video frame is generated for the current time step of operation based on processing of the warped reconstructed video frame and the reconstructed residual data by the post-warping network.

In some aspects, the method, apparatuses, and computer-readable medium described above further comprise: determining, by a motion estimation network of the neural network system, motion estimation data for the current time step of operation at least partially based on the input video frame and at least one of a previously reconstructed video frame from the previous time step of operation or a previous input video frame from the previous time step of operation; generating a warped reconstructed video frame for the current time step by modifying one or more pixels of at least one of the previously reconstructed video frame or the previous input video frame using the motion estimation data determined for the current time step; and sending the warped reconstructed video frame and the motion estimation data determined for the current time step of operation to the encoder portion of the neural network system. In such aspects, the output data generated for the current time step of operation is generated by the encoder portion of the neural network system at least partially based on the warped reconstructed video frame and the motion estimation data determined for the current time step of operation.

In some aspects, the method, apparatuses, and computer-readable medium described above further comprise: training, for one or more training iterations, the neural network system using a first loss function, the first loss function determining a loss between one or more input video frames and one or more warped reconstructed video frames; deactivating the first loss function; and training, for one or more subsequent training iterations performed after the one or more training iterations, the neural network system using a second loss function, the second loss function determining a loss between at least one input video frame and at least one reconstructed video frame.

In some aspects, the recurrent state data includes one or more values of nodes of the at least one recurrent layer.

In some aspects, the decoder portion of the neural network system includes a plurality of recurrent layers, each recurrent layer of the plurality of recurrent layers providing respective recurrent state data.

In some aspects, the method, apparatuses, and computer-readable medium described above further comprise: generating warped recurrent state data for the current time step of operation by modifying the recurrent state data from the previous time step of operation using motion estimation data determined for the current time step of operation or the previous time step of operation. In such aspects, the reconstructed video frame generated for the current time step of operation is generated at least partially based on the warped recurrent state data.

In some aspects, the method, apparatuses, and computer-readable medium described above further comprise: generating, by the decoder portion, a reconstructed mask, the reconstructed mask including one or more values indicative of a presence of data in a previously reconstructed video frame generated during the previous time step of operation; and generating the reconstructed video frame for the current time step of operation at least partially based on the reconstructed mask, a warped reconstructed video frame generated for the current time step of operation, and reconstructed residual data determined for the current time step of operation, the reconstructed mask weighting contributions of the warped reconstructed video frame and the reconstructed residual data.

In some aspects, the method, apparatuses, and computer-readable medium described above further comprise: obtaining a previously reconstructed video frame generated during the previous time step of operation; generating, during the current time step of operation, a warped reconstructed video frame for the current time step of operation by modifying one or more pixels of the previously reconstructed video frame using the motion estimation data determined for the current time step; determining, by the decoder portion during the current time step of operation, first reconstructed residual data for the current time step of operation; generating the reconstructed video frame for the current time step of operation by adding the warped reconstructed video frame to the reconstructed residual data determined for the current time step; determining, by the decoder portion during the current time step of operation, second reconstructed residual data from the previous time step of operation at least partially based on a previous input video frame processed by the encoder portion during the current time step of operation; modifying, during the current time step of operation, the previously reconstructed video frame using the second reconstructed residual data; and outputting the modified previously reconstructed video frame as a final output video frame for the current time step of operation.

In some aspects, the method, apparatuses, and computer-readable medium described above further comprise: obtaining, by the encoder portion of the neural network system, one or more distortion maps; and generating, by the encoder portion of the neural network system, the output data at least partially based on the one or more distortion maps. In some aspects, the one or more distortion maps include a first distortion map indicative of distortion between the input video frame for the current time step of operation and a previously reconstructed video frame from the previous time step of operation. In some aspects, the one or more distortion maps include a second distortion map indicative of distortion between the input video frame for the current time step of operation and a warped reconstructed video frame. In such aspects, the warped reconstructed video frame can be generated by modifying one or more pixels of a previously reconstructed video frame from the previous time step of operation.

In some aspects, the method, apparatuses, and computer-readable medium described above further comprise: processing, by a first layer of the encoder portion of the neural network system, input data; determining, by the first layer of the encoder portion, a plurality of weight values for the first layer of the encoder portion; setting weights of a second layer of the encoder portion of the neural network system to the plurality of weight values; and processing, by the second layer of the encoder portion, the input data using the weights set to the plurality of weight values.

In some aspects, the method, apparatuses, and computer-readable medium described above further comprise: storing the output data in a storage medium.

In some aspects, the method, apparatuses, and computer-readable medium described above further comprise: storing the reconstructed video frame in a storage medium.

In some aspects, the method, apparatuses, and computer-readable medium described above further comprise: sending the reconstructed video frame over a transmission medium to at least one device.

In another illustrative example, a method of processing video data is provided. The method includes: obtaining, by a decoder portion of a neural network system, output data for a current time step of operation of the neural network system and recurrent state data from at least one recurrent layer of the decoder portion from a previous time step of operation of the neural network system; determining, by the decoder portion of the neural network system, motion estimation data for the current time step of operation at least partially based on the output data and the recurrent state data from the previous time step of operation; obtaining a previously reconstructed video frame generated during the previous time step of operation; generating a warped reconstructed video frame for the current time step of operation at least in part by modifying one or more pixels of the previously reconstructed video frame using the motion estimation data determined for the current time step; and generating a reconstructed video frame for the current time step of operation at least partially based on the warped reconstructed video frame.

In another example, an apparatus for processing video data is provided that includes a memory and a processor (e.g., implemented in circuitry) coupled to the memory. In some examples, more than one processor can be coupled to the memory and can be used to perform one or more of the operations. The processor is configured to: obtain, using a decoder portion of a neural network system, output data for a current time step of operation of the neural network system and recurrent state data from at least one recurrent layer of the decoder portion from a previous time step of operation of the neural network system; determine, using the decoder portion of the neural network system, motion estimation data for the current time step of operation at least partially based on the output data and the recurrent state data from the previous time step of operation; obtain a previously reconstructed video frame generated during the previous time step of operation; generate a warped reconstructed video frame for the current time step of operation at least in part by modifying one or more pixels of the previously reconstructed video frame using the motion estimation data determined for the current time step; and generate a reconstructed video frame for the current time step of operation at least partially based on the warped reconstructed video frame.

In another example, a non-transitory computer-readable medium is provided that has stored thereon instructions that, when executed by one or more processors, cause the one or more processor to: obtain, using a decoder portion of a neural network system, output data for a current time step of operation of the neural network system and recurrent state data from at least one recurrent layer of the decoder portion from a previous time step of operation of the neural network system; determine, using the decoder portion of the neural network system, motion estimation data for the current time step of operation at least partially based on the output data and the recurrent state data from the previous time step of operation; obtain a previously reconstructed video frame generated during the previous time step of operation; generate a warped reconstructed video frame for the current time step of operation at least in part by modifying one or more pixels of the previously reconstructed video frame using the motion estimation data determined for the current time step; and generate a reconstructed video frame for the current time step of operation at least partially based on the warped reconstructed video frame.

In another example, an apparatus for processing video data is provided. The apparatus includes: means for obtaining output data for a current time step of operation of a neural network system and recurrent state data from at least one recurrent layer of a decoder portion of the neural network system from a previous time step of operation of the neural network system; means for determining motion estimation data for the current time step of operation at least partially based on the output data and the recurrent state data from the previous time step of operation; means for obtaining a previously reconstructed video frame generated during the previous time step of operation; means for generating a warped reconstructed video frame for the current time step of operation at least in part by modifying one or more pixels of the previously reconstructed video frame using the motion estimation data determined for the current time step; and means for generating a reconstructed video frame for the current time step of operation at least partially based on the warped reconstructed video frame.

In some aspects, the method, apparatuses, and computer-readable medium described above further comprise: determining, by the decoder portion of the neural network system, reconstructed residual data for the current time step of operation at least partially based on the output data and the recurrent state data from the previous time step of operation; and generating the reconstructed video frame for the current time step of operation at least in part by adding the warped reconstructed video frame to the reconstructed residual data determined for the current time step.

In some aspects, the method, apparatuses, and computer-readable medium described above further comprise: determining, by the decoder portion during the current time step of operation, reconstructed residual data from the previous time step of operation at least partially based on a previous input video frame processed by an encoder portion of the neural network system during the current time step of operation; modifying, during the current time step of operation, the previously reconstructed video frame using the reconstructed residual data from the previous time step of operation; and outputting the modified previously reconstructed video frame as a final output video frame for the current time step of operation.

In some aspects, the method, apparatuses, and computer-readable medium described above further comprise: determining, by the decoder portion of the neural network system, reconstructed residual data for the current time step of operation at least partially based on the output data and the recurrent state data from the previous time step of operation; processing, by a post-warping network of the decoder portion, the warped reconstructed video frame and the reconstructed residual data determined for the current time step; and generating the reconstructed video frame for the current time step of operation at least partially based on processing of the warped reconstructed video frame and the reconstructed residual data by the post-warping network.

In some aspects, the method, apparatuses, and computer-readable medium described above further comprise: generating warped recurrent state data for the current time step of operation at least in part by modifying the recurrent state data from the previous time step of operation using the motion estimation data determined for the current time step of operation or motion estimation determined for the previous time step of operation; and generating the reconstructed video frame for the current time step of operation at least partially based on the warped recurrent state data.

In some aspects, the method, apparatuses, and computer-readable medium described above further comprise: generating, by the decoder portion, a reconstructed mask, the reconstructed mask including one or more values indicative of a presence of data in the previously reconstructed video frame generated during the previous time step of operation; and generating the reconstructed video frame for the current time step of operation at least partially based on the reconstructed mask, the warped reconstructed video frame for the current time step of operation, and reconstructed residual data determined for the current time step of operation, the reconstructed mask weighting contributions of the warped reconstructed video frame and the reconstructed residual data.

In some aspects, the method, apparatuses, and computer-readable medium described above further comprise: obtaining, by an encoder portion of a neural network system, an input video frame for the current time step of operation, reconstructed motion estimation data from a previous time step of operation of the neural network system, reconstructed residual data from the previous time step of operation of the neural network system, and recurrent state data from at least one recurrent layer of the decoder portion of the neural network system from the previous time step of operation; and generating, by the encoder portion of the neural network system, the output data for the current time step of operation, the output data being generated at least partially based on the input video frame, the reconstructed motion estimation data from the previous time step of operation, the reconstructed residual data from the previous time step of operation, and the recurrent state data from the previous time step of operation.

In some aspects, the apparatus comprises a mobile device, a wearable device, an extended reality device (e.g., a virtual reality (VR) device, an augmented reality (AR) device, or a mixed reality (MR) device), a personal computer, a laptop computer, a video server, a television, or other device. In some aspects, the apparatus comprises a mobile device (e.g., a mobile telephone or so-called "smart phone"). In some aspects, the apparatus further includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit the reconstructed video frame over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 18 is a flowchart illustrating an example of a process for processing video data, in accordance with some examples;

FIG. 19 is a flowchart illustrating another example of a process for processing video data, in accordance with some examples.

DETAILED DESCRIPTION

Figure 1:
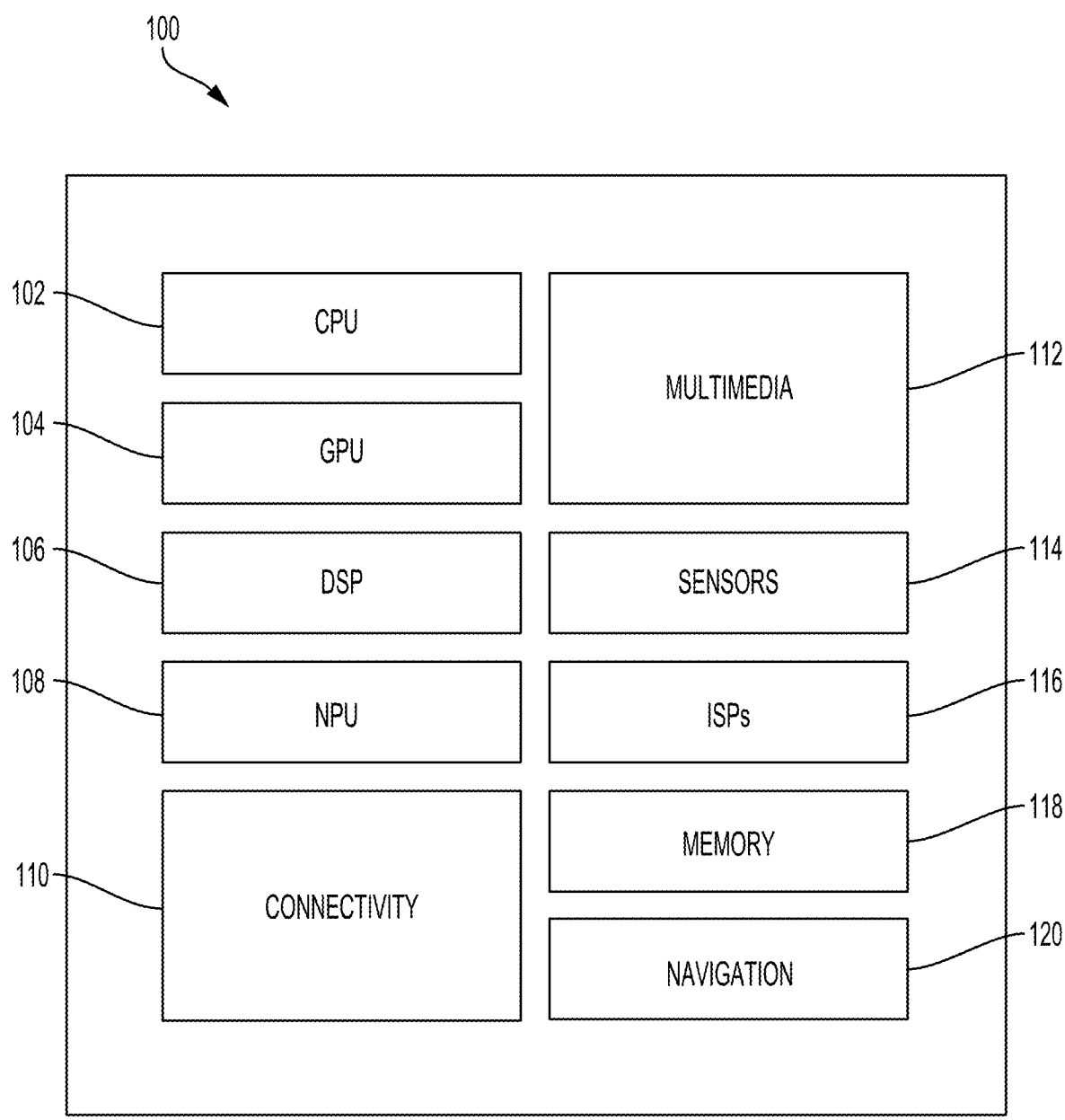
FIG. 1 illustrates an example implementation of a system-on-a-chip (SOC)

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Various techniques can be used to code video data. Video coding can be performed according to a particular video coding standard. Example video coding standards include high-efficiency video coding (HEVC), advanced video coding (AVC), moving picture experts group (MPEG) coding, and versatile video coding (VVC). Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

Techniques are described herein for performing video coding using one or more machine learning (ML) systems. ML is a subset of artificial intelligence (AI). ML systems include algorithms and statistical models that computer systems can use to perform various tasks by relying on patterns and inference, without the use of explicit instructions. One example of a ML system is a neural network (also referred to as an artificial neural network), which may be composed of an interconnected group of artificial neurons (e.g., neuron models). Neural networks may be used for various applications and/or devices, such as image analysis and/or computer vision applications, Internet Protocol (IP) cameras, Internet of Things (IoT) devices, autonomous vehicles, service robots, among others.

Individual nodes in the neural network may emulate biological neurons by taking input data and performing simple operations on the data. The results of the simple operations performed on the input data are selectively passed on to other neurons. Weight values are associated with each vector and node in the network, and these values constrain how input data is related to output data. For example, the input data of each node may be multiplied by a corresponding weight value, and the products may be summed. The sum of the products may be adjusted by an optional bias, and an activation function may be applied to the result, yielding the node's output signal or "output activation" (sometimes referred to as an activation map or feature map). The weight values may initially be determined by an iterative flow of training data through the network (e.g., weight values are established during a training phase in which the network learns how to identify particular classes by their typical input data characteristics).

Different types of neural networks exist, such as recurrent neural networks (RNNs), multilayer perceptron (MLP) neural networks, convolutional neural networks (CNNs), among others. RNNs work on the principle of saving the output of a layer and feeding this output back to the input to help in predicting an outcome of the layer. In MLP neural networks, data may be fed into an input layer, and one or more hidden layers provide levels of abstraction to the data. Predictions may then be made on an output layer based on the abstracted data. MLPs may be particularly suitable for classification prediction problems where inputs are assigned a class or label. Convolutional neural networks (CNNs) are a type of feed-forward artificial neural network. Convolutional neural networks may include collections of artificial neurons that each have a receptive field (e.g., a spatially localized region of an input space) and that collectively tile an input space. Convolutional neural networks have numerous applications. In particular, CNNs have broadly been used in the area of pattern recognition and classification.

In layered neural network architectures (referred to as deep neural networks when multiple hidden layers are present), the output of a first layer of artificial neurons becomes an input to a second layer of artificial neurons, the output of a second layer of artificial neurons becomes an input to a third layer of artificial neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

FIG. 1 illustrates an example implementation of a system-on-a-chip (SOC) 100, which may include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU 102, DSP 106, and/or GPU 104. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the CPU 102 may comprise code to search for a stored multiplication result in a lookup table (LUT) corresponding to a multiplication product of an input value and a filter weight. The instructions loaded into the CPU 102 may also comprise code to disable a multiplier during a multiplication operation of the multiplication product when a lookup table hit of the multiplication product is detected. In addition, the instructions loaded into the CPU 102 may comprise code to store a computed multiplication product of the input value and the filter weight when a lookup table miss of the multiplication product is detected.

SOC 100 and/or components thereof may be configured to perform video compression and/or decompression (also referred to as video encoding and/or decoding, collectively referred to as video coding) using machine learning techniques according to aspects of the present disclosure discussed herein. By using deep learning architectures to perform video compression and/or decompression, aspects of the present disclosure can increase the efficiency of video compression and/or decompression on a device. For example, a device using the video coding techniques described can compress video more efficiently using the machine learning based techniques, can transmit the compressed video to another device, and the other device can decompress the compressed video more efficiently using the machine learning based techniques described herein.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
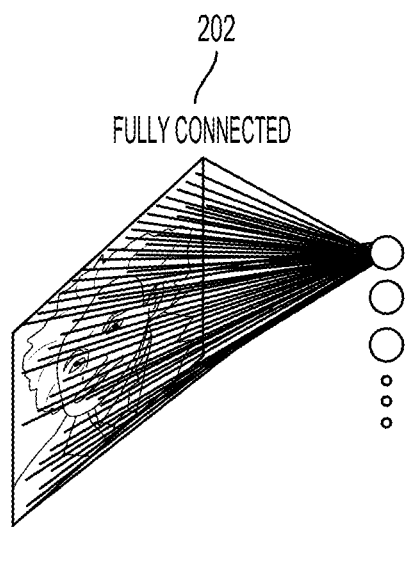
FIG. 2A illustrates an example of a fully connected neural network.
Figure 2B:
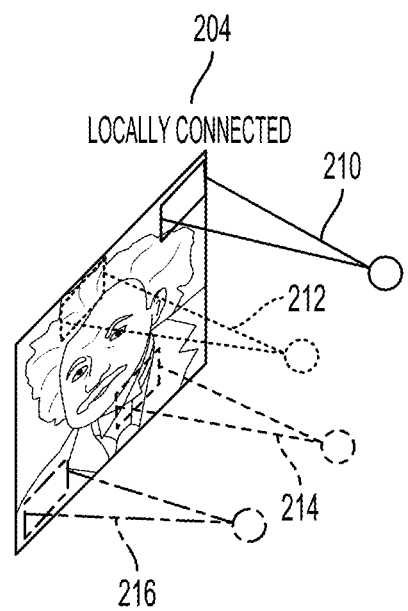
FIG. 2B illustrates an example of a locally connected neural network.

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
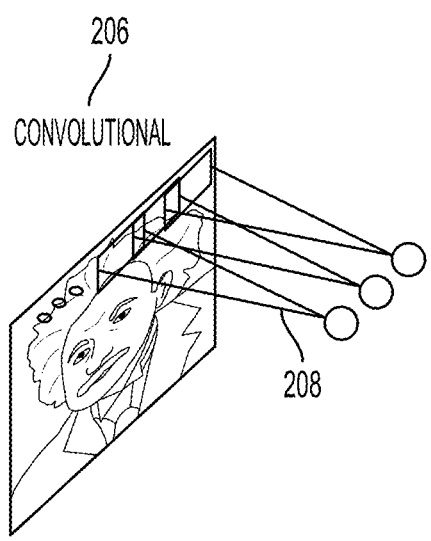
FIG. 2C illustrates an example of a convolutional neural network.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

One type of convolutional neural network is a deep convolutional network (DCN).

Figure 2D:
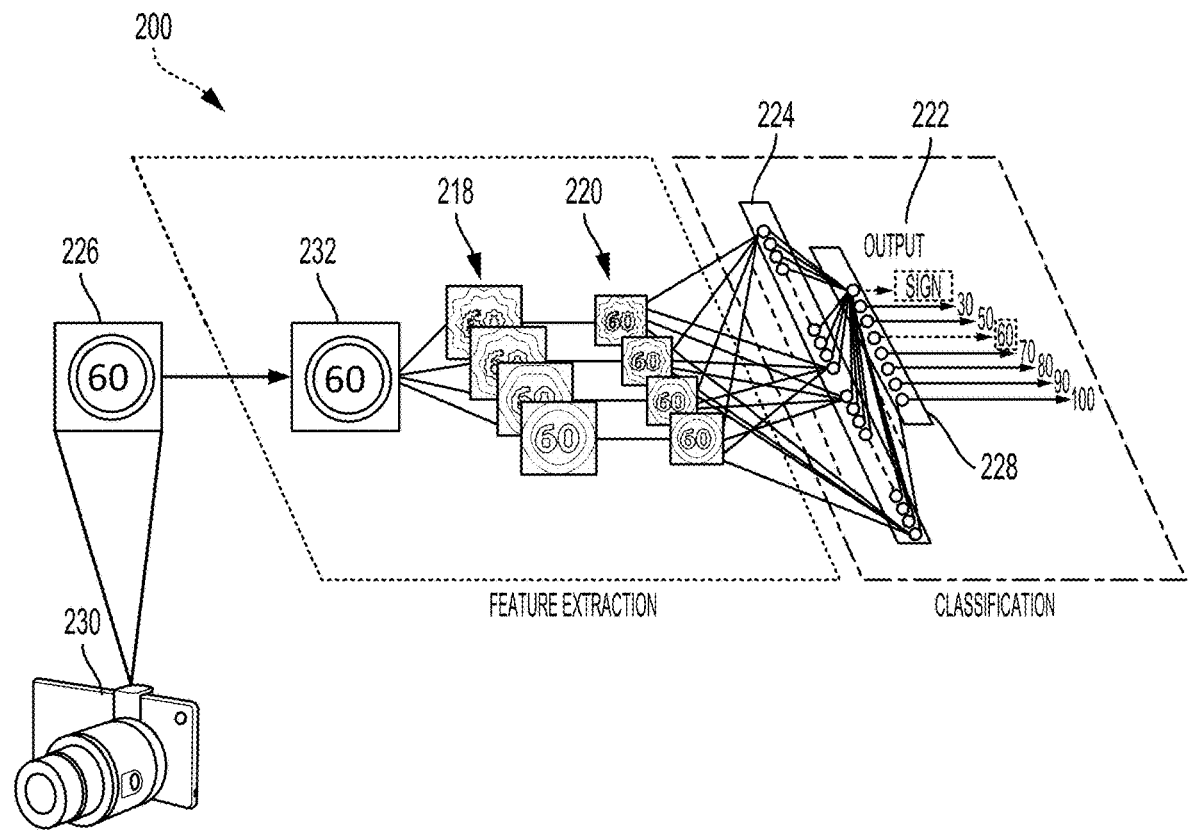
FIG. 2D illustrates a detailed example of a deep convolutional network (DCN) designed to recognize visual features from an image.

FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
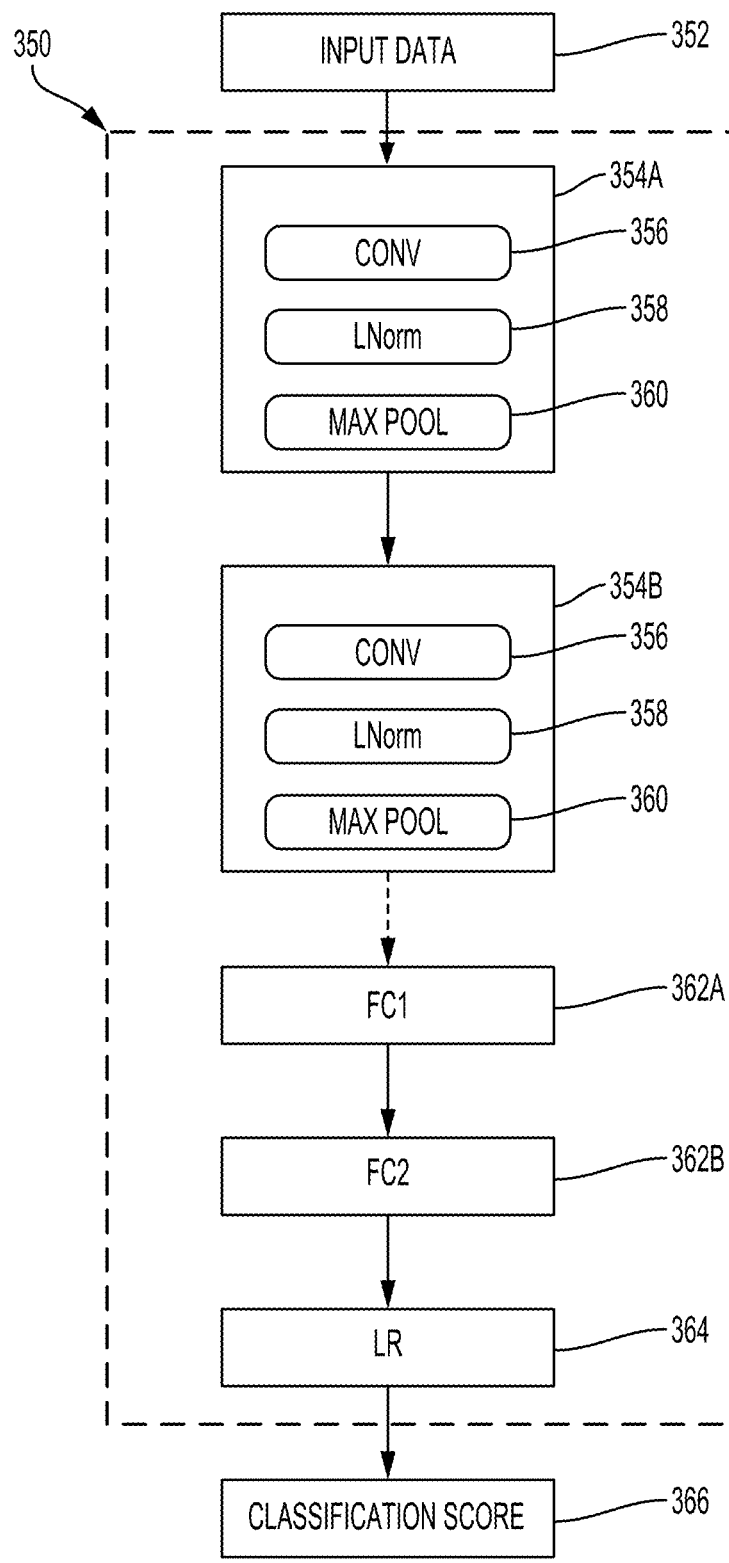
FIG. 3 is a block diagram illustrating a deep convolutional network (DCN)

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers, such as layer 362A (labeled "FC1") and layer 362B (labeled "FC2"). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

As noted above, digital video data can include large amounts of data, which can place a significant burden on communication networks as well as on devices that process and store the video data. For instance, recording uncompressed video content generally results in large file sizes that greatly increase as the resolution of the recorded video content increases. In one illustrative example, uncompressed 16-bit per channel video recorded in 1080p/24 (e.g. a resolution of 1920 pixels in width and 1080 pixels in height, with 24 frames per second captured) may occupy 12.4 megabytes per frame, or 297.6 megabytes per second. Uncompressed 16-bit per channel video recorded in 4K resolution at 24 frames per second may occupy 49.8 megabytes per frame, or 1195.2 megabytes per second.

Network bandwidth is another constraint for which large video files can become problematic. For example, video content is oftentimes delivered over wireless networks (e.g., via LTE, LTE-Advanced, New Radio (NR), WiFi™, Bluetooth, or other wireless networks), and can make up a large portion of consumer internet traffic. Despite advances in the amount of available bandwidth in wireless networks, it may still be desirable to reduce the amount of bandwidth used to deliver video content in these networks.

Because uncompressed video content can result in large files that may involve sizable memory for physical storage and considerable bandwidth for transmission, video coding techniques can be utilized to compress and then decompress such video content.

To reduce the size of video content—and thus the amount of storage involved to store video content—and the amount of bandwidth involved in delivering video content, various video coding techniques can be performed according to a particular video coding Standard, such as HEVC, AVC, MPEG, VVC, among others. Video coding often uses prediction methods such as inter-prediction or intra-prediction, which take advantage of redundancies present in video images or sequences. A common goal of video coding techniques is to compress video data into a form that uses a lower bit rate, while avoiding or minimizing degradations in the video quality. As the demand for video services grows and new video services become available, coding techniques with better coding efficiency, performance, and rate control are needed.

In general, an encoding device encodes video data according to a video coding Standard to generate an encoded video bitstream. In some examples, an encoded video bitstream (or "video bitstream" or "bitstream") is a series of one or more coded video sequences. The encoding device can generate coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. In HEVC, the slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy (IBC) prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements. Transform coding is described in more detail below.

According to the HEVC standard, transformations may be performed using TUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoding device.

Once the pictures of the video data are partitioned into CUs, the encoding device predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

After performing prediction using intra- and/or inter-prediction, the encoding device can perform transformation and quantization. For example, following prediction, the encoding device may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoding device can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some embodiments, a TU may be used for the transform and quantization processes implemented by the encoding device. A given CU having one or more PUs may also include one or more TUs. As described in further detail below, the residual values may be transformed into transform coefficients using the block transforms, and then may be quantized and scanned using TUs to produce serialized transform coefficients for entropy coding.

The encoding device may perform quantization of the transform coefficients.

Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoding device. In some examples, the encoding device may utilize a predefined scan order to scan the quantized transform coefficients to produce a serialized vector that can be entropy encoded. In some examples, encoding device may perform an adaptive scan. After scanning the quantized transform coefficients to form a vector (e.g., a one-dimensional vector), the encoding device may entropy encode the vector. For example, the encoding device may use context adaptive variable length coding, context adaptive binary arithmetic coding, syntax-based context-adaptive binary arithmetic coding, probability interval partitioning entropy coding, or another suitable entropy encoding technique.

The encoding device can store the encoded video bitstream and/or can send the encoded video bitstream data over a communications link to a receiving device, which can include a decoding device. The decoding device may decode the encoded video bitstream data by entropy decoding (e.g., using an entropy decoder) and extracting the elements of one or more coded video sequences making up the encoded video data. The decoding device may then rescale and perform an inverse transform on the encoded video bitstream data. Residual data is then passed to a prediction stage of the decoding device. The decoding device then predicts a block of pixels (e.g., a PU) using intra-prediction, inter-prediction, IBC, and/or other type of prediction. In some examples, the prediction is added to the output of the inverse transform (the residual data). The decoding device may output the decoded video to a video destination device, which may include a display or other output device for displaying the decoded video data to a consumer of the content.

Video coding systems and techniques defined by the various video coding Standards (e.g., the HEVC video coding techniques described above) may be able to retain much of the information in raw video content and may be defined a priori based on signal processing and information theory concepts. However, while the predefined compression algorithms may be applicable generally (e.g., to any type of video content), these predefined video coding techniques may lack certain characteristics that are beneficial in a network-based environment or other type of environment. For example, video coding systems should be able to implement low-latency operation. However, video coding systems and related techniques that operate according to existing video coding Standards encode and transmit video in batches of several frames (sometimes referred to as a Group-of-Pictures or GoP), and are thus required to wait for the accumulation of the frames of a batch (e.g., a GoP) to be transmitted. Such batch-based video coding results in higher latency than could be achieved using frame-by-frame coding and transmission. Further, such video coding systems and techniques lack the ability to adjust the GoP size at runtime (i.e., the frequency of transmitting the full frame, rather than just residual information) depending on the characteristics of the video, leading to less optimal operating points in the rate-distortion space.

Methods (also referred to as processes), systems, apparatuses, and computer-readable media (collectively referred to as "systems and techniques") are described herein that perform video coding (video compression/encoding and/or video decompression/decoding) using a recurrent neural network architecture that provides feedback to the encoder stage and/or to the decoder stage. In some examples, the systems and techniques can utilize multiple neural network systems to compress and decompress video frames or images. For instance, a first neural network system can act as an image encoder (e.g., an image autoencoder) to compress a full frame without using motion compensation based on one or more prior frames, similar to an intra-predicted frame (also referred to as an I-frame). A second neural network system (e.g., a recurrent autoencoder) can be used for encoding and/or decoding frames using motion compensation based on one or more prior frames and using residual information (similar to an inter-predicted frame, such as a uni-predicted frame using a single reference frames (also referred to as a P-frame) or a bi-predicted frame using two reference frames (referred to as a B-frame)).

The motion compensation performed by the second neural network system can be used to determine the data of a current frame by describing how the pixels from a previously reconstructed frame move into new positions in the current frame along with residual information. The second neural network system can include one or more recurrent layers (e.g., in a decoder portion of the second neural network) that store state information, which can be fed back to certain layers of the neural network at future time steps. For example, the second neural network system can process a frame $x_t$ at a current time step t, and can feed back state information associated with processing the frame $x_t$ from one or more recurrent layers to the second neural network system for processing a subsequent frame $x_{t+1}$ at a next time step t+1. The one or more recurrent layers can be part of one or more recurrent neural networks (RNNs), one or more gated recurrent units (GRUs), one or more Long short-term memory (LS™) networks, one or more ConvRNNs, one or more ConvGRUs, one or more ConvLSTMs, any combination thereof, and/or other types of neural network architectures.

Various aspects related to such neural network systems are described herein. For example, in some implementations, the second neural network can have a fully autoregressive conditional structure that can operate on a frame-by-frame basis (referring only to a previous frame) with no time-backward frame dependencies (e.g., such as the GoP structure used in traditional Standard-based video codecs). In some cases, the output of the second neural network can include a previous reconstructed frame warped by motion compensation, a residual, a reconstructed frame, motion estimation (e.g., optical flow, block motion vector, or adaptive convolution kernel), any combination thereof, and/or other output. Feedback information from a first time step (e.g., time step t) can be provided from the decoder to the encoder and/or to the decoder at a later time step (e.g., at time step t+1). The feedback can be used to represent the errors introduced in the decoding stage, which can be used by the encoder to compensate for those errors. The information that is provided from the decoder of the previous time step to the encoder at the next time step can include one or more previously reconstructed frame(s), one or more previously reconstructed motion estimation(s), one or more previously reconstructed residual(s), one or more previously recurrent state(s) of the decoder (e.g., from one or more recurrent layers of the decoder), any combination thereof, and/or other output. A recurrent state of a recurrent layer can also be referred to herein as a hidden state.

By coding (e.g., coding/compressing and decoding/decompressing) video content using the one or more recurrent-based neural network systems and techniques described herein, aspects of the present disclosure can provide for video encoding and decoding mechanisms that generate compressed video content having video bitrate and/or quality approaching or exceeding that of conventional, a priori defined video compression algorithms (e.g., HEVC, VVC, MPEG-4, among others). In some cases, video encoding and decoding mechanisms that use the recurrent-based neural network systems and techniques described herein may be adaptable to various use cases by retraining the neural network(s). Further, aspects of the present disclosure may provide for the autonomous generation of video encoders and decoders without requiring large amounts of syntax to be transmitted with the bitstream.

Figure 4:
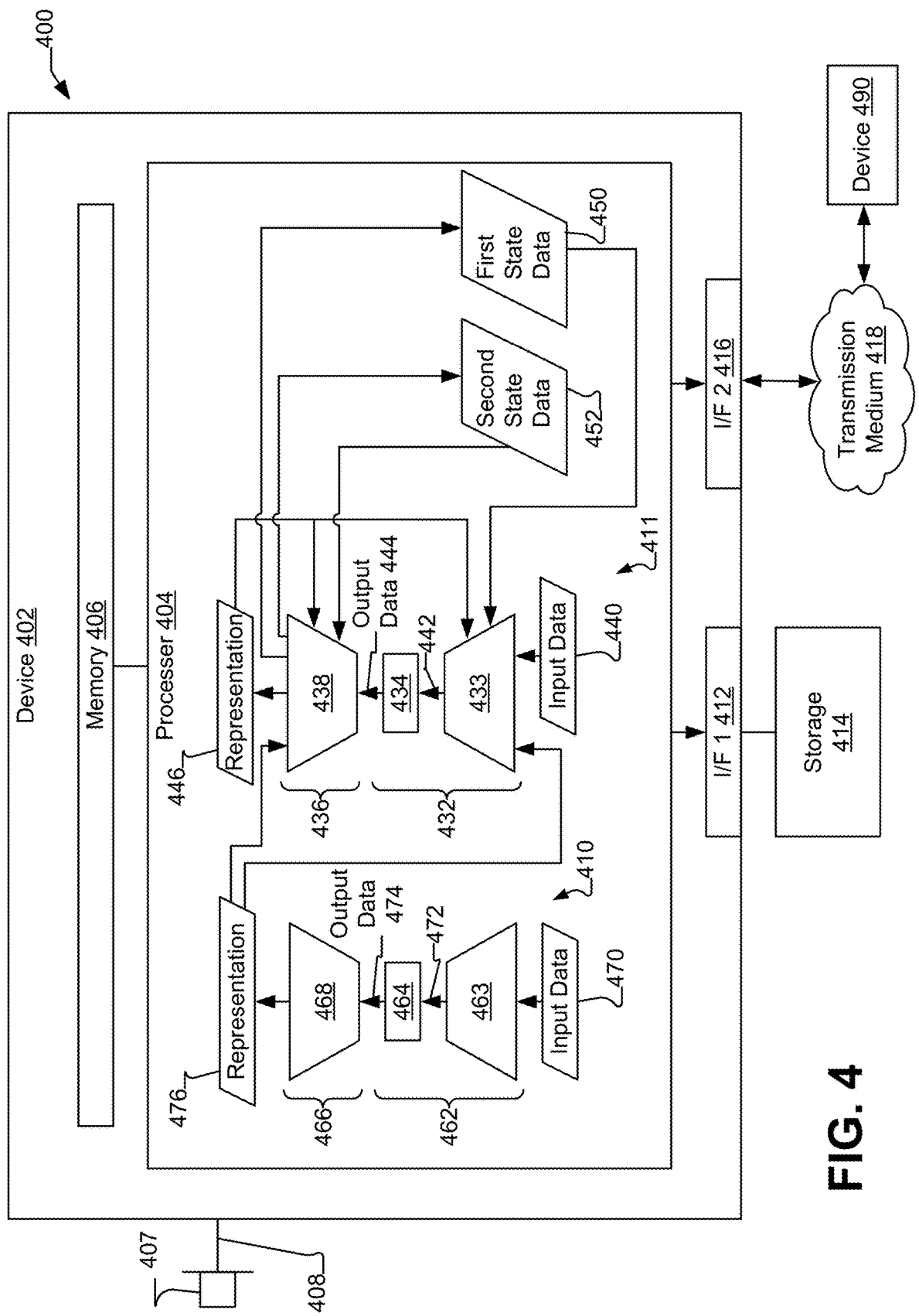
FIG. 4 is a diagram illustrating an example of a system including a device operable to perform video coding using recurrent-based neural networks, in accordance with some examples.

FIG. 4 depicts a system 400 that includes a device 402 configured to perform video encoding and decoding. The device 402 is coupled to a camera 407 and a storage medium 414 (e.g., a data storage device). In some implementations, the camera 407 is configured to provide the image data 408 (e.g., a video data stream) to the processor 404 for encoding by a first neural network system 410 and/or a second neural network system 411. In some implementations, the device 402 can be coupled to and/or can include multiple cameras (e.g., a dual-camera system, three cameras, or other number of cameras). In some cases, the device 402 can be coupled to a microphone and/or other input device (e.g., a keyboard, a mouse, a touch input device such as a touchscreen and/or touchpad, and/or other input device). In some examples, the camera 407, the storage medium 414, microphone, and/or other input device can be part of the device 402.

The device 402 is also coupled to a second device 490 via a transmission medium 418, such as one or more wireless networks, one or more wired networks, or a combination thereof. For example, the transmission medium 418 can include a channel provided by a wireless network, a wired network, or a combination of a wired and wireless network. The transmission medium 418 may form part of a packet-based network, such as a local area network, a wide-area network, or a global network such as the Internet. The transmission medium 418 may include routers, switches, base stations, or any other equipment that may be useful to facilitate communication from the source device to the receiving device. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

The device 402 includes one or more processors (referred to herein as "processor") 404 coupled to a memory 406, a first interface ("I/F 1") 412, and a second interface ("I/F 2") 416. The processor 404 is configured to receive image data 408 from the camera 407, from the memory 406, and/or from the storage medium 414. The processor 404 is coupled to the storage medium 414 via the first interface 412 (e.g., via a memory bus) and is coupled to the transmission medium 418 via the second interface 416 (e.g., a network interface device, a wireless transceiver and antenna, one or more other network interface devices, or a combination thereof).

The processor 404 includes a first neural network system 410 that includes an encoder portion 462 and a decoder portion 466, and a second neural network system 411 that includes an encoder portion 432 and a decoder portion 436. In some implementations, the neural network system 410 and/or the neural network system 411 can include one or more auto-encoders. The encoder portion 462 is configured to receive input data 470 and to process the input data 470 to generate output data 474 at least partially based on the input data 470. Similarly, the encoder portion 432 is configured to receive input data 440 and to process the input data 440 to generate output data 444 at least partially based on the input data 440. In some cases, the encoder portion 432 of the neural network system 411 is configured to generate the output data 444 based on the input data 440 and also based on the first state data 450, as described further below. In some cases, the encoder portion 432 is configured to generate the output data 444 at a current time step t based on the input data 440 and the first state data 450, and also based on the representation 476 generated by the decoder portion 466 of the neural network system 410 at a previous time step t−1 (e.g., when processing input data 470 at the previous time step t−1), as described further below. In some cases, the encoder portion 432 is configured to generate the output data 444 at a current time step t based on the input data 440 and the first state data 450, and also based on the representation 446 generated by the decoder portion 436 of the neural network system 411 at a previous time step t−1 (e.g., when processing input data 440 at the previous time step t−1), as described further below.

In some implementations, the encoder portion 462 of the neural network system 410 is configured to perform lossy compression of the input data 470 to generate the output data 474, so that the output data 474 has fewer bits than the input data 470. The encoder portion 462 can be trained to compress input data 470 (e.g., video frames) without using motion compensation based on any previous representations (e.g., one or more previously reconstructed frames). For example, the encoder portion 462 can compress a video frame using video data only from that video frame, and without using any data of previously reconstructed frames. Video frames processed by the encoder portion 462 can be referred to herein as intra-predicted frame (I-frames). In some examples, I-frames can be generated using traditional video coding techniques (e.g., according to HEVC, VVC, MPEG-4, or other video coding Standard). In such examples, the processor 404 may include or be coupled with a video coding device (e.g., an encoding device) configured to perform block-based intra-prediction, such as that described above with respect to the HEVC Standard. In such examples, the neural network system 410 may be excluded from the processor 404.

In some implementations, the encoder portion 432 of the neural network system 411 is configured to perform lossy compression of the input data 440 to generate the output data 444, resulting in the output data 444 having fewer bits than the input data 440. The encoder portion 432 can be trained to compress input data 440 (e.g., video frames) using motion compensation based on previous representations (e.g., one or more previously reconstructed frames). For example, the encoder portion 432 can compress a video frame using video data from that video frame and using data of previously reconstructed frames. Video frames processed by the encoder portion 462 can be referred to herein as intra-predicted frame (P-frames). The motion compensation can be used to determine the data of a current frame by describing how the pixels from a previously reconstructed frame move into new positions in the current frame along with residual information. Examples of motion compensation techniques are described below with respect to FIG. 6.

Figure 5A:
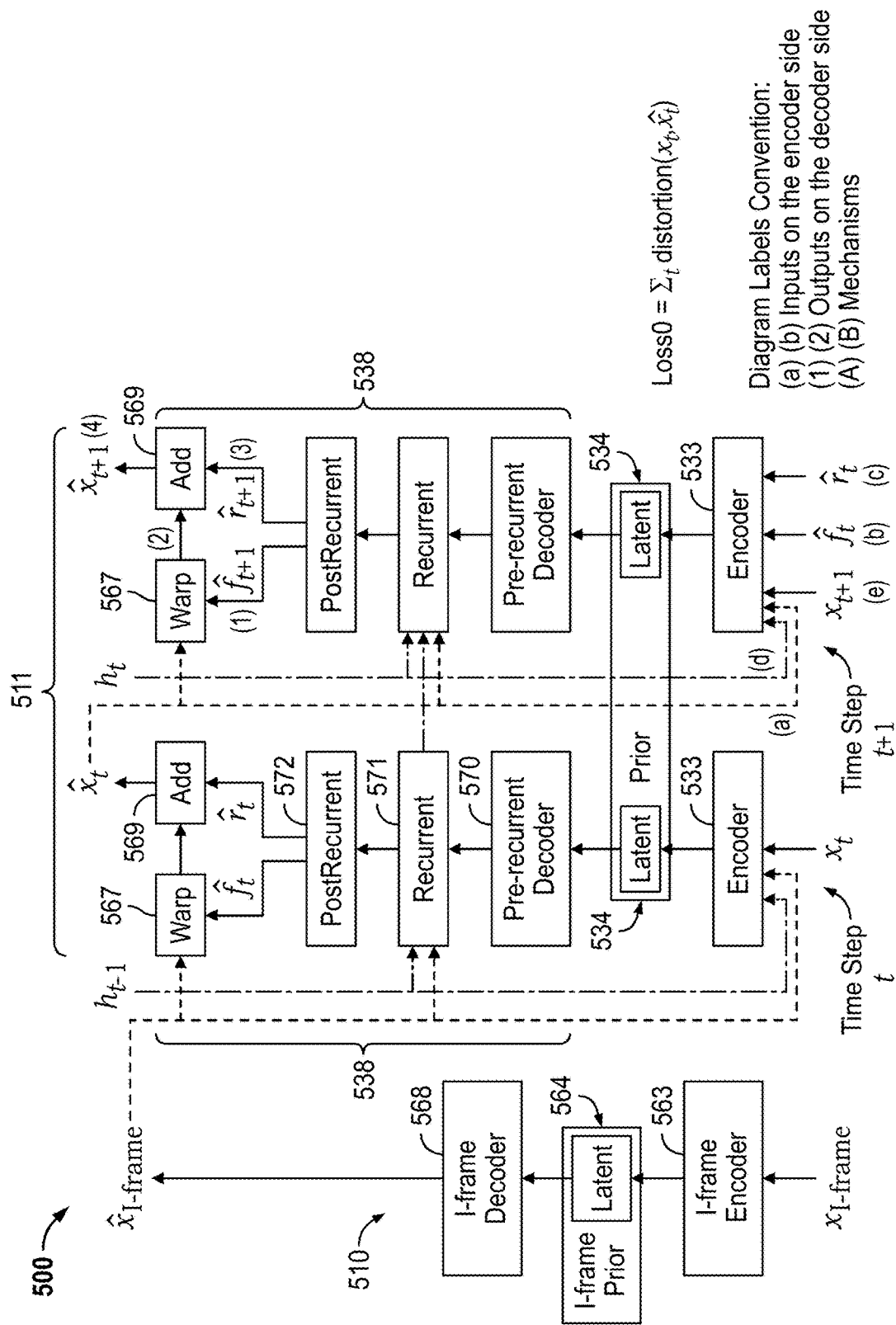
FIG. 5A is a diagram illustrating an example of neural network systems used for video coding, in accordance with some examples.
Figure 15:
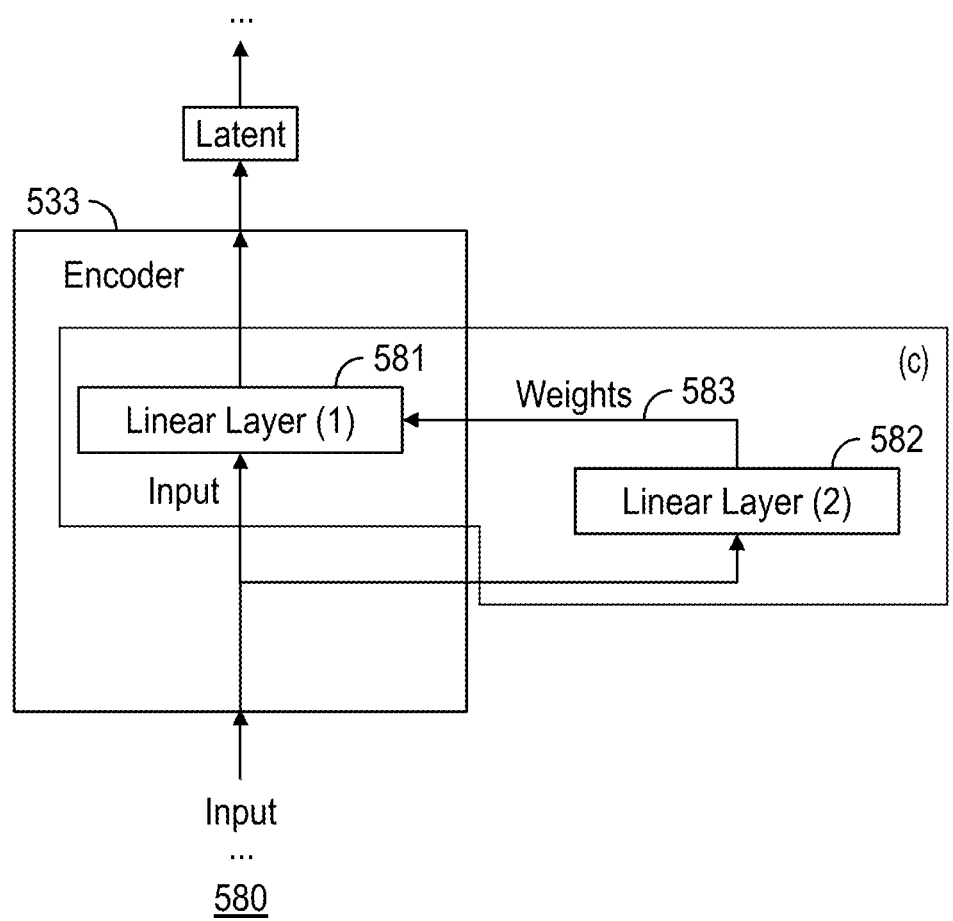
FIG. 15 is a diagram illustrating an example of using an additional neural network layer in a recurrent-based neural network system, in accordance with some examples.

In a particular implementation, the encoder portion 462 of the neural network system 410 includes a neural network 463 and a quantizer 464. The neural network 463 can include one or more convolutional neural networks (CNNs), one or more fully-connected neural networks, one or more gated recurrent units (GRUs), any combination thereof, and/or other types of neural network architectures that generate(s) intermediate data 472. The intermediate data 472 is input to the quantizer 464. The encoder portion 432 of the neural network system 411 includes a neural network 433 and a quantizer 434. The neural network 433 includes one or more CNNs, one or more fully-connected neural networks, one or more GRUs, any combination thereof, and/or other types of neural network architectures that generate(s) intermediate data 442 that is then input to the quantizer 434. Examples of components that may be included in the encoder portion 462 and the encoder portion 432 are illustrated in FIG. 5A FIG. 15.

The quantizer 464 is configured to perform quantization and in some cases entropy coding of the intermediate data 472 to produce the output data 474. The output data 474 can include the quantized (and in some cases entropy coded) data. Similarly, the quantizer 434 is configured to perform quantization and in some cases entropy coding of the intermediate data 442 to produce the output data 444. The output data 444 includes the quantized (and in some cases entropy coded) data. The quantization operations performed by the quantizer 464 and the quantizer 434 can the same operations, which can result in the generation of quantized codes (or data representing quantized codes generated by the neural network system 410 and/or the neural network system 411) from the intermediate data 472 and from the intermediate data 442. The quantization codes (or data representing the quantized codes) can also be referred to as latent codes or as a latent. The entropy model that is applied to a latent can be referred to herein as a "prior". In some examples, the quantization and entropy coding operations can be performed using existing quantization and entropy coding operations that are performed when encoding and/or decoding video data according to existing video coding Standards. In some examples, can be done by the neural network system 410 and/or the neural network system 411. For instance, the neural network system 410 and/or the neural network system 411 can be trained using supervised training, with residual data being used as input and quantized codes and entropy codes being used as known output (labels) during the training.

The decoder portion 466 of the neural network system 410 is configured to receive the output data 474 (e.g., directly from quantizer 464 and/or from the storage medium 414) and to process the output data 474 to generate a representation 476 of the input data 470 at least partially based on the output data 474. Similarly, the decoder portion 436 of the neural network system 411 is configured to receive the output data 444 (e.g., directly from quantizer 434 and/or from the storage medium 414) and to process the output data 444 to generate a representation 446 of the input data 440 at least partially based on the output data 444. In some cases, the decoder portion 436 is configured to generate the representation 446 based on the output data 444 and second state data 452, as described further below. In some cases, the decoder portion 436 is configured to generate the representation 446 at a current time step t based on the output data 444 and the second state data 452, and also based on the representation 476 generated by the decoder portion 466 of the neural network system 410 at a previous time step t−1 (e.g., when processing input data 470 at the previous time step t−1), as described further below. In some cases, the decoder portion 436 is configured to generate the representation 446 at a current time step t based on the output data 444 and the second state data 452, and also based on the representation 446 generated by the decoder portion 436 at a previous time step t−1 (e.g., when processing input data 440 at the previous time step t−1), as described further below.

In a particular implementation, the decoder portion 466 of the neural network system 410 includes a neural network 468 that may include one or more CNNs, one or more fully-connected neural networks, one or more GRUs, any combination thereof, and/or other types of neural network architectures. The decoder portion 436 of the neural network system 411 includes a neural network 438 that may include one or more CNNs, one or more fully-connected neural networks, one or more GRUs, one or more Long short-term memory (LS™) networks, one or more ConvRNNs, one or more ConvGRUs, one or more ConvLSTMs, any combination thereof, and/or other types of neural network architectures. Examples of components that may be included in the decoder portion 436 are illustrated in FIG. 5A-FIG. 15.

The neural network 438 of the decoder portion 436 has a recurrent component, which can include one or more RNNs, GRUs, LSTMs, ConvRNNs, ConvGRUs, ConvLSTMs, any combination thereof, and/or other neural network architecture with one or more recurrent layers. The recurrent component (e.g., one or more recurrent layers) can provide the first state data 450 and the second state data 452. The first state data 450 and the second state data 452 correspond to a state of the neural network 438 resulting from generation of the representation 446 for one set of input data 440. The first state data 450 and the second state data 452 (e.g., associated with a time step t, such as during processing of a current video frame) are provided as input to the encoder portion 432 and the decoder portion 436, respectively, for a next sequential set of input data 440 (e.g., at a next time step t+1, such as during processing of a next video frame processed after the current video frame). In an illustrative example, the state of the decoder portion 436 represented in the state data 450, 452 includes one or more values of nodes within the neural network 438. As a result, the neural network system 411 operates as a recurrent-based neural network system that can be trained to reduce (e.g., minimize) a difference between the input data 440 and the representation 446 of the input data 440 over a training set (e.g., a training set of input images and output images). In some implementations, the first state data 450 matches the second state data 452 (e.g., the first state data 450 is the same as the second state data 452). In other implementations the first state data 450 can differ from the second state data 452.

As shown in FIG. 4, feedback information is provided from the decoder portion 436 of the neural network system 411 to the encoder portion 432 of the neural network system 411. The feedback can be used to represent the errors introduced in the decoding stage, which can be used by the encoder portion 432 to compensate for those errors. The information from a previous time step t−1 that can be provided from the decoder portion 436 to the encoder at the next time step t can include one or more of previously reconstructed frame(s) (denoted as $\hat{x}_t$), previously reconstructed motion estimation(s), previously reconstructed residual(s), and/or previous recurrent state(s) from the neural network 438 of the decoder portion 436. For instance, for a sequence of video frames that may exhibit temporal correlation, the previous recurrent state of the decoder portion 436 associated with a frame of the video can be provided as an input to both the encoder portion 432 and the decoder portion 436 when processing the next frame of the video. Using such a recurrent state, as well as the other feedback information, can increase the compression ratio (e.g., the number of bits in the input data 440 as compared to the number of bits in the output data 444), and thus increase coding efficiency, by enabling the encoder portion 432 to account for errors encountered by the decoder portion 436. As an illustrative example, the state data 450, 452 can function as an input that enables the encoder portion 432 and the decoder portion 436 to generate a prediction for a next frame of a series of frames, and the encoder portion 432 can encode the residual (e.g., a difference between the next frame and the prediction of the next frame) as the output data 444 at a reduced bit rate as compared to encoding the output data 444 without taking into account the history of the decoder portion 436. As a result, encoded data can be stored using a reduced amount of storage space, transmitted using a reduced amount of network bandwidth or at a higher transmission rate, or any combination thereof.

The processor 404 is configured to send the output data 444 to at least one of the transmission medium 418 or the storage medium 414. For example, the output data 444 may be stored at the storage medium 414 for later retrieval and decompression by the decoder portion 436 to generate the representation 446 of the input data 440 as reconstructed data, such as for playback of video data that has been encoded/compressed to generate the output data 444. In some implementations, the output data 444 may be decoded at another decoder device that matches the decoder portion 436 (e.g., in the device 402 or in another device) to generate the representation 446 of the input data 440 as reconstructed data. As another example, the second device 490 may include a decoder that matches (or substantially matches) the decoder portion 436, and the output data 444 may be transmitted via the transmission medium 418 to generate the representation 446 of the input data 440 as reconstructed data at the second device 490.

The components of the system 400 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

While the system 400 is shown to include certain components, one of ordinary skill will appreciate that the system 400 can include more or fewer components than those shown in FIG. 4. For example, the system 400 can also include, or can be part of a computing device that includes, an input device and an output device (not shown). In some implementations, the system 400 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 4.

In some implementations, the system 300 can be implemented locally by and/or included in a computing device. For example, the computing device can include a mobile device, a personal computer, a tablet computer, a virtual reality (VR) device (e.g., a head-mounted display (HMD) or other VR device), an augmented reality (AR) device (e.g., an HMD, AR glasses, or other AR device), a wearable device, a server (e.g., in a software as a service (SaaS) system or other server-based system), a television, and/or any other computing device with the resource capabilities to perform the techniques described herein.

In one example, the neural network system 411 (and in some cases the neural network system 410) can be incorporated into a portable electronic device that includes the memory 406 coupled to the processor 404 and configured to store instructions executable by the processor 404, and a wireless transceiver coupled to an antenna and to the processor 404 and operable to transmit the output data 444 to a remote device.

FIG. 5A is a diagram illustrating a system including neural network system 510 (as an example of the neural network system 410 in FIG. 4) and a neural network system 511 (as an example of the neural network system 411). The I-frame encoder 563 of the neural network system 510 can include a neural network (e.g., including one or more CNNs) that is trained to encode or compress a video frame using video data only from that video frame, without performing motion compensation based on data of previously reconstructed frames. For example, as shown in FIG. 5A, the I-frame encoder 563 receives a video frame $x_{I\text{-}frame}$ as input and encodes or compresses the video frame $x_{I\text{-}frame}$ using only the data included in the video frame $x_{I\text{-}frame}$. The I-frame encoder 563 can encode or compress the video frame $x_{I\text{-}frame}$ to generate intermediate data (e.g., intermediate data 472). In some cases, the intermediate data can include data representing a residual, which represents the difference between a prediction of the video frame $x_{I\text{-}frame}$ and the actual input video frame $x_{I\text{-}frame}$.

The quantizer 564 of the neural network system 510 is an example of the quantizer 464 shown in FIG. 4. The quantizer 564 generates a latent from the intermediate data output from the I-frame encoder 563. In some cases, the latent includes quantized codes representing a quantized version of the compressed video frame $x_{I\text{-}frame}$ (e.g., a quantized version of the residual). In some cases, the latent can include neural network data (e.g., a node's activation map or feature map) that represents quantized codes. The quantizer 564 also includes an I-frame prior. The I-frame prior can include or represent an entropy model that is applied to the latent to produce entropy codes or neural network data (e.g., a node's activation map or feature map) that represents the entropy codes. The quantizer 564 generates output data (e.g., output data 474) that is output to the I-frame decoder 568 and/or to storage (e.g., storage medium 414) for later retrieval. For example, the output data from the quantizer 564 can be transmitted to the device 490 over the transmission medium 418.

The I-frame decoder 568 of the neural network system 510 processes the output data from the quantizer 564 to generate a reconstructed frame $\hat{x}_{I\text{-}frame}$. In some implementations, the I-frame encoder 563, the quantizer 564, and the I-frame decoder 568 can be implemented using a single neural network or multiple neural networks that is/are trained together end-to-end. The loss function Loss0=$\Sigma_t$ distortion($x_t$, $\hat{x}_t$) shown in FIG. 5A can be used to train the single neural network using supervised learning techniques with a training set that includes input images and reconstructed output images. Further details regarding neural network training is described below with respect to the neural network system 511. In some implementations, neural networks of the I-frame encoder 563, the I-frame decoder 568, and the quantizer 564 can be trained separately.

As noted above, in some implementations, the I-frame encoder 563, the I-frame decoder 568, and the quantizer 564 can be perform traditional video coding techniques (e.g., according to HEVC, VVC, MPEG-4, or other video coding Standard) to generate I-frames. For instance, a video coding device (that can perform video encoding and decoding) can be configured to perform block-based intra-prediction to generate I-frames according to the HEVC Standard or other video coding Standard.

The neural network system 511 can be referred to in some cases as a P-frame autoencoder, due to the neural network system 511 using motion compensation techniques to perform video coding (e.g., encoding and/or decoding). The encoder 533 of the neural network system 511 can include a neural network (e.g., including one or more CNNs) that is trained to encode or compress a video frame using motion compensation based on data of one or more previously reconstructed frames. The neural network system 511 is shown in FIG. 5A at two time steps, t and t+1. The time step t shown in FIG. 5A illustrates a first time step of operation of the neural network system 511 after an I-frame is generated (e.g., $\hat{x}_{I\text{-}frame}$). At time step t, the encoder 533 receives a video frame $x_t$ and the previously-reconstructed frame $x_{I\text{-}frame}$ as input, and encodes the video frame $x_t$ by performing motion compensation to determine an amount of motion between the video frame $x_t$ and the video frame $x_{I\text{-}frame}$.

Various types of motion compensation can be performed by the encoder 533. For example, the encoder 533 can perform a block-based motion compensation (similar to that done by video coding Standards, such as HEVC, VVC, MPEG-4, among others), an optical flow based motion compensation, a dynamic (or adaptive) convolution based motion compensation, any combination thereof, and/or other types of motion compensation. Various motion compensation options are described below with respect to FIG. 6.

As a result of encoding the video frame $x_t$, the encoder 533 can generate intermediate data (e.g., intermediate data 442). In some cases, the intermediate data can include data representing a residual and motion data representing the amount of motion between the video frame $x_t$ and the video frame $x_{I\text{-}frame}$. The residual can represent the difference between a prediction of the video frame $x_t$ and the actual input video frame $x_t$. The motion data representing the amount of motion between the video frame $x_t$ and the video frame $x_{I\text{-}frame}$ can be conceptualized as being analogous to a motion vector in traditional video coding techniques (e.g., HEVC, VVC, among others).

The quantizer 534 of the neural network system 511 is an example of the quantizer 434 shown in FIG. 4. The quantizer 534 generates a latent from the intermediate data output from the encoder 533. In some cases, the latent includes quantized codes representing a quantized version of the encoded video frame $x_t$ (e.g., a quantized version of the residual and a quantized version of the motion data). In some cases, the latent can include neural network data (e.g., a node's activation map or feature map) that represents quantized codes. The quantizer 534 also includes a prior, which can include or represent an entropy model that is applied to the latent to produce entropy codes or neural network data (e.g., a node's activation map or feature map) that represents the entropy codes. The quantizer 534 generates output data (e.g., output data 444) that is output to the decoder 538 and/or to storage (e.g., storage medium 414) for later retrieval. For example, the output data from the quantizer 534 can be transmitted to the device 490 over the transmission medium 418.

The decoder 538 of the neural network system 511 processes the output data to generate a reconstructed frame $\hat{x}_t$. The decoder 538 can receive the output data from the quantizer 534, from storage (e.g., storage medium 414), or from another device over a transmission medium (e.g., transmission medium 418). As shown in FIG. 5A, the decoder 538 includes recurrent layers or components, including one or more pre-recurrent decoder layers 570, one or more recurrent layers 571, and one or more post-recurrent layers 572. The one or more recurrent layers 571 can store state information, and can feed back the state information to certain layers of the decoder 538 and/or the encoder 533 at subsequent time steps (e.g., at time step t+1, as shown in FIG. 5A). The feedback provided to earlier layers in the neural network system 511 at later time steps provides the neural network system 511 with a type of memory. The one or more pre-recurrent decoder layers 570 and the one or more post-recurrent layers 572 can include forward layers that pass information forward through the other layers of the network in one direction, whereas the one or more recurrent layers can pass information in a forward direction and/or in a backward direction through feedback, as noted above.

The recurrent state of the decoder 538 is denoted in FIG. 5A as h. The recurrent state $h_{t-1}$ shown in FIG. 5A, which corresponds to the time step t−1 at which the neural network system 510 generated an I-frame, can be initiated with one or more 0 values (e.g., due to the neural network system 510 not comprising any recurrent layers). The recurrent state $h_t$ in FIG. 5A represents the recurrent state of the decoder 538 at time stamp t. The recurrent state $h_t$ can include the neural network information from the one or more recurrent layers 571. For example, the neural network information can include an activation map or feature map (e.g., generated based on multiplication of the weights of the one or more recurrent layers 571 multiplied by the data being passed through the decoder 538). As shown in FIG. 5A, the recurrent state $h_t$ is passed as feedback to the one or more recurrent layers 571 and to the encoder 533 at the next time step t+1.

Based on processing of the output data, the one or more post-recurrent layers 572 of the decoder 538 output reconstructed motion estimation data $\hat{f}_t$ and reconstructed residual data $\hat{r}_t$. In some cases, the reconstructed motion estimation data $\hat{f}_t$ can include optical flow data (e.g., a displacement vector), dynamic convolution data (e.g., a matrix or kernel for data convolution), or block-based motion data (e.g., a motion vector), as described below with respect to FIG. 6. The reconstructed motion estimation data $\hat{f}_t$ is used by a warping engine 567 of the decoder 538 to warp (e.g., by performing motion compensation) the previously reconstructed frame $\hat{x}_{I\text{-}frame}$, resulting in the generation of a warped frame. For example, the pixels of the previously reconstructed frame $\hat{x}_{I\text{-}frame}$ can be moved to new locations or otherwise modified according to the reconstructed motion estimation data $\hat{f}_t$. The warped frame output by the warping engine 567 is output to an adder engine 569. The adder engine 569 adds (or combines) the warped frame to the reconstructed residual data $\hat{r}_t$ to generate a reconstructed frame $\hat{x}_t$ for the current time step t.

In addition to the recurrent state information (e.g., recurrent state $h_t$), the reconstructed frame $\hat{x}_t$ can also be fed back to the neural network system 511 for a next time step t+1 of operation. For example, as shown in FIG. 5A, the reconstructed frame $\hat{x}_t$ and the recurrent state $h_t$ are provided as input to the encoder 533. In some cases, as shown in FIG. 5A, the previously reconstructed motion estimation data $\hat{f}_t$ and the previously reconstructed residual data $\hat{r}_t$ can also be fed back as input to the encoder 533 at the next time step t+1 of operation. At time step t+1, the encoder 533 can process a current input video frame $\hat{x}_{t+1}$, the previously reconstructed frame $\hat{x}_t$, the recurrent state $h_t$, the previously reconstructed motion estimation data $\hat{f}_t$, and the previously reconstructed residual data $\hat{r}_t$ to generate a coded version of the current input video frame $\hat{x}_{t+1}$. The quantizer 534 can quantize the coded video data to generate the latent, and can perform entropy coding (using the prior) on the latent using the prior to generate output data.

The one or more pre-recurrent decoder layers 570, the one or more recurrent layers 571, and the one or more post-recurrent layers 572 of the decoder 538 can process the output data for the current time step t+1 and can output reconstructed motion estimation data $\hat{f}_{t+1}$ and reconstructed residual data $\hat{r}_{t+1}$. The warping engine 567 of the decoder 538 can warp (e.g., by performing motion compensation) the previously reconstructed frame $\hat{x}_t$ to generate a warped frame for the current time step t+1. The adder engine 569 can add the warped frame to the reconstructed residual data $\hat{r}_{t+1}$ to generate a reconstructed frame $\hat{x}_{t+1}$ for the current time step t+1.

The reconstructed frame $\hat{x}_{t+1}$, the recurrent state $h_{t+1}$, the reconstructed motion estimation data $\hat{f}_{t+1}$, and the reconstructed residual data $\hat{r}_{t+1}$ can be fed back as input to the encoder 533 at the next time step t+2 of operation. The neural network system 511 can continue the motion estimation based coding process for a video sequence of frames on a frame-by-frame basis until a next I-frame is needed (e.g., for random access to a certain time point in the video, to reset any motion error that may accumulate, etc.). When an I-frame is needed, the next frame of video in the video sequence can be encoded by the neural network system 510.

Figure 5B:
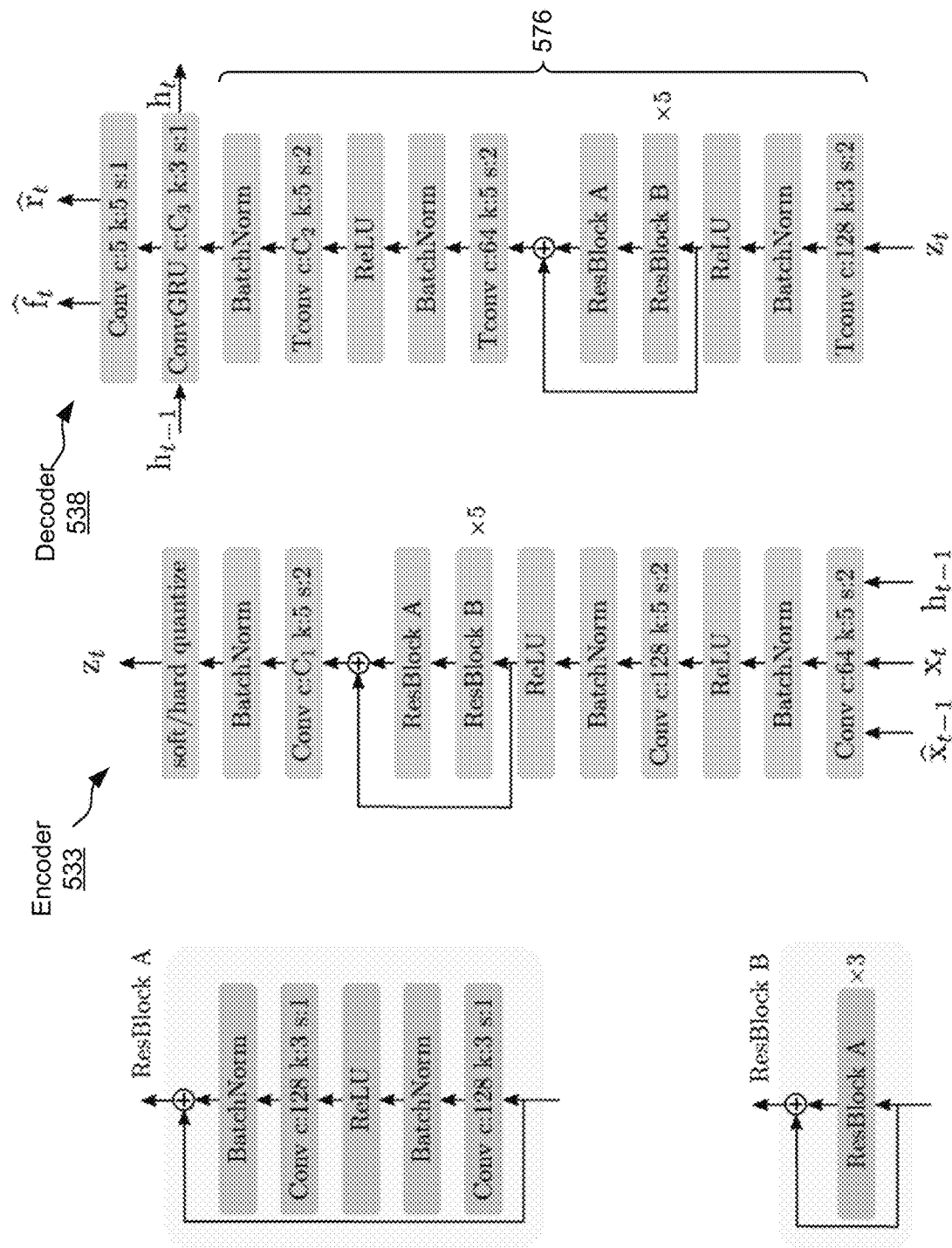
FIG. 5B is a diagram illustrating a detailed example of a recurrent-based neural network used for video coding, in accordance with some examples.

In some implementations, the encoder 533, the quantizer 534, and the decoder 538 can be implemented using a single neural network or multiple neural networks that is/are trained together end-to-end. FIG. 5B is a diagram illustrating an example of a neural network architecture that can be used for the neural network system 511. In some implementations, a similar neural network architecture as that shown in FIG. 5B can be used for the neural network system 510, but without the recurrent layers (e.g., the ConvGRU layer).

As shown in FIG. 5B, the input to the encoder 533 includes a current frame $\hat{x}_t$ that is to be encoded by the encoder 533, a previously reconstructed frame $\hat{x}_{t-1}$ (e.g., from the neural network system 510 or from the neural network system 511), and the previous recurrent state $h_{t+1}$. Other inputs that can be provided to the encoder include the previously reconstructed motion estimation data $\hat{f}_{t-1}$, and the previously reconstructed residual data $\hat{r}_{t-1}$.

The inputs are provided to a first convolutional layer (denoted as Conv c:64 k:5 s:2, where c is the number of channels (e.g., kernels or filters), k is the kernel size, and s is the stride associated with a given convolutional layer). A convolutional layer processes the input data in a convolutional manner, such as by processing a region of nodes (e.g., pixels of the current frame $\hat{x}_t$) called a receptive field. The convolutional layer can be made up of one or more kernels (also referred to as a filter), where each kernel can correspond to a different activation or feature map and each convolutional iteration of a kernel being a node or neuron of the convolutional layer. For example, the region of the current frame $\hat{x}_t$ that a kernel covers at each convolutional iteration would be the receptive field for the kernel. In one illustrative example, if the frame $\hat{x}_t$ includes a 28×28 array, and each kernel (and corresponding receptive field) is a 5×5 array (where k=5), then there will be 24×24 nodes in the convolutional layer. It is noted that video frames typically have a larger resolution than 28×28, such as 1,920×1,080 for 1080p video. Each connection between a node and a receptive field for that node learns a weight and, in some cases, an overall bias such that each node learns to analyze its particular local receptive field in the input. Each node of the convolutional layer can have the same weights and in some case bias (called a shared weight and a shared bias). For instance, the kernel has an array of weights (numbers) and the same depth as the input. In one example, a kernel can have a depth of 3 for the current frame $\hat{x}_t$ according to three color components (e.g., red (R), green (G), and blue (B) color components) of the frame $\hat{x}_t$.

The convolutional nature of the convolutional layer is due to each node of the convolutional layer being applied to its corresponding receptive field. For example, a kernel of the convolutional layer can begin in the top-left corner of the array of the current frame $\hat{x}_t$ and can convolve around the frame $\hat{x}_t$. As noted above, each convolutional iteration of the kernel can be considered a node or neuron of the convolutional layer. At each convolutional iteration, the values of the kernel are multiplied with a corresponding number of the original pixel values of the image (e.g., the 5×5 kernel array is multiplied by a 5×5 array of input pixel values at the top-left corner of the frame $\hat{x}_t$ array). The multiplications from each convolutional iteration can be summed together to obtain a total sum for that iteration or node. The process is next continued at a next location in the frame $\hat{x}_t$ according to the receptive field of a next node in the convolutional layer. For example, a kernel can be moved by a stride amount (denoted by s in FIG. 5B) to the next receptive field. The stride amount can be set to 1, 2, or other suitable amount. For example, if the step amount is set to 1, the kernel will be moved to the right by 1 pixel at each convolutional iteration. Processing the kernel at each unique location of the input volume produces a number representing the kernel results for that location, resulting in a total sum value being determined for each node of the convolutional layer.

The mapping from the input layer to the convolutional hidden layer 622a is referred to as an activation map (or feature map). The activation map includes a value for each node representing the kernel results at each locations of the input volume. The activation map can include an array that includes the various total sum values resulting from each iteration of the kernel on the input volume (e.g., the current frame $\hat{x}_t$). For example, the activation map will include a 24×24 array if a 5×5 kernel is applied to each pixel (a step amount of 1) of a 28×28 input frame. The convolutional layer can include several activation maps in order to identify multiple features of an input. For example, using three activation maps, the convolutional layer can detect three different kinds of features, with each feature being detectable across the entire input.

A normalization layer and a non-linear layer can be applied after the first convolutional layer. The normalization layer can be used (e.g., during training) to normalize the inputs in a hidden layer (e.g., a convolutional layer) to nonlinearities. One illustrative example of a normalization layer includes BatchNorm, as used in the architecture of FIG. 5B. In one illustrative example, BatchNorm can normalize a hidden layer $z^k$ as follows:

$$\tilde{z}^k = \frac{z^k - E[z^k]}{\sqrt{V[z^k]}},\qquad \text{Equation (1).}$$

Where E[x] is the first moment (e.g., mean or expected value) of x and V[x] is the second moment (e.g., variance) of x.

The non-linear layer can be used to introduce non-linearity to a system that has been computing linear operations. One illustrative example of a non-linear layer is a rectified linear unit (ReLU), as used in the architecture of FIG. 5B. A ReLU layer can apply the function f(x)=max(0, x) to all of the values in the input volume, which changes all the negative activations to 0. The ReLU can thus increase the non-linear properties of the neural network without affecting the receptive fields of the convolutional layers.

The output of the first ReLU is provided to a second set of convolutional, BatchNorm, and ReLU layers. The output of the second ReLU is provided to a first residual layer (ResBlock B), which provides its output to a second residual layer (ResBlock A). Details of the ResBlock A and the ResBlock B are also shown in FIG. 5B. The output of the ResBlock A is combined (or added) with the output of the second ReLU, and the combined output is provided to a third convolutional layer. The output of the third convolutional layer is provided to a third BatchNorm layer, which outputs data to a quantization layer (denoted as soft/hard quantize). The soft/hard quantize layer outputs one or more quantized (and in some cases entropy coded) coefficients $z_t$. The one or more coefficients $z_t$ can be stored in some cases, and can be provided to the decoder 538 in some cases.

The input to the decoder 538 is the one or more coefficients $z_t$. The one or more coefficients $z_t$ are processed by a first convolutional layer (denoted as Tconv c:128 k:3 s:2), followed by a first BatchNorm layer and a first ReLu layer. The output of the first ReLU is provided to a first residual layer (ResBlock B), which provides its output to a second residual layer (ResBlock A). The output of the ResBlock A is combined (or added) with the output of the first ReLU layer, and the combined output is provided to a second convolutional layer (denoted as Tconv c:64 k:5 s:2). The second convolutional layer is followed by a second BatchNorm layer and a second ReLu layer, which outputs data to a third convolutional layer (denoted as Tconv c:$C_2$ k:5 s:2) followed by a third BatchNorm layer. The output of the third BatchNorm layer is provided to a recurrent layer (denoted as ConvGRU c:$C_3$ k:3 s:1). As shown, another input to the recurrent layer is the previous recurrent state $h_{t-1}$ for a previous time step t−1, and the output of the recurrent layer includes a recurrent state for a current time step t. The output of the recurrent layer is provided to a final convolutional layer (denoted as Conv c:5 k:5 s:1), which outputs the reconstructed motion estimation data $\hat{f}_t$ and reconstructed residual data $\hat{r}_t$.

As noted above, the warping engine 567 of the decoder 538 can warp (e.g., by performing motion compensation) a previously reconstructed frame $\hat{x}_{t-1}$ to generate a warped frame for a current time step t, and the adder engine 569 can add the warped frame to the reconstructed residual data $\hat{r}_t$ to generate a reconstructed frame $\hat{x}_t$ for the current time step t. In some implementations, the warping engine 567 and/or the adder engine 569 can be part of the neural network system 511 (e.g., implemented using one or more convolutional layers, one or more normalization layers, one or more non-linear layers, one or more residual blocks, or other neural network layers), such as in the configuration of the encoder shown in FIG. 7. In some implementations, the warping engine 567 and/or the adder engine 569 can be components that are outside of the neural network system 511. For instance, in such implementations, warping and the addition are non-learned operators, in which case these operations are not done using neural networks or other machine learning systems.

The neural network system 511 can be trained using any suitable machine learning training technique. In one illustrative example, supervised learning techniques can be used to train the neural network system 511. For instance, a backpropagation training process can be used to adjust the weights (and in some cases other parameters, such as biases) of the nodes of the neural network. Backpropagation can include a forward pass, a loss function, a backward pass, and a weight update. The forward pass, loss function, backward pass, and parameter update is performed for one training iteration. The process can be repeated for a certain number of iterations for each set of training data until the weights of the parameters of the neural network system 511 are accurately tuned.

In one illustrative example, training data used to train the neural network system 511 can include video frames $x_t$ (which are not encoded/uncompressed) as input and reconstructed video frames $\hat{x}_t$ (reconstructed versions of the input video frames $x_t$) as a known output. The forward pass can include passing an input video frame through the neural network. The weights may be initially randomized before the neural network is trained. For a first training iteration for the neural network system, the output may include values that do not give preference to any particular output, as the weights have not yet been calibrated. For example, the output can include a data representation (e.g., a vector, tensor, etc.) with values representing a reconstructed video frame $\hat{x}_t$. After the first training iteration using the initial weights, the reconstructed video frame $\hat{x}_t$ will likely not resemble the corresponding input frame $x_t$.

A loss function can be used to analyze error in the output. In the example using uncompressed video frames as input and reconstructed video frames $\hat{x}_t$ as the known output, the loss function Loss0=$\Sigma_t$ distortion($x_t$, $\hat{x}_t$) shown in FIG. 5A can be used to train the neural network system 511. Other loss functions can be used when other training data is used.

One example of another loss function includes a mean squared error (MSE), defined as $E_{total}=\Sigma\frac{1}{2}(\text{target}-\text{output})^2$. The MSE calculates the sum of one-half times the actual answer minus the predicted (output) answer squared.

The loss (or error) may be high for the first training video frames, since the actual output values (a reconstructed frame output by the network) may be much different than the predicted output (a known reconstructed version of the input frame). A goal of training is to minimize the amount of loss for the predicted output. The neural network can perform a backward pass by determining which inputs (weights) most contributed to the loss of the neural network, and can adjust the weights so the loss decreases and is eventually minimized. A derivative of the loss with respect to the weights (denoted as dL/dW, where W are the weights at a particular layer) can be computed to determine the weights that most contributed to the loss of the neural network. For example, the weights can be updated so they change in the opposite direction of the gradient. The weight update can be denoted as $$w = w_i - \eta \frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates. The neural network system 511 can continue to be trained in such a manner until a desired output is achieved. In some cases, the neural network system 510 can be trained in a similar manner.

Figure 6:
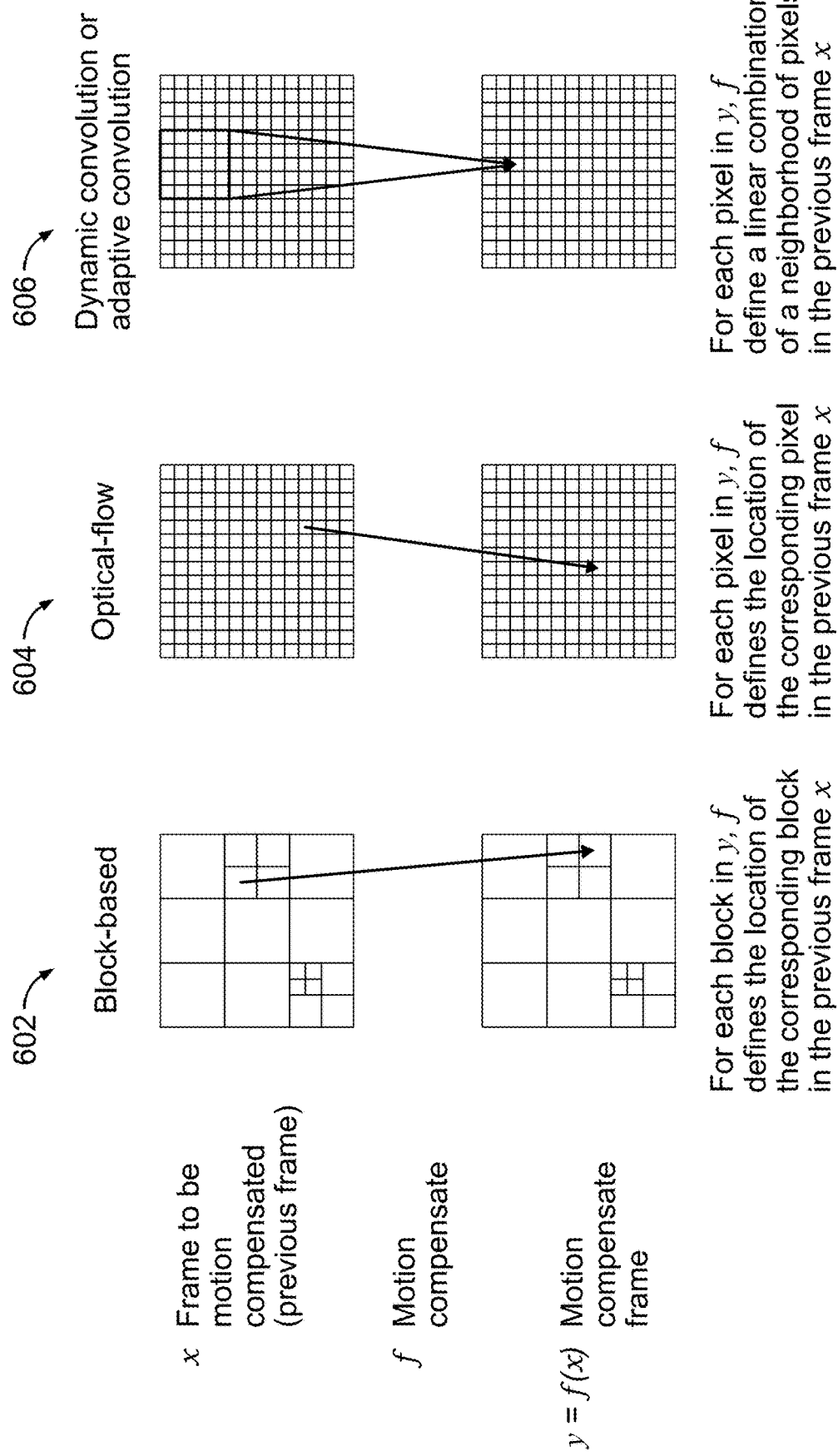
FIG. 6 is a diagram illustrating examples of motion estimation and motion compensation techniques, in accordance with some examples.

FIG. 6 is a diagram illustrating different types of motion estimations that can be performed by a motion compensation based neural network system (e.g., neural network system 411 and/or neural network system 511). In FIG. 6, the term x denotes the frame from which motion can be estimated (corresponding to a previous frame when a current frame is being encoded), the term f denotes a motion estimation, and the term y denotes a motion compensated frame that can be computed as follows: y=f(x).

One type of motion estimation that can performed is a block-based motion estimation technique 602. The block-based motion estimation can be performed on a block-by-block basis. For instance, for each block in the current frame y (to be motion compensated), the motion estimation f defines the location of the corresponding block in the previous frame x. In one illustrative example, the motion estimation f can include a motion vector that indicates the displacement (e.g., the horizontal and vertical displacement) of a block in the current frame y relative to the corresponding block in the previous frame x. A block from the previous frame x can be determined to correspond to a block in the current frame y by determining a similarity (e.g., a similarity in pixel values) between the blocks.

Another type of motion estimation that can performed is an optical flow motion estimation technique 604. The optical flow motion estimation can be performed on a pixel-by-pixel basis. For instance, for each pixel in the current frame y, the motion estimation f defines the location of the corresponding pixel in the previous frame x. The motion estimation f for each pixel can include a vector indicates a movement of the pixel between the frames. In some cases, optical flow maps (also referred to as motion vector maps) can be generated based on the computation of the optical flow vectors between frames. The optical flow maps can include an optical flow vector for each pixel in a frame, where each vector indicates a movement of a pixel between the frames. In one illustrative example, the optical flow vector for a pixel can be a displacement vector (e.g., indicating horizontal and vertical displacements, such as x- and y-displacements) showing the movement of a pixel from a first frame to a second frame. An encoder of a motion compensation based neural network system (e.g., the encoder 533) can encode or compress the optical flow vector for each pixel in the current frame y, or can encode or compress the optical flow map when optical flow maps are used. The motion estimation information (f̂) that is reconstructed by a decoder of a motion compensation based neural network system (e.g., decoder 538) can include a group of reconstructed optical flow vectors (e.g., one for each pixel in a frame) or a reconstructed optical flow map.

In some cases, the optical flow map can include vectors for less than all pixels in a frame. For instance, a dense optical flow can be computed between adjacent frames to generate optical flow vectors for each pixel in a frame, which can be included in a dense optical flow map. In another example, Lucas-Kanade optical flow can be computed between adjacent frames to generate optical flow vectors for some or all pixels in a frame, which can be included in an optical flow map. Any other suitable type of optical flow technique or algorithm can be used to determine optical flow between frames. Each optical flow map can include a 2D vector field, with each vector being a displacement vector showing the movement of points from a first frame to a second frame.

As noted above, an optical flow vector or optical flow maps can be computed between adjacent frames of a sequence of frames (e.g., between sets of adjacent frames $x_t$ and $x_{t-1}$). Two adjacent frames can include two directly adjacent frames that are consecutively captured frames or two frames that are a certain distance apart (e.g., within two frames of one another, within three frames of one another, or other suitable distance) in a sequence of frames. Optical flow from frame $x_{t-1}$ to frame $x_t$ can be given by $Ox_{t-1}, x_t$=dof$(x_{t-1}, x_t)$, where dof is the dense optical flow. Any suitable optical flow process can be used to generate the optical flow maps. In one illustrative example, a pixel I(x, y, t) in the frame $x_{t-1}$ can move by a distance ($\Delta x, \Delta y$) in the next frame $x_t$. Assuming the pixels are the same and the intensity does not change between the frame $x_{t-1}$ and the next frame $x_t$, the following equation can be assumed:

$$I(x,y,t)=I(x+\Delta x, y+\Delta y, t+\Delta t) \qquad \text{Equation (2).}$$

By taking the Taylor series approximation of the right-hand side of Equation (2) above, and then removing common terms and dividing by $\Delta t$, an optical flow equation can be derived:

$$f_x u + f_y v + f_t = 0, \qquad \text{Equation (3),}$$

where:

$$f_x = \frac{df}{dx};$$

$$f_y = \frac{df}{dy};$$

$$f_t = \frac{df}{dt};$$

$$u = \frac{\Delta x}{\Delta t}; \text{ and}$$

$$v = \frac{\Delta y}{\Delta t}.$$

Using the optical flow Equation (3), the image gradients $f_x$ and $f_y$ can be found along with the gradient along time (denoted as $f_t$). The terms u and v are the x and y components of the velocity or optical flow of I(x, y, t), and are unknown. An estimation technique may be needed in some cases when the optical flow equation cannot be solved with two unknown variables. Any suitable estimation technique can be used to estimate the optical flow. Examples of such estimation techniques include differential methods (e.g., Lucas-Kanade estimation, Horn-Schunck estimation, Buxton-Buxton estimation, or other suitable differential method), phase correlation, block-based methods, or other suitable estimation technique. For instance, Lucas-Kanade assumes that the optical flow (displacement of the image pixel) is small and approximately constant in a local neighborhood of the pixel I, and solves the basic optical flow equations for all the pixels in that neighborhood using the least squares method.

Another type of motion estimation that can performed is a dynamic convolution (also referred to as adaptive convolution) motion estimation technique 606. The dynamic convolution motion estimation can be performed on a pixel-by-pixel basis. For instance, for each pixel in the current frame y, the motion estimation f defines a linear combination of a neighborhood of pixels in the previous frame x. As shown in FIG. 6, for a pixel at a pixel location in the current frame y, a kernel or matrix is defined around a neighborhood of pixels surrounding a pixel at a same pixel location in the previous frame x. The example dynamic convolution motion estimation in FIG. 6 is performed for a pixel at a location (2, 7) (corresponding to (row number, column number)) in the current frame y, where the top-left pixel location in the current frame y is at location (0, 0). The kernel is defined around a pixel at location (2, 7) in the previous frame x. For example, as shown, a kernel of size 5×5 is applied to a neighborhood of pixels surrounding the pixel at location (2, 7) in the previous frame x.

Each entry in the kernel or matrix can include a number (a set of 5×5 numbers in the example of FIG. 6). The set of numbers in the kernel can describe how to combine the pixels from the neighborhood of pixels that surround the pixel at the pixel location in the previous frame x corresponding to the same pixel location of the pixel that is being reconstructed in the newly reconstructed frame (the current frame y). An encoder of a motion compensation based neural network system (e.g., the encoder 533) can compress the representation of the numbers from the kernel (e.g., the 25 numbers from the 5×5 kernel from FIG. 6) for each pixel in the current frame y. The motion estimation information ($\hat{f}$) that is reconstructed by a decoder of a motion compensation based neural network system (e.g., decoder 538) can include a reconstructed kernel for each pixel, which can be used for performing data convolution to warp a previously reconstructed frame.

Figure 7:
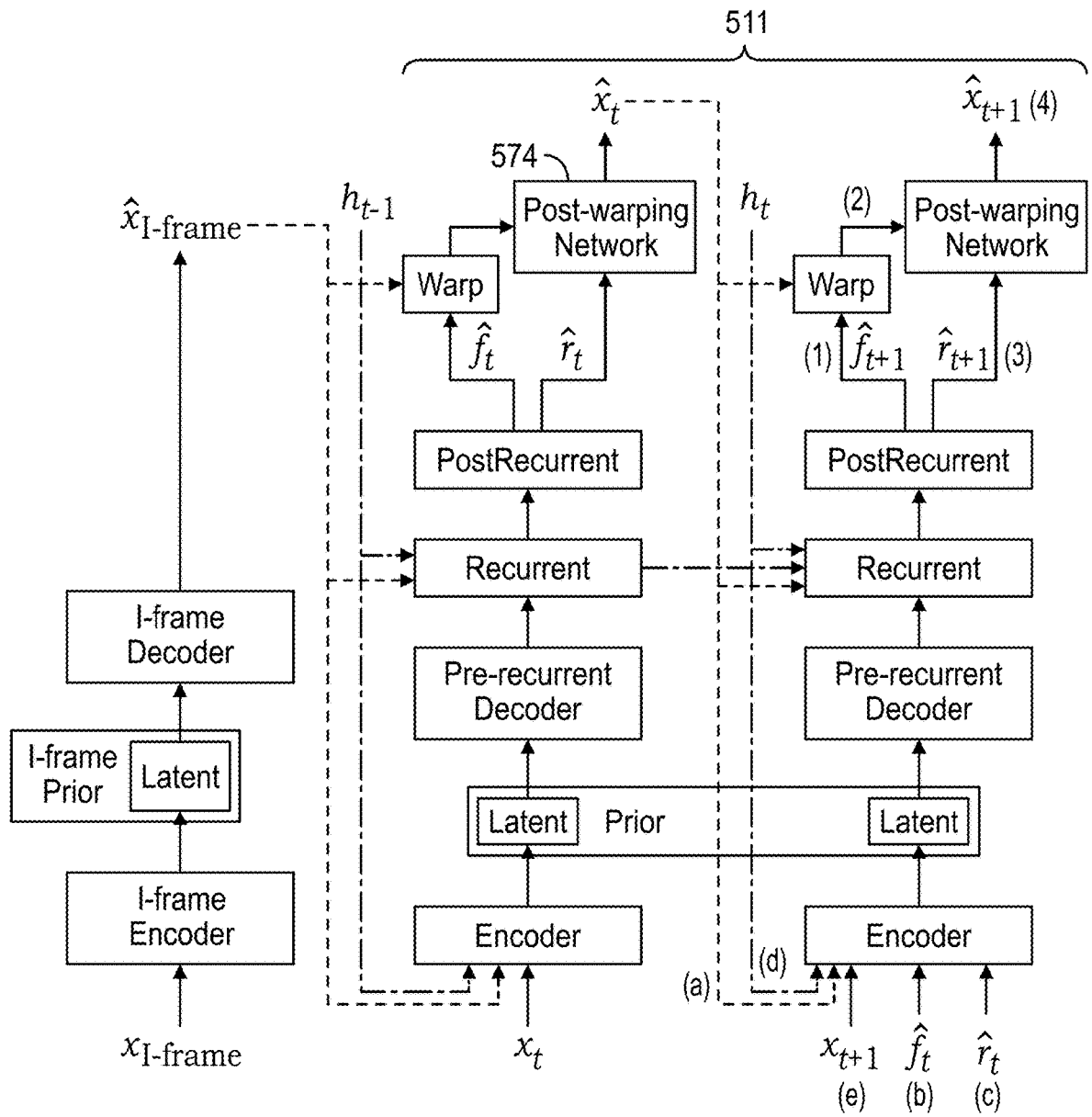
FIG. 7 is a diagram illustrating another example of a recurrent-based neural network system used for video coding, in accordance with some examples.

FIG. 7 is a diagram illustrating an example of the neural network system 511 with an additional post-warping network 574 for performing post-warping enhancement. In some cases, after the warping engine 567 performs warping and the adder engine 569 adds the residuals, there may still be room to improve a reconstructed frame. For example, a reconstructed frame $\hat{x}_t$ after warping (by the warping engine 567) and addition of the residual (by the adder engine 569) may have visual artifacts that were not present in the original frame $\hat{x}$. The post-warping network 574 can include neural network components (e.g., one or more convolutional layers) that are used to further enhance or refine a reconstructed frame (e.g., by removing artifacts).

The post-warping network 574 can be applied after the warping engine 567 warps the previously reconstructed frame. For example, as shown in FIG. 7 at time step t, the warped frame (after the warping is applied) and the reconstructed residual $\hat{r}_t$ are input to the post-warping network 574. The post-warping network can generate a reconstructed frame $\hat{x}_t$ that has any visual impurities (e.g., visual artifacts) removed. In some examples, the post-warping network 574 is trained independently from the neural network of the rest of the neural network system 511. In some examples, the post-warping network 574 is not trained independently from the rest of the neural network system 511, in which case the entire neural network system 511 is trained end-to-end. For example, a clean or uncompressed frame can be input to the neural network of the neural network system 511, and the network outputs a reconstructed frame. Backpropagation can be used to assess the error or loss associated with the reconstructed frame (as compared to the input frame), and the parameters of the neural network system 511 can be tuned, as described above.

Figure 8:
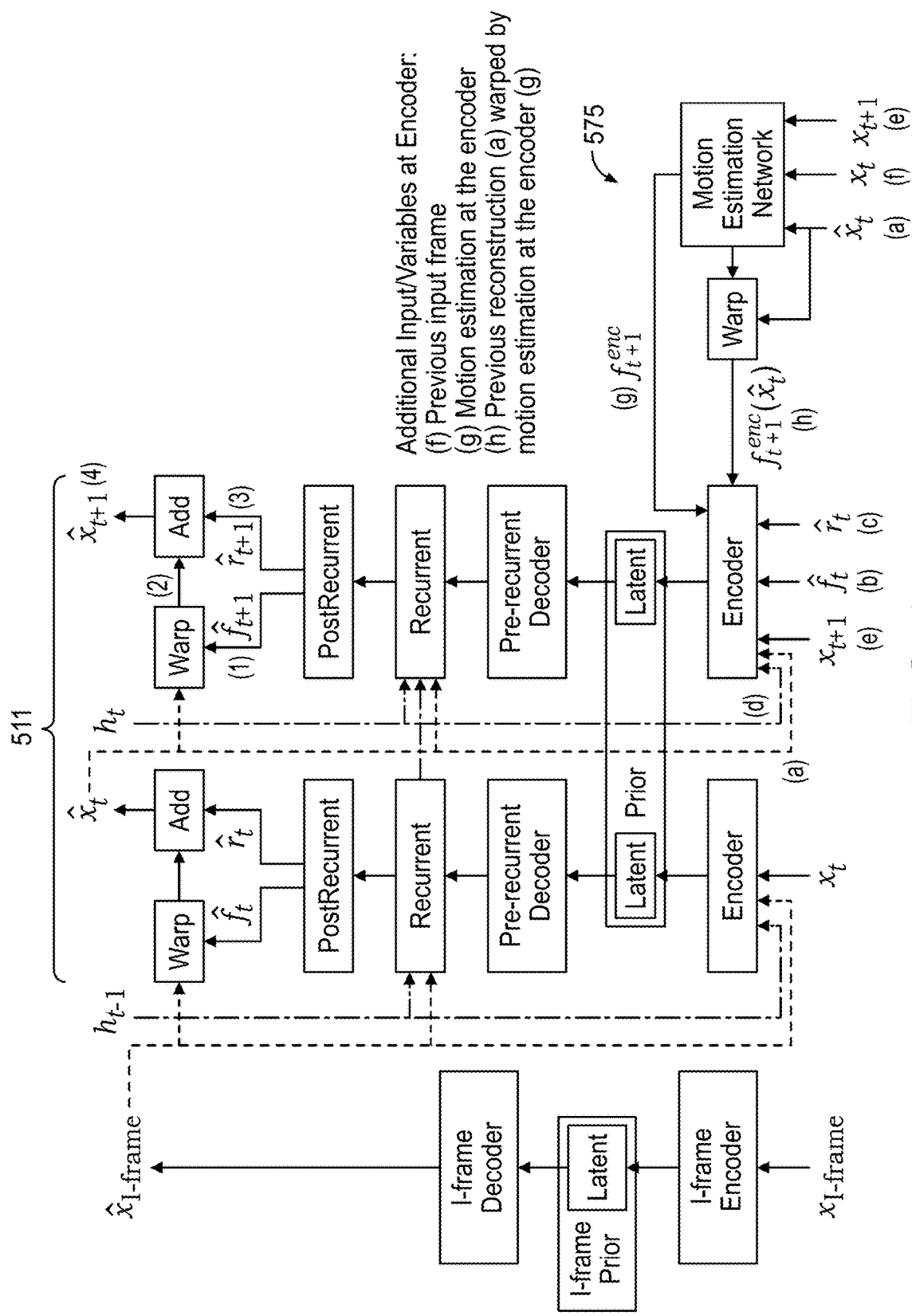
FIG. 8 is a diagram illustrating another example of a recurrent-based neural network system used for video coding, in accordance with some examples.
Figure 9:
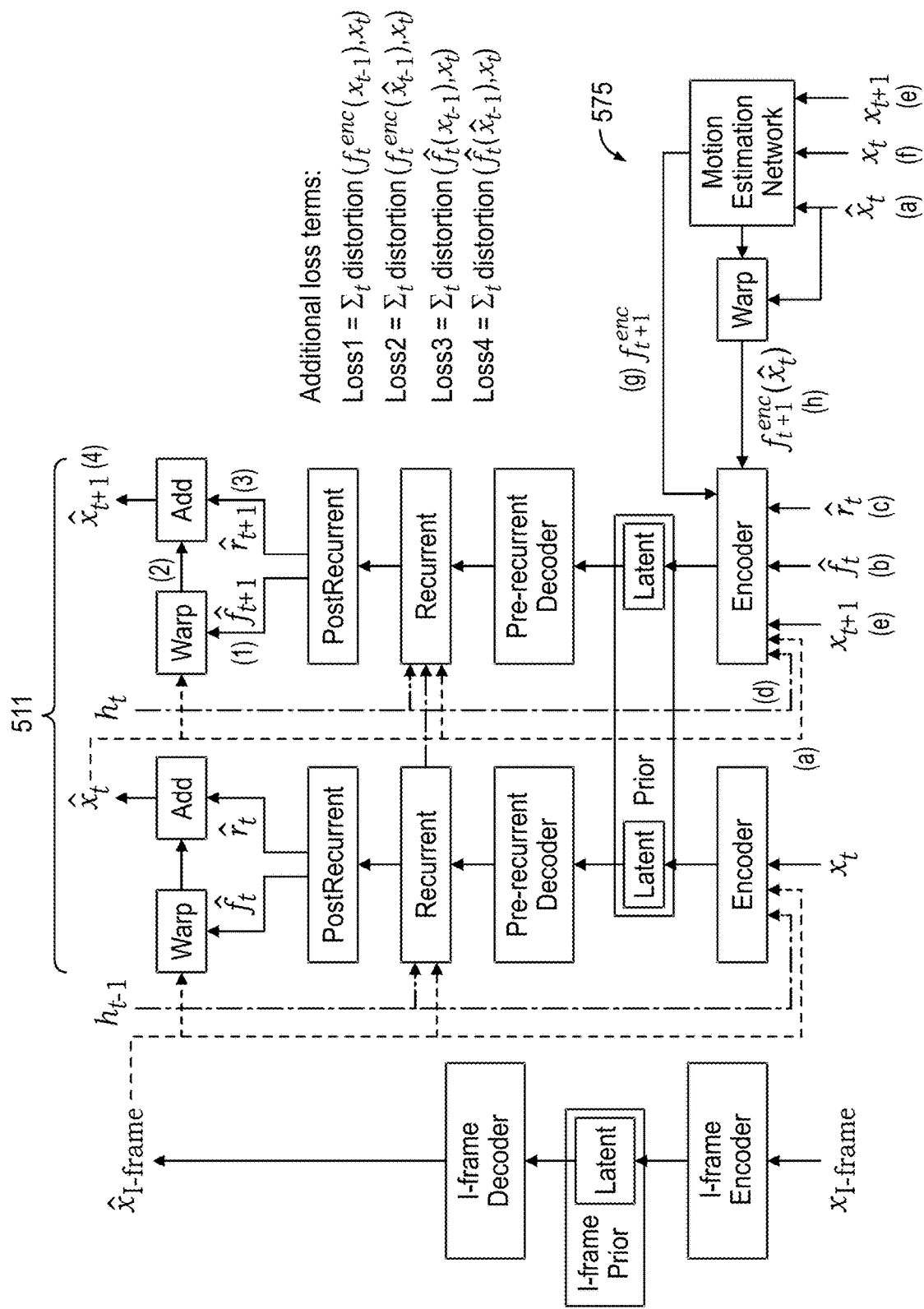
FIG. 9 is a diagram illustrating another example of a recurrent-based neural network system used for video coding, in accordance with some examples.

FIG. 8 and FIG. 9 are diagrams illustrating an example of the neural network system 511 with an additional motion estimation network 575. The motion estimation network 575 can provide enhanced learning of motion estimations. As shown in FIG. 8 and FIG. 9, additional input variables are provided at the encoder side of the neural network system 511 at time step t+1, including the previous input frame $x_t$ (input to the motion estimation network 575), the motion estimation $f_{t+1}^{enc}$ determined at the encoder side by the motion estimation network 575, and the previous reconstructed frame warped by the motion estimation $f_{t+1}^{enc}$ (denoted as warped reconstructed frame $f_{t+1}^{enc}(\hat{x}_t)$).

As noted above, in some implementations, the neural network system 511 is trained in an end-to-end manner. In some cases, the neural network system 511 can have issues during training when trying to compute certain parameters. For example, issues can arise when the neural network attempts to determine the motion estimation parameters (e.g., the optical flow) and warp a previously reconstructed frame using those motion estimation parameters. In another example, issues can arise when estimating the residual and adding the warped frame to the residual. Such issues can arise due to the neural network system 511 attempting to obtain the best reconstruction possible regardless of how the reconstruction is obtained. For example, in attempting to generate a reconstructed frame that is as close to the original frame as possible, the neural network system 511 may not properly learn the motion estimation parameters (e.g., the optical flow), and may rely only on the residual to generate the reconstructed frame. In some cases, the reconstructed optical flow output may even be a blank tensor or other data structure with no data. However, much of the redundancies in video can come from such motion data (e.g., from the optical flow between frames), in which case it can be important to learn the motion estimation parameters.

The motion estimation network 575 can help the neural network system 511 to learn the motion estimation parameters by providing a motion estimation neural network on the encoder side of the neural network system 511. For example, the motion estimation network 575 can include a separate neural network that estimates the motion estimation parameters (e.g., optical flow vectors, optical flow maps, block-based motion information, a kernel for each pixel used for performing data convolution, etc.), and provides those motion estimation parameters to the encoder 533. By determining the motion estimation parameters on the encoder side of the neural network system 511, an actual set of motion estimation parameters are provided to the encoder 533, forcing the encoder 533 to consider motion estimation (e.g., optical flow).

In some examples, the motion estimation network 575 can be trained independently from the rest of the neural network system 511 or the entire neural network system 511 (including the motion estimation network 575) can be trained together in an end-to-end manner. Various loss terms taking into account the motion estimation network 575 can include the following:

$$\text{Loss1} = \Sigma_t \, \text{distortion}(f_{t+1}^{enc}(x_{t-1}), x_t)$$

$$\text{Loss2} = \Sigma_t \, \text{distortion}(f_t^{enc}(\hat{x}_{t-1}), x_t)$$

$$\text{Loss3} = \Sigma_t \, \text{distortion}(\tilde{f}_t(x_{t-1}), x_t)$$

$$\text{Loss4} = \Sigma_t \, \text{distortion}(\tilde{f}_t(\hat{x}_{t-1}), x_t)$$

In some implementations, the motion estimation network 575 can be trained using unsupervised learning (without using ground truth outputs). The Loss1 and Loss2 terms can be used on the encoder side, and the Loss3 and Loss4 terms can be used on the decoder side. In one illustrative example using optical flow as an example of motion estimation, given two consecutive frames $x_t$ and $x_{t+1}$, the goal of the motion estimation network 575 is to estimate the optical flow between the two frames $x_t$ and $x_{t+1}$. The motion estimation network 575 will output estimated optical flow parameters, which will be used to warp the reconstructed version of $x_t$, $\hat{x}_t$. A loss (e.g., Loss2 above) can be determined between the warped $\hat{x}_t$ and the original frame $x_t$. The loss can then be used to tune the weights (and other parameters in some cases) using the backpropagation techniques described above. In some cases, the loss term Loss1 can be used on the encoder side rather than the Loss2.

The same concept can be used on the decoder side using Loss3 or Loss4 to train the decoder 538 to recover the motion estimation parameters (e.g., the optical flow) that were estimated on the encoder side. For example, the decoder 538 can calculate or estimate the motion (e.g., optical flow) between two consecutive frames, including a current frame $x_t$ and either a previous frame $x_{t-1}$ (when Loss3 is used) or a previously reconstructed frame $\hat{x}_{t-1}$ (when Loss4 is used). In this way, uncompressed frames can be used to estimate the motion estimation parameters. The resulting motion estimation parameters can be used to warp the previous frame ($x_{t-1}$ or $\hat{x}_{t-1}$) in an attempt to match the frame $x_t$. It is desired that the output of the warping matches the input frame $x_t$ at the current time step.

The loss between the warped frame and the input frame $x_t$ can then be computed using either Loss3 or Loss4. As noted above, Loss3 includes the use of the actual previous frame $x_{t-1}$ and Loss4 includes the use of the previously reconstructed frame $\hat{x}_{t-1}$ (the decompressed or decoded version of the previous frame $x_{t-1}$). Loss4 on the decoder side (and Loss2 on the encoder side) can be used in situations when the actual previous frame $x_{t-1}$ from time step $t-1$ is not available to the neural network system 511 at the next time step t. Backpropagation can be used to assess the loss and to adjust or tune the parameters of the neural network system 511. Such training assists the decoder 538 to learn the motion estimation parameters.

In some examples, the loss terms Loss1 and Loss3 or the loss terms Loss2 and Loss4 (depending on whether the actual previous frame $x_{t-1}$ is available at time step t) are activated at different stages of training. For example, Loss2 on the encoder side and Loss4 on the decoder side can be activated and used when training of the neural network system 511 first begins and up until a certain point, after which the neural network system 511 is trained using Loss0 (as shown in FIG. 5A and above) as the only loss term (the loss terms Loss1-Loss4 deactivated). By initially using the loss terms Loss1 and Loss3 or Loss2 and Loss4 during training, the neural network system 511 is forced to learn the motion estimation parameters (e.g., the optical flow vectors or maps). Once the neural network system 511 has sufficiently learned the motion estimation parameters, it can retain that information and will maintain how to estimate the motion estimation parameters in further training iterations and during inference (when the trained network is deployed for operation on actual video data). The additional loss terms Loss1-Loss4 can thus be deactivated once the motion estimation parameters are learned by the neural network system 511, and the Loss0 can continue to be used to further train the neural network system 511.

Figure 10:
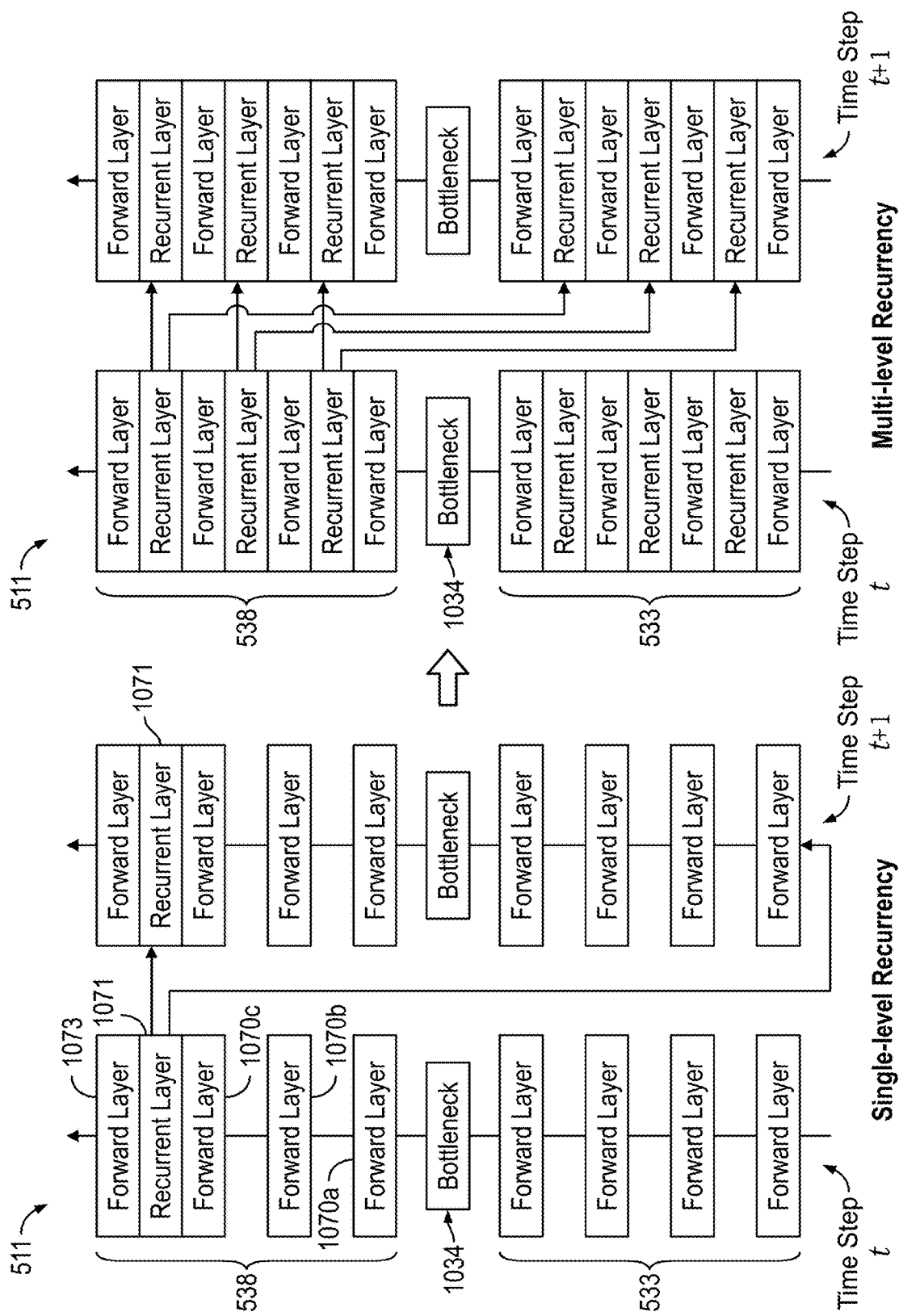
FIG. 10 is a diagram illustrating an examples of single level recurrency and multi-level recurrency configurations, in accordance with some examples.

FIG. 10 is a diagram illustrating an example of different recurrent layer configurations of the neural network system 511, including a single-level recurrency configuration and a multi-level recurrency configuration. The encoder 533 and the decoder 538 are illustrated as different layers separated by a bottleneck 1034. The bottleneck 1034 corresponds to the latent representation that is quantized using the quantizer 534. In the single-level recurrency configuration, the encoder 533 includes only forward layers and the decoder includes four forward layers and a single recurrent layer 1071. The forward layers of the encoder 533 can include one or more of the neural network layers illustrated in FIG. 5B, such as one or more convolutional layers, normalization layers, non-linear layers, residual blocks, or other neural network layers. The forward layer 1070a, the forward layer 1070b, and forward layer 1070c correspond to the one or more pre-recurrent decoder layers 570 shown in FIG. 5A. In one illustrative example, the forward layers 1070a, 1070b, and 1070c can include all layers (denoted in FIG. 5B as layers 579) of the decoder 538 in FIG. 5B that occur prior to the recurrent layer (denoted in FIG. 5B as ConvGRU c:$C_3$ k:3 s:1). The recurrent layer 1071 in FIG. 10 corresponds to the one or more recurrent layers 571 shown in FIG. 5A. An example of the recurrent layer 1071 is the ConvGRU recurrent layer (with settings c:$C_3$ k:3 s:1) from FIG. 5B. As shown, the recurrent state of the recurrent layer 1071 from time step t is provided to the recurrent layer 1071 and to the encoder 533 at the next time step t+1. The forward layer 1073 corresponds to the one or more post-recurrent layers 572 shown in FIG. 5A. In one illustrative example, the forward layer 1073 can last convolutional layer (denoted as Cony c:5 k:5 s:1) of the decoder 538 in FIG. 5B.

The multi-level recurrency configuration includes the same forward layers as the single-recurrency configuration, but includes multiple levels of recurrent layers at the decoder 538. Each of the different recurrent layers maintains a separate recurrent state (also referred to as a hidden state), with each recurrent state capturing a different level of features up to that point in the neural network system 511. As shown in FIG. 10, in addition to being fed back to the recurrent layers of the decoder 538, the recurrent states are fed back from the recurrent layers of the decoder 538 to mirrored locations in the encoder 533. The multiple recurrent states can allow the encoder 533 and the decoder 538 to take advantage of the additional information to perform more efficient video coding.

Figure 11:
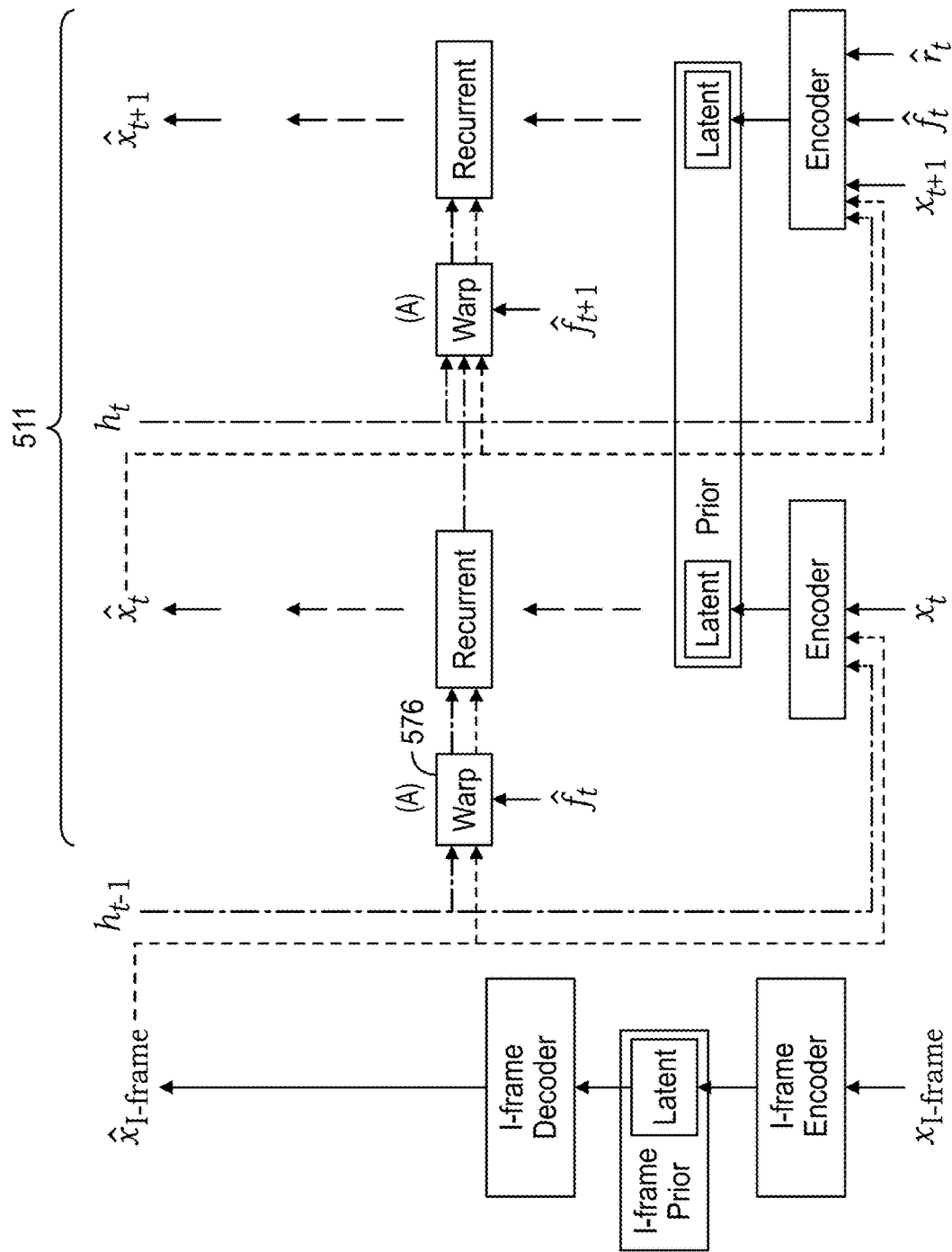
FIG. 11 is a diagram illustrating another example of a recurrent-based neural network system used for video coding, in accordance with some examples.

FIG. 11 is a diagram illustrating an example of the neural network system 511 with an additional warping engine 576. While various components of the neural network system 511 are omitted from FIG. 11 for illustrative purposes (e.g., the quantizer 534, the one or more pre-recurrent decoder layers 570, etc.), one of ordinary skill will understand that those components are present in the neural network system 511. The warping engine 576 can be used to warp a previous recurrent state(s) (or hidden state) from a previous time step (e.g., time step t) of the one or more recurrent layers 571 before using the recurrent state(s) at the current time step (e.g., time step t+1). The warping engine 576 can use the motion estimation parameters available to the encoder 533 and the decoder 538 to warp the recurrent state in order to match the recurrent state to the location of the pixels in current frame.

Warping of the previous recurrent state(s) before using them at a current time step can be useful for video. For example, objects can move temporally across video frames, and such motion can be modeled by the motion estimation techniques described above (e.g., using optical flow, block-based motion estimation, etc.). When the recurrent states of the one or more recurrent layers 571 of the decoder 538 are fed directly to the decoder 538 and the encoder 533 at later time steps, the object motion is not modeled within the hidden states (e.g., due to motion compensation being performed after the recurrent layers, as shown in FIG. 5A). A recurrent state is representative of the input frame (e.g., it includes a feature representation of the input image), in which case movement of a pixel in an input image should cause a similar movement in the feature space of the recurrent state. Thus, by warping the recurrent state based on the motion estimation, each movement that is estimated from the input frame is transferred to a corresponding movement in the recurrent state, causing the recurrent state to match the location of the pixels in current frame.

Referring to FIG. 11, the warping engine 576 at a current time step is used to warp a previous recurrent or hidden state h of a recurrent layer of the decoder 538 from a previous time step. The previous hidden state is warped using the motion estimation parameters (e.g., the optical flow) estimated at the current time step before being reused in the recurrent layer at the current time step. For instance, the warping engine 576 at time step t+1 can warp the previous recurrent state $h_t$ from time step t using the motion estimation parameters $\hat{f}_{t+1}$ estimated at time step t+1. The warped recurrent state can then be reused in the recurrent layer at the current time step t.

In some implementations, an additional recurrent layer can be provided before the warping engine 576. The additional recurrent layer can be used to reconstruct the motion estimation parameters $\hat{f}_{t+1}$ (e.g., the optical flow) for the current time step t+1 of operation, which can be used by the warping engine 576 to warp the previous recurrent state $h_t$ from time step t. The warped previous recurrent state $\hat{f}_t(h_t)$ can then be input to the recurrent layer at the current time step t. In some implementations, an iterative operation can be performed to first determine the motion estimation parameters (e.g., the optical flow) at the current time step t+1, which can be used by the warping engine 576 to warp the previous recurrent state $h_t$ from time step t. The warped previous recurrent state $\hat{f}_t(h_t)$ can then be input to the recurrent layer at the current time step t. For instance, a forward pass can be performed to recover or reconstruct the motion estimation parameters, and then the operations can return to the recurrent layer to warp the previous recurrent state. In some implementations, the warped previously reconstructed frame (from time step t−1) as feedback to the recurrent layer of the current time step (t).

Figure 12:
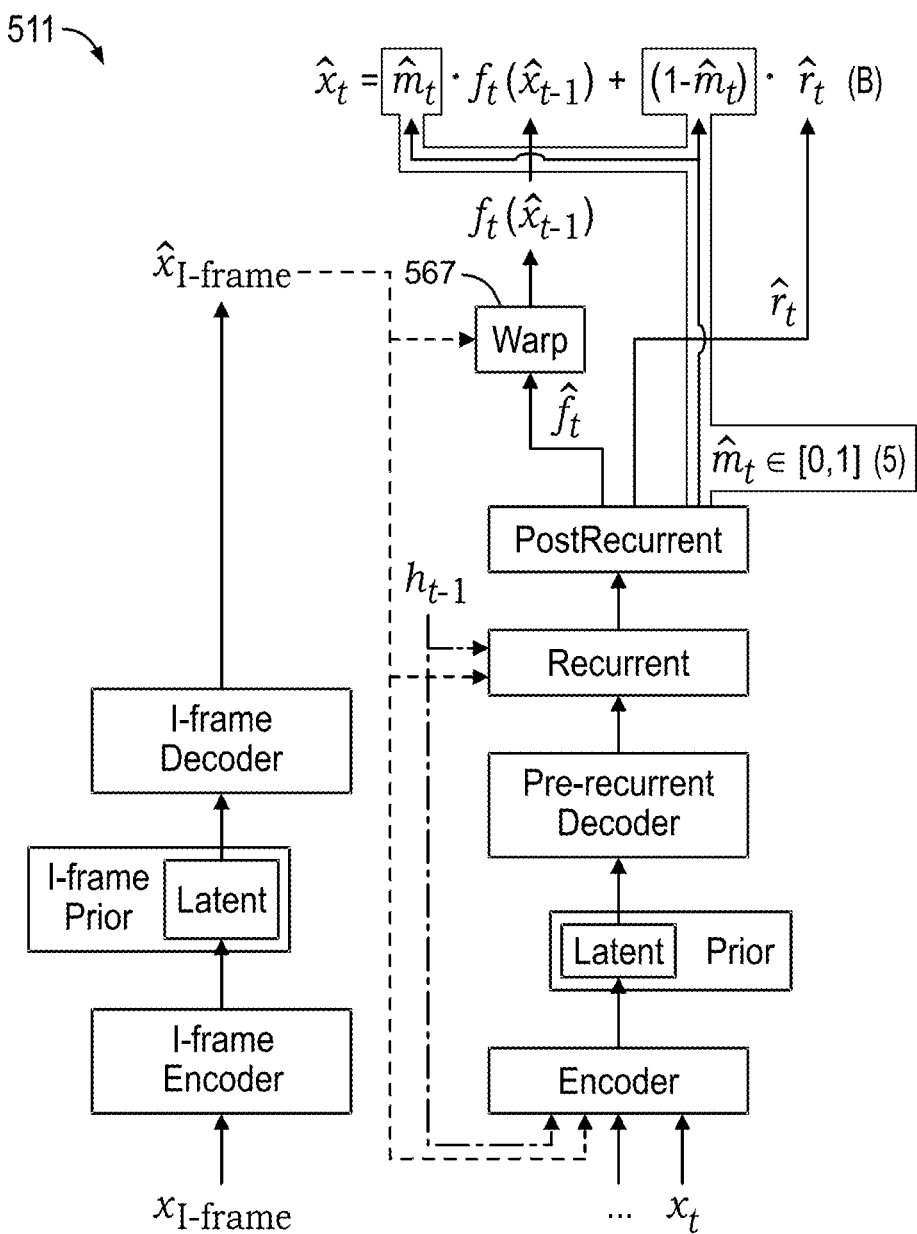
FIG. 12 is a diagram illustrating another example of a recurrent-based neural network system used for video coding, in accordance with some examples.

FIG. 12 is a diagram illustrating an example of the neural network system 511 with additional masking functionality. As shown in FIG. 12, the one or more post-recurrent layers 573 can output an element wise mask $\hat{m}_t \in [0, 1]$ in addition to the reconstructed motion estimation data $\hat{f}_t$ and the reconstructed residual data $\hat{r}_t$. The warping engine 567 can generate the warped previous reconstructed frame $\hat{f}_t(\hat{x}_{t-1})$ by warping the previously reconstructed frame $\hat{x}_{t-1}$, similar to that described above with respect to FIG. 5A. The mask $\hat{m}_t$ can be a per-pixel mask having a value for each pixel in the video frame. The mask $\hat{m}_t$ is used to mask (or weight) the contributions of the warped previous reconstructed frame $\hat{f}_t(\hat{x}_{t-1})$ and the residual $\hat{r}_t$ when reconstructing the reconstructed frame $\hat{x}_t$. For instance, in some implementations, the mask $\hat{m}_t$ can be applied according to the following equation:

$$\hat{x}_t = \hat{m}_t \cdot \hat{f}_t(x_{t-1}) + (1-\hat{m}_t) \cdot \hat{r}_t \quad \text{Equation (4)}.$$

According to Equation (4), as the value of the mask $\hat{m}_t$ increases, the effect of the warped previous reconstructed frame $\hat{f}_t(\hat{x}_{t-1})$ on the reconstructed frame $\hat{x}_t$ increases and the effect of the residual data $\hat{r}_t$ on the reconstructed frame $\hat{x}_t$ is reduced. On the other hand, the effect of the warped previous reconstructed frame $\hat{f}_t(\hat{x}_{t-1})$ is reduced and the effect of the residual data $\hat{r}_t$ increases as the value of the mask $\hat{m}_t$ decreases. In some implementations, the $\hat{m}_t$ can be restricted to a range of values between 0 and 1 ([0, 1], inclusive). In one illustrative example, if the mask has a value of 0 for a pixel, the value in the next frame for that pixel will be taken fully from the residual.

In some examples, the mask $\hat{m}_t$ can be an occlussion mask that masks out the parts of a current video frame that were not present in the previous video frame. Such a scenario can occur, for example, when a part of a scene is temporarily occluded, when an object enters a scene, etc. The masking of such unavailable parts of a fame can be performed due to motion information (and thus warping) for those parts being unavailable. For example, motion estimation between a current frame and a previous frame cannot be performed for pixels of the current frame if the pixels are unavailable in the previous frame. In such an example, the part of the video frame including those pixels cannot be warped. In such cases, the reconstruction of the current frame can be determined by relying more heavily (or completely in some cases) on the residual data $\hat{r}_t$, depending on the amount of occlusion.

Figure 13:
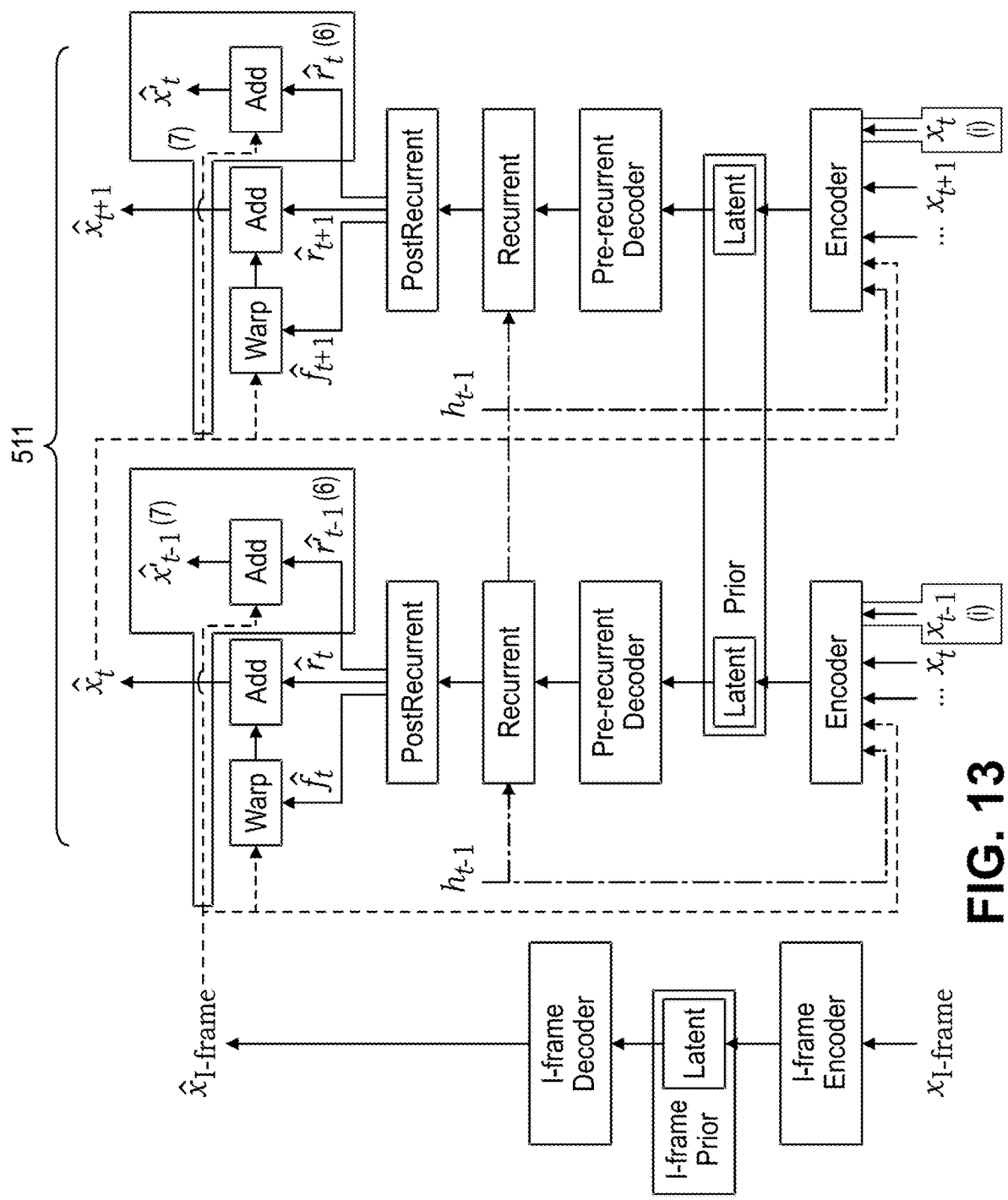
FIG. 13 is a diagram illustrating another example of a recurrent-based neural network system used for video coding, in accordance with some examples.

FIG. 13 is a diagram illustrating an example of the neural network system 511 with additional reconstruction refinement functionality. Using the configuration shown in FIG. 13, the neural network system 511 can reconstruct each video frame in two time steps of operation of the neural network system 511. For example, each reconstructed video frame (e.g., $\hat{x}_{t-1}$) determined at a current time step (e.g., time step t−1) can be further refined in a following timestep (e.g., time step t). In such cases, a previously reconstructed video frame $\hat{x}$ can serve two roles. For example, at a current time step t, the previously reconstructed video frame $\hat{x}_{t-1}$ is warped and the residual $\hat{r}_t$ is added to form the current time step reconstruction $\hat{x}_t$ (as is also done in the configuration shown in FIG. 5A). In addition, a residual $\hat{r}'_{t-1}$ is also output and is added to the previously reconstructed video frame $\hat{x}_{t-1}$, resulting in a refined reconstructed frame $\hat{r}'_{t-1}$ that has improved quality as compared to the previously reconstructed video frame $\hat{x}_{t-1}$.

As shown in FIG. 13, at each time step, the previous ground truth (uncompressed) frame x is added as an input to the encoder 533 to allow for the refinement of the previous reconstructed frame 2 to take place. For example, at time step t, the previous ground truth frame $x_{t-1}$ is added as an input to the encoder 533 to allow for the refinement of the previously reconstructed frame $\hat{x}_{t-1}$ to take place. As shown, at time step t, the one or more post-recurrent layers 573 provides the output residual $\hat{r}'_{t-1}$ in addition to the residual $\hat{r}_t$. The residual $\hat{r}'_{t-1}$ is generated based on the previous ground truth frame $x_{t-1}$, and is used to refine the previous reconstruction $\hat{x}_{t-1}$ in order to generate the refined reconstructed frame $\hat{x}'_{t-1}$. For example, the refined reconstruction can be generated as follows:

$$\hat{x}'_{t-1} = \hat{x}_{t-1} + \hat{r}'_{t-1} \quad \text{Equation (5)}$$

The refined reconstructed frame $\hat{x}'_{t-1}$ can be used as the final reconstruction for the previous frame at time step t−1. In such cases, the system 500 delays the output video sequence by one time step of the operation of the neural network system 511. It can be beneficial in terms of coding efficiency (e.g., rate-distortion) for the neural network system 511 to be allowed to refine a reconstructed frame in the next time step by knowing the error performed in the first initial, unrefined reconstruction. Such a configuration allows for any mistakes that occurred in a previous time step to be compensated for in the next time step, which can benefit the rate distortion optimization.

Figure 14:
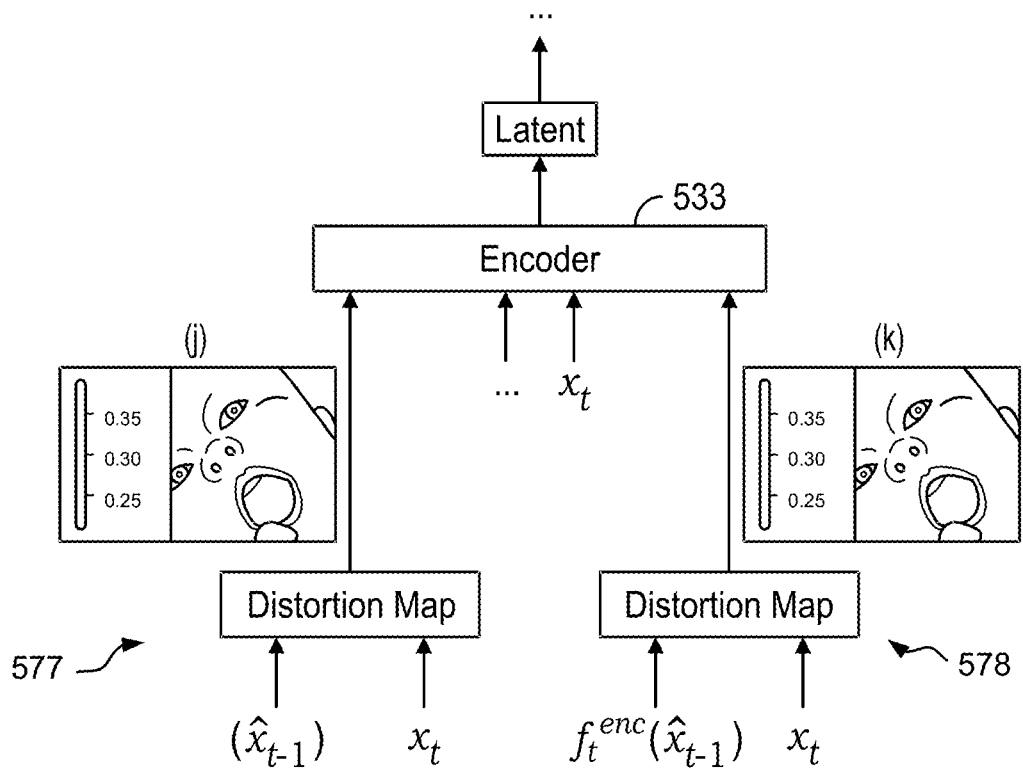
FIG. 14 is a diagram illustrating an example of using distortion maps as input to a recurrent-based neural network system, in accordance with some examples.

FIG. 14 is a diagram illustrating an example of using one or more distortion maps as input to the encoder 533 of the neural network system 511. Two example distortion maps are shown in FIG. 14, including a distortion map 577 and a distortion map 578. The distortion map 577 includes distortion between a current source frame $x_t$ from a current time step t and a previous reconstruction $\hat{x}_{t-1}$ from the previous time step t−1. The distortion map 578 includes distortion between the current source frame $x_t$ and the warped previously reconstructed video frame $f_t^{enc}$). As noted above, the previously reconstructed video frame ($\hat{x}_{t-1}$) can be warped according to the motion estimation, such as optical flow. In such cases, the optical flow can estimated on the encoder side, such as using flownet. Flownet is a neural network architecture that learns optical flow with convolutional networks.

The distortion included in the distortion maps can be the distortion (or error or loss) that is used as the loss function for training the neural network system 511 (e.g., the Loss0, Loss1, Loss2, Loss3, and/or Loss4 described above). The distortion can be based on any type of distortion, such as Multi-scale structural similarity Index (MS-S SIM), mean squared error (MSE) per pixel, among others. A distortion map can also be referred to as a perceptual distortion map.

By explicitly computing the distortion maps (outside of the neural network system 511) and feeding the distortion maps as input into the encoder 533, the encoder 533 can be guided as to which parts of the image are contributing to the perceptual distortion and hence where it needs to allocate more information. For example, the encoder 533 can focus bitrate on the regions of an image that contribute most to the distortion. Such a benefit can be enhanced for certain distortion maps, such as a perceptual distortion map (e.g., a MS-SSIM), which is non-trivial to learn by a neural network.

FIG. 15 is a diagram illustrating an example of the neural network system 511 with an additional linear neural network layer allowing multiplicative interaction in the encoder 533. Convolutional neural network architectures applied in a default way do not allow for multiplicative interaction. Multiplicative interaction is when a computation that is being performed on an input depends on the input itself. For example, traditional convolutional neural networks learn weights during training. The weights are the same and are applied to any input, regardless of the input values that are being input to the neural network.

Referring to FIG. 15, multiplicative interaction is enabled in the encoder 533 by applying the linear layer 581 of the encoder 533 (shown in FIG. 15 at linear layer (1)) independently at each spatial position of the input. The weights of the linear layer 581 are determined by the weights 583 output by linear layer 582 (shown in FIG. 15 at linear layer (2)). For example, the weights 583 can be used as the weights for the linear layer 581. The same input 580 is applied to the linear layer 581 and to the linear layer 582. Using the linear layer 582 to define the weights of the linear layer 581 allows for the computation performed by the linear layer 581 to be dependent on the value(s) of the input 580 itself (hence, the computation applied to the input 580 depends on the input itself). For example, the neural network system 511 may learn to perform different computation in regions where the distortion between the previous reconstructed frame and the current frame is negligible, as compared to regions where that distortion is significant.

Figure 16:
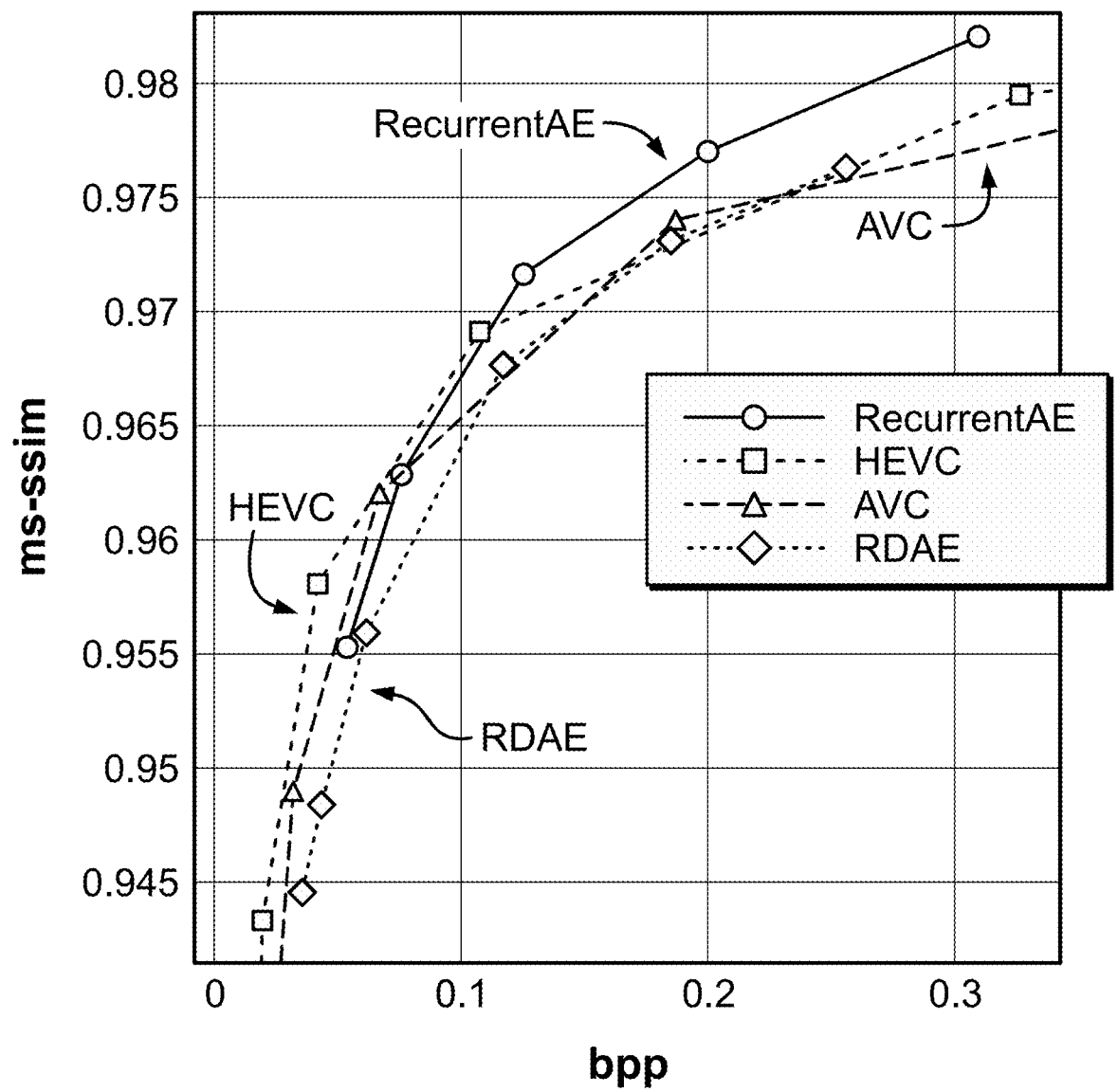
FIG. 16 is a graph illustrating an example of results obtained using the techniques described herein versus results obtained using other techniques, in accordance with some examples.

In some implementations, the configuration in FIG. 15 can be used in combination with the configuration shown in FIG. 16. For instance, one or more distortion maps can be input to the linear layer 582 in addition to the input 580, which can help to enhance the computation of the weights 583. In one example, weights in different spatial locations can be set differently according to the value of the distortion at the different spatial locations, as indicated by a distortion map.

Figure 17:
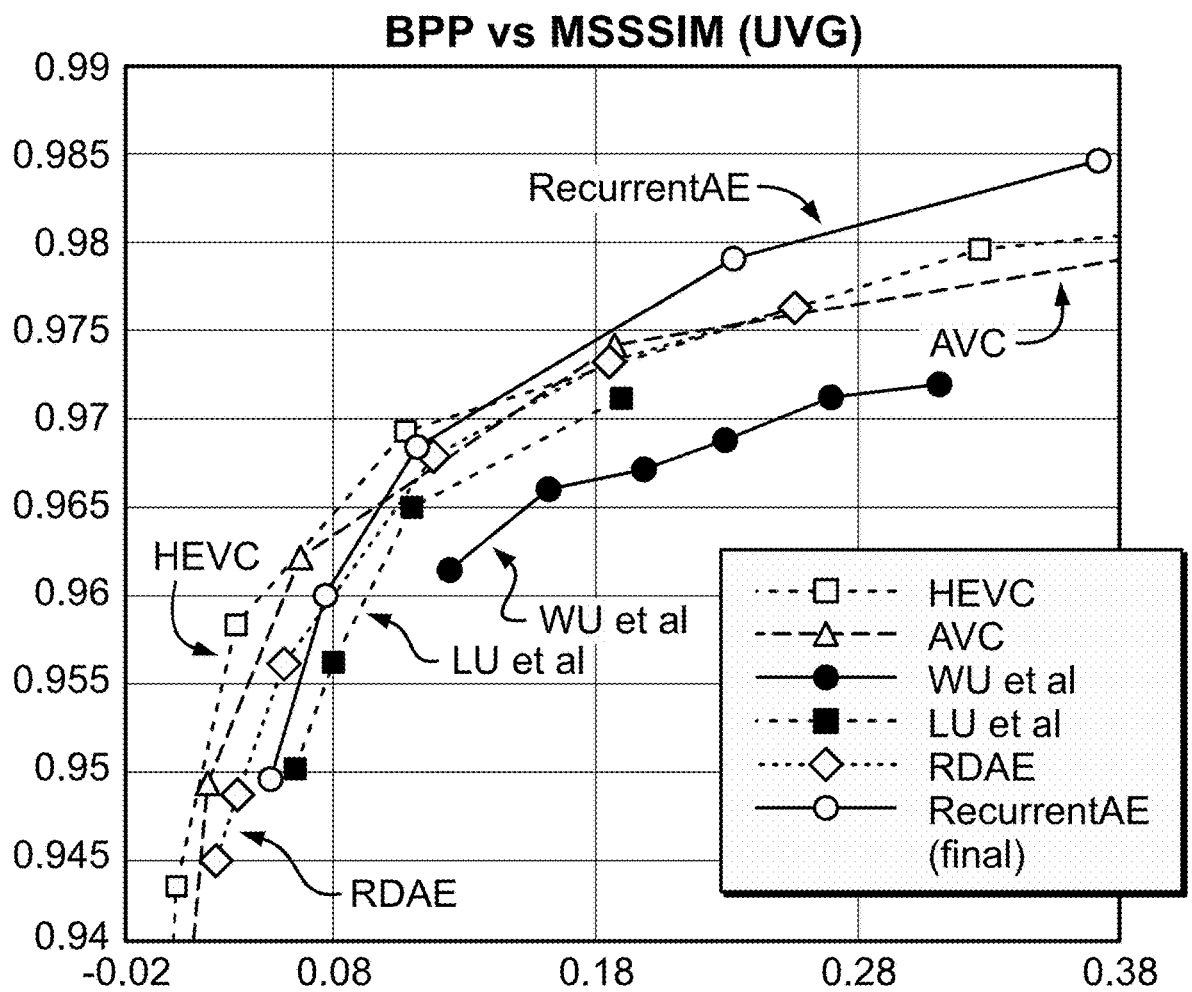
FIG. 17 is a graph illustrating an example of results obtained using the techniques described herein versus results obtained using other techniques, in accordance with some examples.

The recurrent-based neural network system (e.g., the system 400 and/or the system 500) and related techniques described herein for video compression provides a video coding system that can perform at state-of-the-art levels, providing high quality bits-per-pixel (bpp) values. For example, as shown in the graphs provided in FIG. 16 and FIG. 17, such techniques outperform current industry standard codecs, including HEVC and AVC, in the range of >0.14 bpp for 1080p resolution (which is the bpp region of practical interest—e.g., Netflix streams 1080p video using approx. 0.09-0.12 bpp). The "RecurrentAE" in FIG. 16 and FIG. 17 refers to results using the recurrent-based neural network system described herein, and the "RDAE" in FIG. 16 and FIG. 17 refers to another machine learning based video compression technique.

The recurrent-based neural network system described herein (e.g., the system 400 and/or the system 500) provides low-latency operation. For example, the system allows generation and transmission of video on a frame-by-frame basis, rather than in batches of several frames (e.g., in groups-of-pictures (GoPs)), and thus does not have to wait for the accumulation of the frames to be transmitted. Further, the system provides the ability to adjust the GoP size at runtime (i.e. the frequency of transmitting the full frame, rather than just residual information) depending on the characteristics of the video, thus leading to a better operating point in the rate-distortion space. Various other benefits are also provided by the recurrent-based neural network system described herein.

FIG. 18 is a flowchart illustrating an example of a process 1800 of processing video using one or more of the recurrent-based machine learning techniques described herein. At block 1802, the process 1800 includes obtaining, by an encoder portion of a neural network system, an input video frame for a current time step of operation of the neural network system, reconstructed motion estimation data from a previous time step of operation of the neural network system, reconstructed residual data from the previous time step of operation of the neural network system, and at least one recurrent state data from at least one recurrent layer of a decoder portion of the neural network system from the previous time step of operation. In some cases, the recurrent state data includes one or more values of nodes of the at least one recurrent layer. In some examples, other input data can be obtained by the encoder portion, such as a previously reconstructed video frame generated by the previous time step of operation of the neural network system, as shown in FIG. 5A.

At block 1804, the process 1800 includes generating, by the encoder portion of the neural network system, output data for the current time step of operation of the neural network system. The output data is generated at least partially based on the input video frame, the reconstructed motion estimation data from the previous time step of operation, the reconstructed residual data from the previous time step of operation, and the at least one recurrent state data from the previous time step of operation. The output data can be generated based on other input data in some cases, such as the previously reconstructed video frame generated by the previous time step of operation of the neural network system, as shown in FIG. 5A.

At block 1806, the process 1800 includes obtaining, by the decoder portion of the neural network system, the output data for the current time step of operation and the at least one recurrent state data from the at least one recurrent layer of the decoder portion from the previous time step of operation. For example, as shown in FIG. 5A, for a current time step t+1 of operation, the decoder 538 can obtain the output data from the quantizer 534, and a recurrent layer of the decoder 538 can feed back recurrent state data $h_t$ into itself from a previous time step t of operation. In some cases, the decoder portion of the neural network system includes a plurality of recurrent layers, each recurrent layer of the plurality of recurrent layers providing respective recurrent state data.

At block 1808, the process 1800 includes generating, at least partially based on the output data and the at least one recurrent state data from the previous time step of operation, a reconstructed video frame for the current time step of operation. The reconstructed video frame represents the input video frame. For example, the reconstructed video frame is a reconstructed version of the input video frame. The reconstructed video frame can be output for display, for storage, and/or for transmission. For example, in some examples, the process 1800 includes storing the output data in a storage medium. In some examples, the process 1800 includes storing the reconstructed video frame in a storage medium. In some examples, the process 1800 includes sending the reconstructed video frame over a transmission medium to at least one device. In some cases, the reconstructed video frame can be further processed (e.g., to remove visual artifacts that are due to the reconstruction process, or for other processing) before being output for display, storage, and/or transmission.

In some examples, the process 1800 includes determining, by the decoder portion of the neural network system, motion estimation data for the current time step of operation at least partially based on the output data and the at least one recurrent state data from the previous time step of operation. In such examples, the process 1800 can include obtaining a previously reconstructed video frame generated during the previous time step of operation, and generating a warped reconstructed video frame for the current time step of operation by modifying one or more pixels of the previously reconstructed video frame using the motion estimation data determined for the current time step.

In some examples, the process 1800 includes determining, by the decoder portion of the neural network system, reconstructed residual data for the current time step of operation at least partially based on the output data and the at least one recurrent state data from the previous time step of operation. In such examples, the process 1800 can include generating the reconstructed video frame for the current time step of operation by adding the warped reconstructed video frame to the reconstructed residual data determined for the current time step.

In some examples, the process 1800 includes determining, by the decoder portion of the neural network system, reconstructed residual data for the current time step of operation at least partially based on the output data and the at least one recurrent state data from the previous time step of operation. In such examples, the process 1800 can include processing, by a post-warping network of the decoder portion, the warped reconstructed video frame and the reconstructed residual data determined for the current time step. In some cases, the reconstructed video frame is generated for the current time step of operation based on processing of the warped reconstructed video frame and the reconstructed residual data by the post-warping network.

In some examples, the process 1800 includes determining, by a motion estimation network of the neural network system, motion estimation data for the current time step of operation at least partially based on the input video frame and at least one of a previously reconstructed video frame from the previous time step of operation or a previous input video frame from the previous time step of operation. In such examples, the process 1800 can include generating a warped reconstructed video frame for the current time step by modifying one or more pixels of at least one of the previously reconstructed video frame or the previous input video frame using the motion estimation data determined for the current time step. The process 1800 can include sending the warped reconstructed video frame and the motion estimation data determined for the current time step of operation to the encoder portion of the neural network system. In some cases, the output data generated for the current time step of operation is generated by the encoder portion of the neural network system at least partially based on the warped reconstructed video frame and the motion estimation data determined for the current time step of operation.

In some examples, the process 1800 includes training, for one or more training iterations, the neural network system using a first loss function. The first loss function determines a loss between one or more input video frames and one or more warped reconstructed video frames. For instance, the first loss function can include any of the loss functions Loss1, Loss2, Loss3, and/or Loss4 described above. In one illustrative example, Loss1 can be used to train the encoder 533 and Loss3 can be used to train the decoder 538. In another illustrative example, Loss2 can be used to train the encoder 533 and Loss4 can be used to train the decoder 538. In such examples, the process 1800 can include deactivating the first loss function (e.g., deactivating Loss1, Loss2, Loss3, and/or Loss4). For instance, the first loss function can be deactivated in response to determining the neural network system is trained to learn motion estimation parameters, as described above with respect to FIG. 8 and FIG. 9. In such examples, the process 1800 can include training, for one or more subsequent training iterations performed after the one or more training iterations, the neural network system using a second loss function. The second loss function determines a loss between at least one input video frame and at least one reconstructed video frame. For instance, the second loss function can include Loss0 described above.

In some examples, the process 1800 includes generating warped recurrent state data for the current time step of operation by modifying the at least one recurrent state data from the previous time step of operation using motion estimation data determined for the current time step of operation or the previous time step of operation. In such examples, the reconstructed video frame generated for the current time step of operation is generated at least partially based on the warped recurrent state data.

In some examples, the process 1800 includes generating, by the decoder portion, a reconstructed mask. The reconstructed mask includes one or more values indicative of a presence of data in a previously reconstructed video frame generated during the previous time step of operation. In such examples, the process 1800 includes generating the reconstructed video frame for the current time step of operation at least partially based on the reconstructed mask, a warped reconstructed video frame generated for the current time step of operation, and reconstructed residual data determined for the current time step of operation. The reconstructed mask weights contributions of the warped reconstructed video frame and the reconstructed residual data. In one illustrative example, as described above with respect to FIG. 12, the mask can be implemented using Equation (4) $(\hat{x}_t = \hat{m}_t \cdot \hat{f}_t(x_{t-1}) + (1-\hat{m}_t) \cdot \hat{r}_t)$.

In some examples, the process 1800 includes obtaining a previously reconstructed video frame generated during the previous time step of operation. In such examples, the process 1800 includes generating, during the current time step of operation, a warped reconstructed video frame for the current time step of operation by modifying one or more pixels of the previously reconstructed video frame using the motion estimation data determined for the current time step. In such examples, the process 1800 can include determining, by the decoder portion during the current time step of operation, first reconstructed residual data for the current time step of operation. In such examples, the process 1800 can include generating the reconstructed video frame for the current time step of operation by adding the warped reconstructed video frame to the reconstructed residual data determined for the current time step. The process 1800 can include determining, by the decoder portion during the current time step of operation, second reconstructed residual data from the previous time step of operation at least partially based on a previous input video frame processed by the encoder portion during the current time step of operation. In such examples, the process 1800 can include modifying, during the current time step of operation, the previously reconstructed video frame using the second reconstructed residual data, and outputting the modified previously reconstructed video frame as a final output video frame for the current time step of operation. For example, as described above with respect to FIG. 13, the modified previously reconstructed video frame $\hat{x}'_t$ can be output (e.g., for display, storage, transmission, and/or other operation) at time step t+1 instead of outputting reconstructed video frame $\hat{x}_{t+1}$ at time step t+1. In such an example, the reconstructed video frame $\hat{x}_{t+1}$ can be output for modification at the next time step t+2.

In some examples, the process 1800 includes obtaining, by the encoder portion of the neural network system, one or more distortion maps, and generating, by the encoder portion of the neural network system, the output data at least partially based on the one or more distortion maps. In some cases, as described above with respect to FIG. 14, the one or more distortion maps can include a first distortion map indicative of distortion between the input video frame for the current time step of operation and a previously reconstructed video frame from the previous time step of operation. In some cases, as described above with respect to FIG. 14, the one or more distortion maps can include a second distortion map indicative of distortion between the input video frame for the current time step of operation and a warped reconstructed video frame (where the warped reconstructed video frame can be generated by modifying one or more pixels of a previously reconstructed video frame from the previous time step of operation, as described above).

In some examples, the process 1800 includes processing, by a first layer of the encoder portion of the neural network system, input data. In such examples, the process 1800 includes determining, by the first layer of the encoder portion, a plurality of weight values for the first layer of the encoder portion. In such examples, the process 1800 includes setting weights of a second layer of the encoder portion of the neural network system to the plurality of weight values, and processing, by the second layer of the encoder portion, the input data using the weights set to the plurality of weight values. For example, as described above with respect to FIG. 15, the weights of the linear layer 581 can be determined by the weights 583 output by linear layer 582, which can allow for the computation performed by the linear layer 581 to be dependent on value(s) of the input 580 itself.

FIG. 19 is a flowchart illustrating another example of a process 1900 of processing video using one or more of the recurrent-based machine learning techniques described herein. At block 1902, the process 1900 includes obtaining, by a decoder portion of a neural network system, output data for a current time step of operation of the neural network system and recurrent state data from at least one recurrent layer of the decoder portion from a previous time step of operation of the neural network system. Using the example of FIG. 5A for illustrative purposes, for a current time step t+1 of operation, the decoder 538 can obtain the output data from the quantizer 534, and a recurrent layer of the decoder 538 can feed back recurrent state data $h_t$ into itself from a previous time step t of operation. In some cases, the decoder portion of the neural network system includes a plurality of recurrent layers, each recurrent layer of the plurality of recurrent layers providing respective recurrent state data.

At block 1904, the process 1900 includes determining, by the decoder portion of the neural network system, motion estimation data for the current time step of operation at least partially based on the output data and the recurrent state data from the previous time step of operation. At block 1906, the process 1900 includes obtaining a previously reconstructed video frame generated during the previous time step of operation. At block 1908, the process 1900 includes generating a warped reconstructed video frame for the current time step of operation at least in part by modifying one or more pixels of the previously reconstructed video frame using the motion estimation data determined for the current time step.

At block 1910, the process 1900 includes generating a reconstructed video frame for the current time step of operation at least partially based on the warped reconstructed video frame. The reconstructed video frame represents an input video frame processed by an encoder portion of the neural network system or an encoder of another neural network system. For example, the reconstructed video frame is a reconstructed version of the input video frame. The reconstructed video frame can be output for display, for storage, and/or for transmission. For example, in some examples, the process 1800 includes storing the output data in a storage medium. In some examples, the process 1800 includes storing the reconstructed video frame in a storage medium. In some examples, the process 1800 includes sending the reconstructed video frame over a transmission medium to at least one device. In some cases, the reconstructed video frame can be further processed (e.g., to remove visual artifacts that are due to the reconstruction process, or for other processing) before being output for display, storage, and/or transmission.

In some examples, the process 1900 includes determining, by the decoder portion of the neural network system, reconstructed residual data for the current time step of operation at least partially based on the output data and the recurrent state data from the previous time step of operation. In such examples, the process 1900 can include generating the reconstructed video frame for the current time step of operation at least in part by adding the warped reconstructed video frame to the reconstructed residual data determined for the current time step.

In some examples, the process 1900 includes determining, by the decoder portion during the current time step of operation, reconstructed residual data from the previous time step of operation at least partially based on a previous input video frame processed by an encoder portion of the neural network system during the current time step of operation. In such examples, the process 1900 can include modifying, during the current time step of operation, the previously reconstructed video frame using the reconstructed residual data from the previous time step of operation. The process 1900 can include outputting the modified previously reconstructed video frame as a final output video frame for the current time step of operation.

In some examples, the process 1900 includes determining, by the decoder portion of the neural network system, reconstructed residual data for the current time step of operation at least partially based on the output data and the recurrent state data from the previous time step of operation. In such examples, the process 1900 can include processing, by a post-warping network of the decoder portion, the warped reconstructed video frame and the reconstructed residual data determined for the current time step. The process 1900 can include generating the reconstructed video frame for the current time step of operation at least partially based on processing of the warped reconstructed video frame and the reconstructed residual data by the post-warping network.

In some examples, the process 1900 includes generating warped recurrent state data for the current time step of operation at least in part by modifying the recurrent state data from the previous time step of operation using the motion estimation data determined for the current time step of operation or motion estimation determined for the previous time step of operation. In such examples, the process 1900 can include generating the reconstructed video frame for the current time step of operation at least partially based on the warped recurrent state data.

In some examples, the process 1900 includes generating, by the decoder portion, a reconstructed mask. The reconstructed mask includes one or more values indicative of a presence of data in the previously reconstructed video frame generated during the previous time step of operation. In such examples, the process 1900 can include generating the reconstructed video frame for the current time step of operation at least partially based on the reconstructed mask, the warped reconstructed video frame for the current time step of operation, and reconstructed residual data determined for the current time step of operation. The reconstructed mask weights contributions of the warped reconstructed video frame and the reconstructed residual data. In one illustrative example, as described above with respect to FIG. 12, the mask can be implemented using Equation (4) ($\hat{x}_t = \hat{m}_t \cdot \hat{f}_t(x_{t-1}) + (1-\hat{m}_t) \cdot \hat{r}_t$).

In some examples, the process 1900 includes obtaining, by an encoder portion of a neural network system, an input video frame for the current time step of operation, reconstructed motion estimation data from a previous time step of operation of the neural network system, reconstructed residual data from the previous time step of operation of the neural network system, and recurrent state data from at least one recurrent layer of the decoder portion of the neural network system from the previous time step of operation. In some cases, the recurrent state data includes one or more values of nodes of the at least one recurrent layer. In some examples, other input data can be obtained by the encoder portion, such as a previously reconstructed video frame generated by the previous time step of operation of the neural network system, as shown in FIG. 5A. The process 1900 can include generating, by the encoder portion of the neural network system, the output data for the current time step of operation, the output data being generated at least partially based on the input video frame, the reconstructed motion estimation data from the previous time step of operation, the reconstructed residual data from the previous time step of operation, and the recurrent state data from the previous time step of operation. The output data can be generated based on other input data in some cases, such as the previously reconstructed video frame generated by the previous time step of operation of the neural network system, as shown in FIG. 5A.

In some examples, the process 1900 includes training, for one or more training iterations, the neural network system using a first loss function. The first loss function determines a loss between one or more input video frames and one or more warped reconstructed video frames. For instance, the first loss function can include any of the loss functions Loss1, Loss2, Loss3, and/or Loss4 described above. In one illustrative example, Loss1 can be used to train the encoder 533 and Loss3 can be used to train the decoder 538. In another illustrative example, Loss2 can be used to train the encoder 533 and Loss4 can be used to train the decoder 538. In such examples, the process 1900 can include deactivating the first loss function (e.g., deactivating Loss1, Loss2, Loss3, and/or Loss4). For instance, the first loss function can be deactivated in response to determining the neural network system is trained to learn motion estimation parameters, as described above with respect to FIG. 8 and FIG. 9. In such examples, the process 1900 can include training, for one or more subsequent training iterations performed after the one or more training iterations, the neural network system using a second loss function. The second loss function determines a loss between at least one input video frame and at least one reconstructed video frame. For instance, the second loss function can include Loss0 described above.

In some examples, the process 1900 includes obtaining a previously reconstructed video frame generated during the previous time step of operation. In such examples, the process 1900 includes generating, during the current time step of operation, a warped reconstructed video frame for the current time step of operation by modifying one or more pixels of the previously reconstructed video frame using the motion estimation data determined for the current time step. In such examples, the process 1900 can include determining, by the decoder portion during the current time step of operation, first reconstructed residual data for the current time step of operation. In such examples, the process 1900 can include generating the reconstructed video frame for the current time step of operation by adding the warped reconstructed video frame to the reconstructed residual data determined for the current time step. The process 1900 can include determining, by the decoder portion during the current time step of operation, second reconstructed residual data from the previous time step of operation at least partially based on a previous input video frame processed by the encoder portion during the current time step of operation. In such examples, the process 1900 can include modifying, during the current time step of operation, the previously reconstructed video frame using the second reconstructed residual data, and outputting the modified previously reconstructed video frame as a final output video frame for the current time step of operation. For example, as described above with respect to FIG. 13, the modified previously reconstructed video frame $\hat{x}'_t$ can be output (e.g., for display, storage, transmission, and/or other operation) at time step t+1 instead of outputting reconstructed video frame $\hat{x}_{t+1}$ at time step t+1. In such an example, the reconstructed video frame $\hat{x}_{t+1}$ can be output for modification at the next time step t+2.

Figure 20:
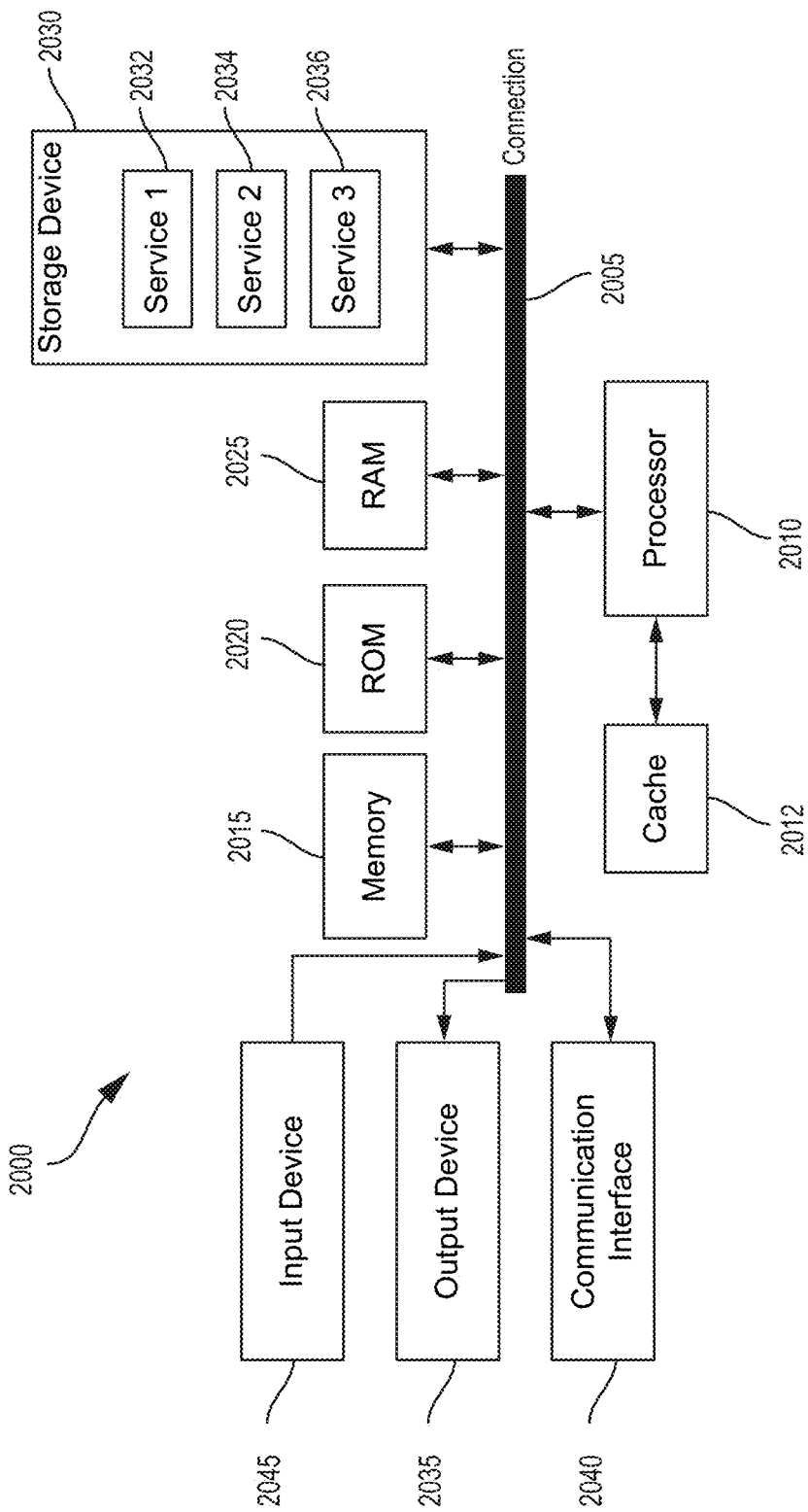
FIG. 20 illustrates an example computing device architecture of an example computing device which can implement the various techniques described herein.

In some examples, the processes described herein (e.g., process 1800, process 1900, and/or other process described herein) may be performed by a computing device or apparatus, such as a computing device having the computing device architecture 2000 shown in FIG. 20. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a television, or other device. In one example, the process 1800 and/or the process 1900 can be performed by a computing device with the computing device architecture 2000 implementing the system 400 or the system 500 (using any of the architectures shown in FIG. 5A-FIG. 15 or any combination thereof). The computing device can include any suitable device, such as an autonomous vehicle, a robotic device, a mobile device (e.g., a mobile phone), a desktop computing device, a tablet computing device, a wearable device, and/or any other computing device with the resource capabilities to perform the processes described herein, including process 1800. In some cases, the computing device or apparatus may include various components, such as one or more input devices, one or more output devices, one or more processors, one or more microprocessors, one or more microcomputers, one or more transmitters, receivers or combined transmitter-receivers (e.g., referred to as transceivers), one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), neural processing units (NPUs), and/or other suitable electronic circuits), and/or can include and/or be implemented using computer software, firmware, or any combination thereof, to perform the various operations described herein.

Process 1800 and the process 1900 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (including process 1800, process 1900, and/or other process described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 20 illustrates an example computing device architecture 2000 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, or other device. For example, the computing device architecture 2000 can implement the system 400 and/or the system 500 (including any one of the architectures shown in FIG. 5A-FIG. 15 or any combination thereof). The components of computing device architecture 2000 are shown in electrical communication with each other using connection 2005, such as a bus. The example computing device architecture 2000 includes a processing unit (CPU or processor) 2010 and computing device connection 2005 that couples various computing device components including computing device memory 2015, such as read only memory (ROM) 2020 and random access memory (RAM) 2025, to processor 2010.

Computing device architecture 2000 can include a cache of high-speed memory connected directly with, in close proximity to, or integrated as part of processor 2010. Computing device architecture 2000 can copy data from memory 2015 and/or the storage device 2030 to cache 2012 for quick access by processor 2010. In this way, the cache can provide a performance boost that avoids processor 2010 delays while waiting for data. These and other modules can control or be configured to control processor 2010 to perform various actions. Other computing device memory 2015 may be available for use as well. Memory 2015 can include multiple different types of memory with different performance characteristics. Processor 2010 can include any general purpose processor and a hardware or software service, such as service 1 2032, service 2 2034, and service 3 2036 stored in storage device 2030, configured to control processor 2010 as well as a special-purpose processor where software instructions are incorporated into the processor design. Processor 2010 may be a self-contained system, containing multiple cores or processors, a bus, memory controller, cache, etc. A multi-core processor may be symmetric or asymmetric.

To enable user interaction with the computing device architecture 2000, input device 2045 can represent any number of input mechanisms, such as a microphone for speech, a touch-sensitive screen for gesture or graphical input, keyboard, mouse, motion input, speech and so forth. Output device 2035 can also be one or more of a number of output mechanisms known to those of skill in the art, such as a display, projector, television, speaker device, etc. In some instances, multimodal computing devices can enable a user to provide multiple types of input to communicate with computing device architecture 2000. Communication interface 2040 can generally govern and manage the user input and computing device output. There is no restriction on operating on any particular hardware arrangement and therefore the basic features here may easily be substituted for improved hardware or firmware arrangements as they are developed.

Storage device 2030 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 2025, read only memory (ROM) 2020, and hybrids thereof. Storage device 2030 can include services 2032, 2034, 2036 for controlling processor 2010. Other hardware or software modules are contemplated. Storage device 2030 can be connected to the computing device connection 2005. In one aspect, a hardware module that performs a particular function can include the software component stored in a computer-readable medium in connection with the necessary hardware components, such as processor 2010, connection 2005, output device 2035, and so forth, to carry out the function.

Aspects of the present disclosure are applicable to any suitable electronic device (such as security systems, smartphones, tablets, laptop computers, vehicles, drones, or other devices) including or coupled to one or more active depth sensing systems. While described below with respect to a device having or coupled to one light projector, aspects of the present disclosure are applicable to devices having any number of light projectors, and are therefore not limited to specific devices.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method of processing video data, the method comprising: obtaining, by an encoder portion of a neural network system, an input video frame for a current time step of operation of the neural network system, reconstructed motion estimation data from a previous time step of operation of the neural network system, reconstructed residual data from the previous time step of operation of the neural network system, and recurrent state data from at least one recurrent layer of a decoder portion of the neural network system from the previous time step of operation; generating, by the encoder portion of the neural network system, output data for the current time step of operation of the neural network system, the output data being generated at least partially based on the input video frame, the reconstructed motion estimation data from the previous time step of operation, the reconstructed residual data from the previous time step of operation, and the recurrent state data from the previous time step of operation; obtaining, by the decoder portion of the neural network system, the output data for the current time step of operation and the recurrent state data from the at least one recurrent layer of the decoder portion from the previous time step of operation; and generating, at least partially based on the output data and the recurrent state data from the previous time step of operation, a reconstructed video frame for the current time step of operation, the reconstructed video frame representing the input video frame.

Aspect 2: The method of Aspect 1, further comprising: determining, by the decoder portion of the neural network system, motion estimation data for the current time step of operation at least partially based on the output data and the recurrent state data from the previous time step of operation; obtaining a previously reconstructed video frame generated during the previous time step of operation; and generating a warped reconstructed video frame for the current time step of operation at least in part by modifying one or more pixels of the previously reconstructed video frame using the motion estimation data determined for the current time step.

Aspect 3: The method of Aspect 2, further comprising: determining, by the decoder portion of the neural network system, reconstructed residual data for the current time step of operation at least partially based on the output data and the recurrent state data from the previous time step of operation; and generating the reconstructed video frame for the current time step of operation at least in part by adding the warped reconstructed video frame to the reconstructed residual data determined for the current time step.

Aspect 4: The method of any of Aspects 2 and 3, further comprising: determining, by the decoder portion of the neural network system, reconstructed residual data for the current time step of operation at least partially based on the output data and the recurrent state data from the previous time step of operation; and processing, by a post-warping network of the decoder portion, the warped reconstructed video frame and the reconstructed residual data determined for the current time step; wherein the reconstructed video frame is generated for the current time step of operation based on processing of the warped reconstructed video frame and the reconstructed residual data by the post-warping network.

Aspect 5: The method of any of Aspects 1 to 4, further comprising: determining, by a motion estimation network of the neural network system, motion estimation data for the current time step of operation at least partially based on the input video frame and at least one of a previously reconstructed video frame from the previous time step of operation or a previous input video frame from the previous time step of operation; generating a warped reconstructed video frame for the current time step at least in part by modifying one or more pixels of at least one of the previously reconstructed video frame or the previous input video frame using the motion estimation data determined for the current time step; and sending the warped reconstructed video frame and the motion estimation data determined for the current time step of operation to the encoder portion of the neural network system; wherein the output data generated for the current time step of operation is generated by the encoder portion of the neural network system at least partially based on the warped reconstructed video frame and the motion estimation data determined for the current time step of operation.

Aspect 6: The method of Aspect 5, further comprising: training, for one or more training iterations, the neural network system using a first loss function, the first loss function determining a loss between one or more input video frames and one or more warped reconstructed video frames; deactivating the first loss function; and training, for one or more subsequent training iterations performed after the one or more training iterations, the neural network system using a second loss function, the second loss function determining a loss between at least one input video frame and at least one reconstructed video frame.

Aspect 7: The method of any of Aspects 1 to 6, wherein the recurrent state data includes one or more values of nodes of the at least one recurrent layer.

Aspect 8: The method of any of Aspects 1 to 7, wherein the decoder portion of the neural network system includes a plurality of recurrent layers, each recurrent layer of the plurality of recurrent layers providing respective recurrent state data.

Aspect 9: The method of any of Aspects 1 to 8, further comprising: generating warped recurrent state data for the current time step of operation at least in part by modifying the recurrent state data from the previous time step of operation using motion estimation data determined for the current time step of operation or the previous time step of operation; wherein the reconstructed video frame generated for the current time step of operation is generated at least partially based on the warped recurrent state data.

Aspect 10: The method of any of Aspects 1 to 9, further comprising: generating, by the decoder portion, a reconstructed mask, the reconstructed mask including one or more values indicative of a presence of data in a previously reconstructed video frame generated during the previous time step of operation; and generating the reconstructed video frame for the current time step of operation at least partially based on the reconstructed mask, a warped reconstructed video frame generated for the current time step of operation, and reconstructed residual data determined for the current time step of operation, the reconstructed mask weighting contributions of the warped reconstructed video frame and the reconstructed residual data.

Aspect 11: The method of any of Aspects 1 to 10, further comprising: obtaining a previously reconstructed video frame generated during the previous time step of operation; generating, during the current time step of operation, a warped reconstructed video frame for the current time step of operation at least in part by modifying one or more pixels of the previously reconstructed video frame using motion estimation data determined for the current time step; determining, by the decoder portion during the current time step of operation, first reconstructed residual data for the current time step of operation; generating the reconstructed video frame for the current time step of operation at least in part by adding the warped reconstructed video frame to the reconstructed residual data determined for the current time step; determining, by the decoder portion during the current time step of operation, second reconstructed residual data from the previous time step of operation at least partially based on a previous input video frame processed by the encoder portion during the current time step of operation; modifying, during the current time step of operation, the previously reconstructed video frame using the second reconstructed residual data; and outputting the modified previously reconstructed video frame as a final output video frame for the current time step of operation.

Aspect 12: The method of any of Aspects 1 to 11, further comprising: obtaining, by the encoder portion of the neural network system, one or more distortion maps; and generating, by the encoder portion of the neural network system, the output data at least partially based on the one or more distortion maps.

Aspect 13: The method of Aspect 12, wherein the one or more distortion maps include a first distortion map indicative of distortion between the input video frame for the current time step of operation and a previously reconstructed video frame from the previous time step of operation.

Aspect 14: The method of any of Aspects 12 and 13, wherein the one or more distortion maps include a second distortion map indicative of distortion between the input video frame for the current time step of operation and a warped reconstructed video frame, the warped reconstructed video frame being generated at least in part by modifying one or more pixels of a previously reconstructed video frame from the previous time step of operation.

Aspect 15: The method of any of Aspects 1 to 14, further comprising: processing, by a first layer of the encoder portion of the neural network system, input data; determining, by the first layer of the encoder portion, a plurality of weight values for the first layer of the encoder portion; setting weights of a second layer of the encoder portion of the neural network system to the plurality of weight values; and processing, by the second layer of the encoder portion, the input data using the weights set to the plurality of weight values.

Aspect 16: The method of any of Aspects 1 to 15, further comprising: storing the output data in a storage medium.

Aspect 17: The method of any of Aspects 1 to 16, further comprising: storing the reconstructed video frame in a storage medium.

Aspect 18: The method of any of Aspects 1 to 17, further comprising: sending the reconstructed video frame over a transmission medium to at least one device.

Aspect 19: An apparatus for processing video data. The apparatus includes a memory (e.g., implemented in circuitry) and a processor (or multiple processors) coupled to the memory. The processor (or processors) is configured to: obtain, by an encoder portion of a neural network system, an input video frame for a current time step of operation of the neural network system, reconstructed motion estimation data from a previous time step of operation of the neural network system, reconstructed residual data from the previous time step of operation of the neural network system, and recurrent state data from at least one recurrent layer of a decoder portion of the neural network system from the previous time step of operation; generate, by the encoder portion of the neural network system, output data for the current time step of operation of the neural network system, the output data be generated at least partially based on the input video frame, the reconstructed motion estimation data from the previous time step of operation, the reconstructed residual data from the previous time step of operation, and the recurrent state data from the previous time step of operation; obtain, by the decoder portion of the neural network system, the output data for the current time step of operation and the recurrent state data from the at least one recurrent layer of the decoder portion from the previous time step of operation; generate, at least partially based on the output data and the recurrent state data from the previous time step of operation, a reconstructed video frame for the current time step of operation, the reconstructed video frame representing the input video frame.

Aspect 20: The apparatus of Aspect 19, wherein the processor is configured to: determine, by the decoder portion of the neural network system, motion estimation data for the current time step of operation at least partially based on the output data and the recurrent state data from the previous time step of operation; obtain a previously reconstructed video frame generated during the previous time step of operation; generate a warped reconstructed video frame for the current time step of operation at least in part by modify one or more pixels of the previously reconstructed video frame use the motion estimation data determined for the current time step.

Aspect 21: The apparatus of Aspect 20, wherein the processor is configured to: determine, by the decoder portion of the neural network system, reconstructed residual data for the current time step of operation at least partially based on the output data and the recurrent state data from the previous time step of operation; generate the reconstructed video frame for the current time step of operation at least in part by add the warped reconstructed video frame to the reconstructed residual data determined for the current time step.

Aspect 22: The apparatus of any of Aspects 20 and 21, wherein the processor is configured to: determine, by the decoder portion of the neural network system, reconstructed residual data for the current time step of operation at least partially based on the output data and the recurrent state data from the previous time step of operation; process, by a post-warping network of the decoder portion, the warped reconstructed video frame and the reconstructed residual data determined for the current time step; the reconstructed video frame is generated for the current time step of operation based on processing of the warped reconstructed video frame and the reconstructed residual data by the post-warping network.

Aspect 23: The apparatus of any of Aspects 19 to 22, wherein the processor is configured to: determine, by a motion estimation network of the neural network system, motion estimation data for the current time step of operation at least partially based on the input video frame and at least one of a previously reconstructed video frame from the previous time step of operation or a previous input video frame from the previous time step of operation; generate a warped reconstructed video frame for the current time step at least in part by modify one or more pixels of at least one of the previously reconstructed video frame or the previous input video frame using the motion estimation data determined for the current time step; send the warped reconstructed video frame and the motion estimation data determined for the current time step of operation to the encoder portion of the neural network system; the output data generated for the current time step of operation is generated by the encoder portion of the neural network system at least partially based on the warped reconstructed video frame and the motion estimation data determined for the current time step of operation.

Aspect 24: The apparatus of Aspect 23, wherein the processor is configured to: train, for one or more training iterations, the neural network system using a first loss function, the first loss function determining a loss between one or more input video frames and one or more warped reconstructed video frames; train, for one or more subsequent training iterations performed after the one or more training iterations, the neural network system using a second loss function, the second loss function determining a loss between at least one input video frame and at least one reconstructed video frame.

Aspect 25: The apparatus of any of Aspects 19 to 24, wherein the recurrent state data includes one or more values of nodes of the at least one recurrent layer.

Aspect 26: The apparatus of any of Aspects 19 to 25, wherein the decoder portion of the neural network system includes a plurality of recurrent layers, each recurrent layer of the plurality of recurrent layers providing respective recurrent state data.

Aspect 27: The apparatus of any of Aspects 19 to 26, wherein the processor is configured to: generate warped recurrent state data for the current time step of operation at least in part by modify the recurrent state data from the previous time step of operation using motion estimation data determined for the current time step of operation or the previous time step of operation; the reconstructed video frame generated for the current time step of operation is generated at least partially based on the warped recurrent state data.

Aspect 28: The apparatus of any of Aspects 19 to 27, wherein the processor is configured to: generate, by the decoder portion, a reconstructed mask, the reconstructed mask including one or more values indicative of a presence of data in a previously reconstructed video frame generated during the previous time step of operation; generate the reconstructed video frame for the current time step of operation at least partially based on the reconstructed mask, a warped reconstructed video frame generated for the current time step of operation, and reconstructed residual data determined for the current time step of operation, the reconstructed mask weighting contributions of the warped reconstructed video frame and the reconstructed residual data.

Aspect 29: The apparatus of any of Aspects 19 to 28, wherein the processor is configured to: obtain a previously reconstructed video frame generated during the previous time step of operation; generate, during the current time step of operation, a warped reconstructed video frame for the current time step of operation at least in part by modify one or more pixels of the previously reconstructed video frame use motion estimation data determined for the current time step; determine, by the decoder portion during the current time step of operation, first reconstructed residual data for the current time step of operation; generate the reconstructed video frame for the current time step of operation at least in part by add the warped reconstructed video frame to the reconstructed residual data determined for the current time step; determine, by the decoder portion during the current time step of operation, second reconstructed residual data from the previous time step of operation at least partially based on a previous input video frame processed by the encoder portion during the current time step of operation; modify, during the current time step of operation, the previously reconstructed video frame using the second reconstructed residual data; output the modified previously reconstructed video frame as a final output video frame for the current time step of operation.

Aspect 30: The apparatus of any of Aspects 19 to 29, wherein the processor is configured to: obtain, by the encoder portion of the neural network system, one or more distortion maps; generate, by the encoder portion of the neural network system, the output data at least partially based on the one or more distortion maps.

Aspect 31: The apparatus of Aspect 30, wherein the one or more distortion maps include a first distortion map indicative of distortion between the input video frame for the current time step of operation and a previously reconstructed video frame from the previous time step of operation.

Aspect 32: The apparatus of any of Aspects 30 and 31, wherein the one or more distortion maps include a second distortion map indicative of distortion between the input video frame for the current time step of operation and a warped reconstructed video frame, the warped reconstructed video frame being generated at least in part by modifying one or more pixels of a previously reconstructed video frame from the previous time step of operation.

Aspect 33: The apparatus of any of Aspects 19 to 32, wherein the processor is configured to: process, by a first layer of the encoder portion of the neural network system, input data; determine, by the first layer of the encoder portion, a plurality of weight values for the first layer of the encoder portion; set weights of a second layer of the encoder portion of the neural network system to the plurality of weight values; process, by the second layer of the encoder portion, the input data using the weights set to the plurality of weight values.

Aspect 34: The apparatus of any of Aspects 19 to 33, wherein the processor is configured to: cause the output data to be stored in the memory.

Aspect 35: The apparatus of any of Aspects 19 to 34, wherein the processor is configured to: cause the reconstructed video frame to be stored in the memory.

Aspect 36: The apparatus of any of Aspects 19 to 35, further comprising: a transmitter configured to transmit the reconstructed video frame over a transmission medium to at least one device.

Aspect 37: The apparatus of any of Aspects 19 to 36, wherein the processor includes a neural processing unit (NPU).

Aspect 38: The apparatus of any of Aspects 19 to 37, wherein the apparatus comprises a mobile device.

Aspect 39: The apparatus of any of Aspects 19 to 37, wherein the apparatus comprises an extended reality device.

Aspect 40: The apparatus of any of Aspects 19 to 37, wherein the apparatus comprises television.

Aspect 41: The apparatus of any of Aspects 19 to 39, further comprising a display.

Aspect 42: The apparatus of any of Aspects 19 to 41, wherein the apparatus comprises camera configured to capture one or more video frames.

Aspect 43: A method of processing video data, the method comprising: obtaining, by a decoder portion of a neural network system, output data for a current time step of operation of the neural network system and recurrent state data from at least one recurrent layer of the decoder portion from a previous time step of operation of the neural network system; determining, by the decoder portion of the neural network system, motion estimation data for the current time step of operation at least partially based on the output data and the recurrent state data from the previous time step of operation; obtaining a previously reconstructed video frame generated during the previous time step of operation; generating a warped reconstructed video frame for the current time step of operation at least in part by modifying one or more pixels of the previously reconstructed video frame using the motion estimation data determined for the current time step; and generating a reconstructed video frame for the current time step of operation at least partially based on the warped reconstructed video frame.

Aspect 44: The method of Aspect 43, further comprising: determining, by the decoder portion of the neural network system, reconstructed residual data for the current time step of operation at least partially based on the output data and the recurrent state data from the previous time step of operation; and generating the reconstructed video frame for the current time step of operation at least in part by adding the warped reconstructed video frame to the reconstructed residual data determined for the current time step.

Aspect 45: The method of any of Aspects 43 and 44, further comprising: determining, by the decoder portion during the current time step of operation, reconstructed residual data from the previous time step of operation at least partially based on a previous input video frame processed by an encoder portion of the neural network system during the current time step of operation; modifying, during the current time step of operation, the previously reconstructed video frame using the reconstructed residual data from the previous time step of operation; and outputting the modified previously reconstructed video frame as a final output video frame for the current time step of operation.

Aspect 46: The method of any of Aspects 43 to 45, further comprising: determining, by the decoder portion of the neural network system, reconstructed residual data for the current time step of operation at least partially based on the output data and the recurrent state data from the previous time step of operation; processing, by a post-warping network of the decoder portion, the warped reconstructed video frame and the reconstructed residual data determined for the current time step; and generating the reconstructed video frame for the current time step of operation at least partially based on processing of the warped reconstructed video frame and the reconstructed residual data by the post-warping network.

Aspect 47: The method of any of Aspects 43 to 46, further comprising: generating warped recurrent state data for the current time step of operation at least in part by modifying the recurrent state data from the previous time step of operation using the motion estimation data determined for the current time step of operation or motion estimation determined for the previous time step of operation; and generating the reconstructed video frame for the current time step of operation at least partially based on the warped recurrent state data.

Aspect 48: The method of any of Aspects 43 to 47, further comprising: generating, by the decoder portion, a reconstructed mask, the reconstructed mask including one or more values indicative of a presence of data in the previously reconstructed video frame generated during the previous time step of operation; and generating the reconstructed video frame for the current time step of operation at least partially based on the reconstructed mask, the warped reconstructed video frame for the current time step of operation, and reconstructed residual data determined for the current time step of operation, the reconstructed mask weighting contributions of the warped reconstructed video frame and the reconstructed residual data.

Aspect 49: The method of any of Aspects 43 to 48, further comprising: obtaining, by an encoder portion of a neural network system, an input video frame for the current time step of operation, reconstructed motion estimation data from a previous time step of operation of the neural network system, reconstructed residual data from the previous time step of operation of the neural network system, and recurrent state data from at least one recurrent layer of the decoder portion of the neural network system from the previous time step of operation; and generating, by the encoder portion of the neural network system, the output data for the current time step of operation, the output data being generated at least partially based on the input video frame, the reconstructed motion estimation data from the previous time step of operation, the reconstructed residual data from the previous time step of operation, and the recurrent state data from the previous time step of operation.

Aspect 50: An apparatus for processing video data. The apparatus includes a memory (e.g., implemented in circuitry) and a processor (or multiple processors) coupled to the memory. The processor (or processors) is configured to: obtain, by a decoder portion of a neural network system, output data for a current time step of operation of the neural network system and recurrent state data from at least one recurrent layer of the decoder portion from a previous time step of operation of the neural network system; determine, by the decoder portion of the neural network system, motion estimation data for the current time step of operation at least partially based on the output data and the recurrent state data from the previous time step of operation; obtain a previously reconstructed video frame generated during the previous time step of operation; generate a warped reconstructed video frame for the current time step of operation at least in part by modify one or more pixels of the previously reconstructed video frame use the motion estimation data determined for the current time step; generate a reconstructed video frame for the current time step of operation at least partially based on the warped reconstructed video frame.

Aspect 51: The apparatus of Aspect 50, wherein the processor is configured to: determine, by the decoder portion of the neural network system, reconstructed residual data for the current time step of operation at least partially based on the output data and the recurrent state data from the previous time step of operation; generate the reconstructed video frame for the current time step of operation at least in part by add the warped reconstructed video frame to the reconstructed residual data determined for the current time step.

Aspect 52: The apparatus of any of Aspects 50 and 51, wherein the processor is configured to: determine, by the decoder portion during the current time step of operation, reconstructed residual data from the previous time step of operation at least partially based on a previous input video frame processed by an encoder portion of the neural network system during the current time step of operation; modify, during the current time step of operation, the previously reconstructed video frame using the reconstructed residual data from the previous time step of operation; output the modified previously reconstructed video frame as a final output video frame for the current time step of operation.

Aspect 53: The apparatus of any of Aspects 50 to 52, wherein the processor is configured to: determine, by the decoder portion of the neural network system, reconstructed residual data for the current time step of operation at least partially based on the output data and the recurrent state data from the previous time step of operation; process, by a post-warping network of the decoder portion, the warped reconstructed video frame and the reconstructed residual data determined for the current time step; generate the reconstructed video frame for the current time step of operation at least partially based on processing of the warped reconstructed video frame and the reconstructed residual data by the post-warping network.

Aspect 54: The apparatus of any of Aspects 50 to 53, wherein the processor is configured to: generate warped recurrent state data for the current time step of operation at least in part by modify the recurrent state data from the previous time step of operation use the motion estimation data determined for the current time step of operation or motion estimation determined for the previous time step of operation; generate the reconstructed video frame for the current time step of operation at least partially based on the warped recurrent state data.

Aspect 55: The apparatus of any of Aspects 50 to 54, wherein the processor is configured to: generate, by the decoder portion, a reconstructed mask, the reconstructed mask including one or more values indicative of a presence of data in the previously reconstructed video frame generated during the previous time step of operation; generate the reconstructed video frame for the current time step of operation at least partially based on the reconstructed mask, the warped reconstructed video frame for the current time step of operation, and reconstructed residual data determined for the current time step of operation, the reconstructed mask weighting contributions of the warped reconstructed video frame and the reconstructed residual data.

Aspect 56: The apparatus of any of Aspects 50 to 55, wherein the processor is configured to: obtain, by an encoder portion of a neural network system, an input video frame for the current time step of operation, reconstructed motion estimation data from a previous time step of operation of the neural network system, reconstructed residual data from the previous time step of operation of the neural network system, and recurrent state data from at least one recurrent layer of the decoder portion of the neural network system from the previous time step of operation; generate, by the encoder portion of the neural network system, the output data for the current time step of operation, the output data be generated at least partially based on the input video frame, the reconstructed motion estimation data from the previous time step of operation, the reconstructed residual data from the previous time step of operation, and the recurrent state data from the previous time step of operation.

Aspect 57: The apparatus of any of Aspects 50 to 56, wherein the processor is configured to: cause the reconstructed video frame to be stored in the memory.

Aspect 58: The apparatus of any of Aspects 50 to 57, wherein the processor is configured to: cause the reconstructed video frame to be displayed.

Aspect 59: The apparatus of any of Aspects 50 to 58, further comprising: a display configured to display the reconstructed video frame.

Aspect 60: The apparatus of any of Aspects 50 to 59, wherein the processor includes a neural processing unit (NPU).

Aspect 61: The apparatus of any of Aspects 50 to 60, wherein the apparatus comprises a mobile device.

Aspect 62: The apparatus of any of Aspects 50 to 60, wherein the apparatus comprises an extended reality device.

Aspect 63: The apparatus of any of Aspects 50 to 60, wherein the apparatus comprises television.

Aspect 64: The apparatus of any of Aspects 50 to 63, wherein the apparatus comprises camera configured to capture one or more video frames.

Aspect 65: A computer-readable storage medium storing instructions that, when executed, cause one or more processors to perform any of the operations of claims 1 to 18.

Aspect 66: An apparatus comprising means for performing any of the operations of claims 1 to 18.

Aspect 67: A computer-readable storage medium storing instructions that, when executed, cause one or more processors to perform any of the operations of claims 43 to 49.

Aspect 68: An apparatus comprising means for performing any of the operations of claims 43 to 49.

Aspect 69: A computer-readable storage medium storing instructions that, when executed, cause one or more processors to perform any of the operations of claims 1 to 18 and any of the operations of claims 43 to 49.

Aspect 70: An apparatus comprising means for performing any of the operations of claims 1 to 18 and any of the operations of claims 43 to 49.

What is claimed is:

1. A method of processing video data, the method comprising:
    obtaining, by an encoder portion of a neural network system, an input video frame for a current time step of operation of the neural network system, a previously reconstructed video frame generated by a decoder portion of the neural network system during a previous time step of operation of the neural network system, reconstructed motion estimation data from the previous time step of operation, reconstructed residual data generated by the decoder portion of the neural network system during the previous time step of operation, and recurrent state data from at least one recurrent layer of the decoder portion of the neural network system from the previous time step of operation;
    generating, by the encoder portion of the neural network system, output data for the current time step of operation of the neural network system, the output data being generated at least partially based on the input video frame, the previously reconstructed video frame from the previous time step of operation, the reconstructed motion estimation data from the previous time step of operation, the reconstructed residual data from the previous time step of operation, and the recurrent state data from the previous time step of operation;
    obtaining, by the decoder portion of the neural network system, the output data for the current time step of operation and the recurrent state data from the at least one recurrent layer of the decoder portion from the previous time step of operation; and
    generating, at least partially based on the output data and the recurrent state data from the previous time step of operation, a reconstructed video frame for the current time step of operation, the reconstructed video frame representing the input video frame.

2. The method of claim 1, further comprising:
    determining, by the decoder portion of the neural network system, motion estimation data for the current time step of operation at least partially based on the output data and the recurrent state data from the previous time step of operation; and
    generating a warped reconstructed video frame for the current time step of operation at least in part by modifying one or more pixels of the previously reconstructed video frame using the motion estimation data determined for the current time step.

3. The method of claim 2, further comprising:
- determining, by the decoder portion of the neural network system, reconstructed residual data for the current time step of operation at least partially based on the output data and the recurrent state data from the previous time step of operation; and
- generating the reconstructed video frame for the current time step of operation at least in part by adding the warped reconstructed video frame to the reconstructed residual data determined for the current time step.

4. The method of claim 2, further comprising:
- determining, by the decoder portion of the neural network system, reconstructed residual data for the current time step of operation at least partially based on the output data and the recurrent state data from the previous time step of operation; and
- processing, by a post-warping network of the decoder portion, the warped reconstructed video frame and the reconstructed residual data determined for the current time step;
- wherein the reconstructed video frame is generated for the current time step of operation based on processing of the warped reconstructed video frame and the reconstructed residual data by the post-warping network.

5. The method of claim 1, further comprising:
- determining, by a motion estimation network of the neural network system, motion estimation data for the current time step of operation at least partially based on the input video frame and at least one of the previously reconstructed video frame from the previous time step of operation or a previous input video frame from the previous time step of operation;
- generating a warped reconstructed video frame for the current time step at least in part by modifying one or more pixels of at least one of the previously reconstructed video frame or the previous input video frame using the motion estimation data determined for the current time step; and
- sending the warped reconstructed video frame and the motion estimation data determined for the current time step of operation to the encoder portion of the neural network system;
- wherein the output data generated for the current time step of operation is generated by the encoder portion of the neural network system at least partially based on the warped reconstructed video frame and the motion estimation data determined for the current time step of operation.

6. The method of claim 5, further comprising:
- training, for one or more training iterations, the neural network system using a first loss function, the first loss function determining a loss between one or more input video frames and one or more warped reconstructed video frames;
- deactivating the first loss function; and
- training, for one or more subsequent training iterations performed after the one or more training iterations, the neural network system using a second loss function, the second loss function determining a loss between at least one input video frame and at least one reconstructed video frame.

7. The method of claim 1, wherein the recurrent state data includes one or more values of nodes of the at least one recurrent layer.

8. The method of claim 1, wherein the decoder portion of the neural network system includes a plurality of recurrent layers, each recurrent layer of the plurality of recurrent layers providing respective recurrent state data.

9. The method of claim 1, further comprising:
- generating warped recurrent state data for the current time step of operation at least in part by modifying the recurrent state data from the previous time step of operation using motion estimation data determined for the current time step of operation or the previous time step of operation;
- wherein the reconstructed video frame generated for the current time step of operation is generated at least partially based on the warped recurrent state data.

10. The method of claim 1, further comprising:
- generating, by the decoder portion, a reconstructed mask, the reconstructed mask including one or more values indicative of a presence of data in the previously reconstructed video frame generated during the previous time step of operation; and
- generating the reconstructed video frame for the current time step of operation at least partially based on the reconstructed mask, a warped reconstructed video frame generated for the current time step of operation, and reconstructed residual data determined for the current time step of operation, the reconstructed mask weighting contributions of the warped reconstructed video frame and the reconstructed residual data.

11. The method of claim 1, further comprising:
- generating, during the current time step of operation, a warped reconstructed video frame for the current time step of operation at least in part by modifying one or more pixels of the previously reconstructed video frame using motion estimation data determined for the current time step;
- determining, by the decoder portion during the current time step of operation, first reconstructed residual data for the current time step of operation;
- generating the reconstructed video frame for the current time step of operation at least in part by adding the warped reconstructed video frame to the reconstructed residual data determined for the current time step;
- determining, by the decoder portion during the current time step of operation, second reconstructed residual data from the previous time step of operation at least partially based on a previous input video frame processed by the encoder portion during the current time step of operation;
- modifying, during the current time step of operation, the previously reconstructed video frame using the second reconstructed residual data; and
- outputting the modified previously reconstructed video frame as a final output video frame for the current time step of operation.

12. The method of claim 1, further comprising:
- obtaining, by the encoder portion of the neural network system, one or more distortion maps; and
- generating, by the encoder portion of the neural network system, the output data at least partially based on the one or more distortion maps.

13. The method of claim 12, wherein the one or more distortion maps include a first distortion map indicative of distortion between the input video frame for the current time step of operation and the previously reconstructed video frame from the previous time step of operation.

14. The method of claim 12, wherein the one or more distortion maps include a second distortion map indicative of distortion between the input video frame for the current time step of operation and a warped reconstructed video frame, the warped reconstructed video frame being generated at least in part by modifying one or more pixels of the previously reconstructed video frame from the previous time step of operation.

15. The method of claim 1, further comprising:
processing, by a first layer of the encoder portion of the neural network system, input data;
determining, by the first layer of the encoder portion, a plurality of weight values for the first layer of the encoder portion;
setting weights of a second layer of the encoder portion of the neural network system to the plurality of weight values; and
processing, by the second layer of the encoder portion, the input data using the weights set to the plurality of weight values.

16. The method of claim 1, further comprising:
storing the output data in a storage medium.

17. The method of claim 1, further comprising:
storing the reconstructed video frame in a storage medium.

18. The method of claim 1, further comprising:
sending the reconstructed video frame over a transmission medium to at least one device.

19. An apparatus for processing video data, comprising:
a memory; and
a processor coupled to the memory and configured to:
obtain, using an encoder portion of a neural network system, an input video frame for a current time step of operation of the neural network system, a previously reconstructed video frame generated by a decoder portion of the neural network system during a previous time step of operation of the neural network system, reconstructed motion estimation data from the previous time step of operation, reconstructed residual data generated by the decoder portion of the neural network system during the previous time step of operation, and recurrent state data from at least one recurrent layer of the decoder portion of the neural network system from the previous time step of operation;
generate, using the encoder portion, output data for the current time step of operation of the neural network system, the output data being generated at least partially based on the input video frame, the previously reconstructed video frame from the previous time step of operation, the reconstructed motion estimation data from the previous time step of operation, the reconstructed residual data from the previous time step of operation, and the recurrent state data from the previous time step of operation;
obtain, using the decoder portion of a neural network system, the output data for the current time step of operation and the recurrent state data from the at least one recurrent layer of the decoder portion from the previous time step of operation; and
generate, at least partially based on the output data and the recurrent state data from the previous time step of operation, a reconstructed video frame for the current time step of operation, the reconstructed video frame representing the input video frame.

20. The apparatus of claim 19, wherein the processor is configured to:
determine, using the decoder portion of the neural network system, motion estimation data for the current time step of operation at least partially based on the output data and the recurrent state data from the previous time step of operation; and
generate a warped reconstructed video frame for the current time step of operation by modifying one or more pixels of the previously reconstructed video frame using the motion estimation data determined for the current time step.

21. The apparatus of claim 20, wherein the processor is configured to:
determine, using the decoder portion of the neural network system, reconstructed residual data for the current time step of operation at least partially based on the output data and the recurrent state data from the previous time step of operation; and
generate the reconstructed video frame for the current time step of operation by adding the warped reconstructed video frame to the reconstructed residual data determined for the current time step.

22. The apparatus of claim 21, wherein the processor is configured to:
determine, using the decoder portion of the neural network system, reconstructed residual data for the current time step of operation at least partially based on the output data and the recurrent state data from the previous time step of operation; and
process, using a post-warping network of the decoder portion, the warped reconstructed video frame and the reconstructed residual data determined for the current time step;
wherein the reconstructed video frame is generated for the current time step of operation based on processing of the warped reconstructed video frame and the reconstructed residual data by the post-warping network.

23. The apparatus of claim 19, wherein the processor is configured to:
determine, using a motion estimation network of the neural network system, motion estimation data for the current time step of operation at least partially based on the input video frame and at least one of the previously reconstructed video frame from the previous time step of operation or a previous input video frame from the previous time step of operation;
generate a warped reconstructed video frame for the current time step by modifying one or more pixels of at least one of the previously reconstructed video frame or the previous input video frame using the motion estimation data determined for the current time step; and
send the warped reconstructed video frame and the motion estimation data determined for the current time step of operation to the encoder portion of the neural network system;
wherein the output data generated for the current time step of operation is generated by the encoder portion of the neural network system at least partially based on the warped reconstructed video frame and the motion estimation data determined for the current time step of operation.

24. The apparatus of claim 23, wherein the processor is configured to:
train, for one or more training iterations, the neural network system using a first loss function, the first loss function determining a loss between one or more input video frames and one or more warped reconstructed video frames;
deactivate the first loss function; and
train, for one or more subsequent training iterations performed after the one or more training iterations, the neural network system using a second loss function, the second loss function determining a loss between at least one input video frame and at least one reconstructed video frame.

25. The apparatus of claim 19, wherein the recurrent state data includes one or more values of nodes of the at least one recurrent layer.

26. The apparatus of claim 19, wherein the decoder portion of the neural network system includes a plurality of recurrent layers, each recurrent layer of the plurality of recurrent layers providing respective recurrent state data.

27. The apparatus of claim 19, wherein the processor is configured to:
generate warped recurrent state data for the current time step of operation by modifying the recurrent state data from the previous time step of operation using motion estimation data determined for the current time step of operation or the previous time step of operation;
wherein the reconstructed video frame generated for the current time step of operation is generated at least partially based on the warped recurrent state data.

28. The apparatus of claim 19, wherein the processor is configured to:
generate, using the decoder portion, a reconstructed mask, the reconstructed mask including one or more values indicative of a presence of data in the previously reconstructed video frame generated during the previous time step of operation; and
generate, using the decoder portion, the reconstructed video frame for the current time step of operation at least partially based on the reconstructed mask, a warped reconstructed video frame generated for the current time step of operation, and reconstructed residual data determined for the current time step of operation, the reconstructed mask weighting contributions of the warped reconstructed video frame and the reconstructed residual data.

29. The apparatus of claim 19, wherein the processor is configured to:
generate, using the decoder portion during the current time step of operation, a warped reconstructed video frame for the current time step of operation by modifying one or more pixels of the previously reconstructed video frame using motion estimation data determined for the current time step;
determine, using the decoder portion during the current time step of operation, first reconstructed residual data for the current time step of operation;
generate the reconstructed video frame for the current time step of operation by adding the warped reconstructed video frame to the reconstructed residual data determined for the current time step;
determine, using the decoder portion during the current time step of operation, second reconstructed residual data from the previous time step of operation at least partially based on a previous input video frame processed by the encoder portion during the current time step of operation;
modify, using the decoder portion during the current time step of operation, the previously reconstructed video frame using the second reconstructed residual data; and
output the modified previously reconstructed video frame as a final output video frame for the current time step of operation.

30. The apparatus of claim 19, wherein the processor is configured to:
obtain, using the encoder portion of the neural network system, one or more distortion maps; and
generate, using the encoder portion of the neural network system, the output data at least partially based on the one or more distortion maps.

31. The apparatus of claim 30, wherein the one or more distortion maps include a first distortion map indicative of distortion between the input video frame for the current time step of operation and the previously reconstructed video frame from the previous time step of operation.

32. The apparatus of claim 30, wherein the one or more distortion maps include a second distortion map indicative of distortion between the input video frame for the current time step of operation and a warped reconstructed video frame, the warped reconstructed video frame being generated by modifying one or more pixels of the previously reconstructed video frame from the previous time step of operation.

33. The apparatus of claim 19, wherein the processor is configured to:
process, using a first layer of the encoder portion of the neural network system, input data;
determine, using the first layer of the encoder portion, a plurality of weight values for the first layer of the encoder portion;
set weights of a second layer of the encoder portion of the neural network system to the plurality of weight values; and
process, by the second layer of the encoder portion, the input data using the weights set to the plurality of weight values.

34. The apparatus of claim 19, wherein the processor is configured to:
cause the output data to be stored in the memory.

35. The apparatus of claim 19, wherein the processor is configured to:
cause the reconstructed video frame to be stored in the memory.

36. The apparatus of claim 19, further comprising:
a transmitter configured to transmit the reconstructed video frame over a transmission medium to at least one device.

37. The apparatus of claim 19, wherein the processor includes a neural processing unit (NPU).

38. The apparatus of claim 19, wherein the apparatus comprises a mobile device.

39. The apparatus of claim 19, wherein the apparatus comprises an extended reality device.

40. The apparatus of claim 19, further comprising a display.

41. The apparatus of claim 19, wherein the apparatus comprises television.

42. The apparatus of claim 19, wherein the apparatus comprises camera configured to capture one or more video frames.

43. A method of processing video data, the method comprising:
obtaining, by a decoder portion of a neural network system, output data for a current time step of operation of the neural network system and recurrent state data from at least one recurrent layer of the decoder portion from a previous time step of operation of the neural network system the output data being generated at least in part based on an input video frame for the current time step of operation, a previously reconstructed video frame generated during the previous time step of operation, reconstructed motion estimation data from the previous time step of operation, reconstructed residual data generated during the previous time step of operation, and the recurrent state data;

determining, by the decoder portion of the neural network system, motion estimation data for the current time step of operation at least partially based on the output data and the recurrent state data from the previous time step of operation;

obtaining a previously reconstructed video frame generated during the previous time step of operation;

generating a warped reconstructed video frame for the current time step of operation at least in part by modifying one or more pixels of the previously reconstructed video frame using the motion estimation data determined for the current time step; and generating a reconstructed video frame for the current time step of operation at least partially based on the warped reconstructed video frame.

44. The method of claim 43, further comprising:
determining, by the decoder portion of the neural network system, reconstructed residual data for the current time step of operation at least partially based on the output data and the recurrent state data from the previous time step of operation; and generating the reconstructed video frame for the current time step of operation at least in part by adding the warped reconstructed video frame to the reconstructed residual data determined for the current time step.

45. The method of claim 44, further comprising:
modifying, during the current time step of operation, the previously reconstructed video frame using the reconstructed residual data from the previous time step of operation; and outputting the modified previously reconstructed video frame as a final output video frame for the current time step of operation.

46. The method of claim 43, further comprising:
determining, by the decoder portion of the neural network system, reconstructed residual data for the current time step of operation at least partially based on the output data and the recurrent state data from the previous time step of operation;

processing, by a post-warping network of the decoder portion, the warped reconstructed video frame and the reconstructed residual data determined for the current time step; and generating the reconstructed video frame for the current time step of operation at least partially based on processing of the warped reconstructed video frame and the reconstructed residual data by the post-warping network.

47. The method of claim 43, further comprising:
generating warped recurrent state data for the current time step of operation at least in part by modifying the recurrent state data from the previous time step of operation using the motion estimation data determined for the current time step of operation or motion estimation determined for the previous time step of operation; and generating the reconstructed video frame for the current time step of operation at least partially based on the warped recurrent state data.

48. The method of claim 43, further comprising:
generating, by the decoder portion, a reconstructed mask, the reconstructed mask including one or more values indicative of a presence of data in the previously reconstructed video frame generated during the previous time step of operation; and generating the reconstructed video frame for the current time step of operation at least partially based on the reconstructed mask, the warped reconstructed video frame for the current time step of operation, and reconstructed residual data determined for the current time step of operation, the reconstructed mask weighting contributions of the warped reconstructed video frame and the reconstructed residual data.

49. The method of claim 43, further comprising:
obtaining, by an encoder portion of a neural network system, the input video frame for the current time step of operation, the reconstructed motion estimation data from the previous time step of operation, the reconstructed residual data from the previous time step of operation of the neural network system, and the recurrent state data from the previous time step of operation; and generating, by the encoder portion of the neural network system, the output data for the current time step of operation, the output data being generated at least partially based on the input video frame, the reconstructed motion estimation data from the previous time step of operation, the reconstructed residual data from the previous time step of operation, and the recurrent state data from the previous time step of operation.

50. An apparatus for processing video data, comprising:
a memory; and
a processor coupled to the memory and configured to:
obtain, using a decoder portion of a neural network system, output data for a current time step of operation of the neural network system and recurrent state data from at least one recurrent layer of the decoder portion from a previous time step of operation of the neural network system, the output data being generated at least in part based on an input video frame for the current time step of operation, a previously reconstructed video frame generated during the previous time step of operation, reconstructed motion estimation data from the previous time step of operation, reconstructed residual data generated during the previous time step of operation, and the recurrent state data;

determine, using the decoder portion of the neural network system, motion estimation data for the current time step of operation at least partially based on the output data and the recurrent state data from the previous time step of operation;

obtain a previously reconstructed video frame generated during the previous time step of operation;

generate a warped reconstructed video frame for the current time step of operation at least in part by modifying one or more pixels of the previously reconstructed video frame using the motion estimation data determined for the current time step; and generate a reconstructed video frame for the current time step of operation at least partially based on the warped reconstructed video frame.

51. The apparatus of claim 50, wherein the processor is configured to:
determine, using the decoder portion of the neural network system, reconstructed residual data for the current time step of operation at least partially based on the output data and the recurrent state data from the previous time step of operation; and generate the reconstructed video frame for the current time step of operation at least in part by adding the warped reconstructed video frame to the reconstructed residual data determined for the current time step.

52. The apparatus of claim 51, wherein the processor is configured to:
modify, during the current time step of operation, the previously reconstructed video frame using the reconstructed residual data from the previous time step of operation; and
output the modified previously reconstructed video frame as a final output video frame for the current time step of operation.

53. The apparatus of claim 50, wherein the processor is configured to:
determine, using the decoder portion of the neural network system, reconstructed residual data for the current time step of operation at least partially based on the output data and the recurrent state data from the previous time step of operation;
process, using a post-warping network of the decoder portion, the warped reconstructed video frame and the reconstructed residual data determined for the current time step; and
generate the reconstructed video frame for the current time step of operation at least partially based on processing of the warped reconstructed video frame and the reconstructed residual data by the post-warping network.

54. The apparatus of claim 50, wherein the processor is configured to:
generate warped recurrent state data for the current time step of operation at least in part by modifying the recurrent state data from the previous time step of operation using the motion estimation data determined for the current time step of operation or motion estimation determined for the previous time step of operation; and
generate the reconstructed video frame for the current time step of operation at least partially based on the warped recurrent state data.

55. The apparatus of claim 50, wherein the processor is configured to:
generate, using the decoder portion, a reconstructed mask, the reconstructed mask including one or more values indicative of a presence of data in the previously reconstructed video frame generated during the previous time step of operation; and
generate the reconstructed video frame for the current time step of operation at least partially based on the reconstructed mask, the warped reconstructed video frame for the current time step of operation, and reconstructed residual data determined for the current time step of operation, the reconstructed mask weighting contributions of the warped reconstructed video frame and the reconstructed residual data.

56. The apparatus of claim 50, wherein the processor is configured to:
obtain, using an encoder portion of a neural network system, the input video frame for the current time step of operation, the reconstructed motion estimation data from the previous time step of operation, the reconstructed residual data from the previous time step of operation of the neural network system, and the recurrent state data from the previous time step of operation; and
generate, using the encoder portion of the neural network system, the output data for the current time step of operation, the output data being generated at least partially based on the input video frame, the reconstructed motion estimation data from the previous time step of operation, the reconstructed residual data from the previous time step of operation, and the recurrent state data from the previous time step of operation.

57. The apparatus of claim 50, wherein the processor is configured to:
cause the reconstructed video frame to be stored in the memory.

58. The apparatus of claim 50, wherein the processor is configured to:
cause the reconstructed video frame to be displayed.

59. The apparatus of claim 50, further comprising:
a display configured to display the reconstructed video frame.

60. The apparatus of claim 50, wherein the processor includes a neural processing unit (NPU).

61. The apparatus of claim 50, wherein the apparatus comprises a mobile device.

62. The apparatus of claim 50, wherein the apparatus comprises an extended reality device.

63. The apparatus of claim 50, wherein the apparatus comprises television.

64. The apparatus of claim 50, wherein the apparatus comprises camera configured to capture one or more video frames.

* * * * *